US012117163B2

(12) United States Patent
Callahan

(10) Patent No.: US 12,117,163 B2
(45) Date of Patent: Oct. 15, 2024

(54) LIGHTING EQUIPMENT

(71) Applicant: Michael Callahan, New York, NY (US)

(72) Inventor: Michael Callahan, New York, NY (US)

( * ) Notice: Subject to any disclaimer, the term of this patent is extended or adjusted under 35 U.S.C. 154(b) by 98 days.

(21) Appl. No.: 17/508,194

(22) Filed: Oct. 22, 2021

(65) Prior Publication Data

US 2022/0042670 A1 Feb. 10, 2022

Related U.S. Application Data

(63) Continuation of application No. 17/069,054, filed on Oct. 13, 2020, now Pat. No. 11,187,398, which is a
(Continued)

(51) Int. Cl.
*F21V 7/00* (2006.01)
*F21S 8/08* (2006.01)
(Continued)

(52) U.S. Cl.
CPC ................. *F21V 7/00* (2013.01); *F21S 8/08* (2013.01); *F21S 10/00* (2013.01); *F21S 10/06* (2013.01);
(Continued)

(58) Field of Classification Search
CPC ........... F21V 7/00; F21V 14/02; F21V 17/02; F21V 21/15; F21V 21/30; H01B 7/0045; H01B 7/009; H01B 9/003; H01B 9/006; H01R 24/28; G02B 26/0816; G02B 26/101
See application file for complete search history.

(56) References Cited

U.S. PATENT DOCUMENTS 819,611 A 5/1906 Sohlberg
2,076,240 A 4/1937 Levy
(Continued)

FOREIGN PATENT DOCUMENTS

CN 201620208832 3/2016

OTHER PUBLICATIONS

The Edison Electric Illuminating Company of Boston, The History of Stage and Theatre Lighting, copyright 1929.
(Continued)

*Primary Examiner* — Arman B Fallahkhair
(74) *Attorney, Agent, or Firm* — Davidson Kappel LLC

(57) ABSTRACT

A cable assembly suitable for distributing both power and low voltage control signals to a plurality of discrete devices is disclosed. Power and control signal input plugs are attached by cable to a housing. A first set of power and control signal output connectors is attached by flexible cable to the same housing. A second set of power and control signal output connectors is attached to the housing. Corresponding contacts of all three power connectors and of all three control signal connectors having the same function are made electrically common, such that power and control signals applied to the plugs are available at both output connectors. The structure reduces the number of components and connections required to share power and data relative to prior art methods.

7 Claims, 71 Drawing Sheets

Related U.S. Application Data continuation of application No. 15/945,987, filed on Apr. 5, 2018, now abandoned.

(60) Provisional application No. 62/481,749, filed on Apr. 5, 2017.

(51) Int. Cl.

| | |
|---|---|
| ***F21S 10/00*** | (2006.01) |
| ***F21S 10/06*** | (2006.01) |
| ***F21V 14/02*** | (2006.01) |
| ***F21V 17/02*** | (2006.01) |
| ***F21V 21/15*** | (2006.01) |
| ***F21V 21/30*** | (2006.01) |
| ***F21W 131/406*** | (2006.01) |
| ***F21Y 115/10*** | (2016.01) |
| ***G02B 26/08*** | (2006.01) |
| ***G02B 26/10*** | (2006.01) |
| ***H01B 7/00*** | (2006.01) |
| ***H01B 9/00*** | (2006.01) |
| ***H01R 24/28*** | (2011.01) |

(52) U.S. Cl.

CPC .............. *F21V 14/02* (2013.01); *F21V 17/02* (2013.01); *F21V 21/15* (2013.01); *F21V 21/30* (2013.01); *G02B 26/0816* (2013.01); *G02B 26/101* (2013.01); *H01B 7/0045* (2013.01); *H01B 7/009* (2013.01); *H01B 9/003* (2013.01); *H01B 9/006* (2013.01); *H01R 24/28* (2013.01); *F21W 2131/406* (2013.01); *F21Y 2115/10* (2016.08)

(56) References Cited

U.S. PATENT DOCUMENTS

| | | | | |
|---|---|---|---|---|
| 2,650,292 | A | 8/1953 | Strong | |
| 2,950,382 | A | 8/1960 | Hatch | |
| 3,069,536 | A | 12/1962 | Dion et al. | |
| 3,116,022 | A | 12/1963 | Davis | |
| 3,512,743 | A | 5/1970 | Lipscomb | |
| 3,594,566 | A | 7/1971 | Kneisley | |
| 3,783,263 | A | 1/1974 | Cruse | |
| 3,900,726 | A | 8/1975 | Tichenor | |
| 3,940,606 | A | 2/1976 | Lemons | |
| 4,232,361 | A | 11/1980 | Kelsall | |
| 4,319,311 | A | 3/1982 | Mitchell | |
| 4,338,654 | A | 7/1982 | Logothetis | |
| 4,381,539 | A | 4/1983 | Sakurai | |
| 4,462,067 | A | 7/1984 | Altman | |
| 4,527,198 | A | 7/1985 | Callahan | |
| 4,712,167 | A | 12/1987 | Gordin et al. | |
| 4,712,168 | A | 12/1987 | Scherrer | |
| 4,769,743 | A | 9/1988 | Callahan | |
| 4,931,916 | A | 6/1990 | Callahan | |
| 5,345,371 | A | 9/1994 | Cunningham et al. | |
| 5,432,691 | A | 7/1995 | Gerrett et al. | |
| 5,440,469 | A | 8/1995 | Gomes | |
| 6,042,426 | A * | 3/2000 | Byrne | H01R 27/02 439/654 |
| 6,362,610 | B1 * | 3/2002 | Yang | G06F 1/266 323/281 |
| 6,607,285 | B2 | 8/2003 | Citron et al. | |
| 6,744,693 | B2 | 6/2004 | Brockmann et al. | |
| 6,860,624 | B2 | 3/2005 | Hille et al. | |
| 6,885,796 | B2 * | 4/2005 | Lubkert | G06F 1/266 439/535 |
| 7,011,435 | B1 | 3/2006 | Blaymore | |
| 7,245,926 | B2 | 7/2007 | Liao et al. | |
| 7,246,926 | B2 | 7/2007 | Harwood | |
| 7,901,114 | B2 | 3/2011 | Lok | |
| 7,914,198 | B2 | 3/2011 | Mier-Langner et al. | |
| 8,096,684 | B2 | 1/2012 | Salm et al. | |
| 8,449,141 | B1 | 5/2013 | Hindrichs | |
| 8,680,972 | B2 | 5/2014 | Quadri | |
| 8,727,570 | B2 | 5/2014 | Dalsgaard | |
| 8,845,150 | B2 | 9/2014 | Brutche et al. | |
| 8,893,443 | B2 | 11/2014 | Davis | |
| 9,539,952 | B2 | 1/2017 | Gebhard et al. | |
| 9,593,830 | B2 | 3/2017 | Conti et al. | |
| 9,683,722 | B2 | 6/2017 | Quadri et al. | |
| 9,746,147 | B2 | 8/2017 | Benner | |
| 10,667,046 | B2 * | 5/2020 | Vansickel | H01R 31/06 |
| 2002/0195993 | A1 * | 12/2002 | Chiu | H02J 7/0042 320/114 |
| 2008/0293290 | A1 * | 11/2008 | Ku | H01R 13/7175 439/490 |
| 2015/0003099 | A1 | 1/2015 | Rasmussen et al. | |
| 2015/0315786 | A1 | 11/2015 | Callahan | |
| 2018/0224099 | A1 | 8/2018 | Farnik et al. | |
| 2018/0292809 | A1 | 10/2018 | Farnik et al. | |
| 2019/0079496 | A1 | 3/2019 | Farnik et al. | |

OTHER PUBLICATIONS

Callahan, Michael—"The Lighting Designer's Scalpel" Article—Light & Sound America Magazine, Nov. 2017, pp. 90-96.
Kliegl Bros.—1913 Catalog G—pp. 10-12, 16.
Kliegl Bros.—1922 Catalog K—pp. 8, 9.
Kliegl Bros.—1926 Catalog M—pp. 38, 39, 51, 52.
Kliegl Bros.—1929 Condensed Catalog—p. 5.
Kliegl Bros.—Catalog No. 50—pp. 33-38.
Strand Lighting—1925 Catalog—sheet 3.
Strand Lighting—1957 Catalog—pp. 56-61.
Strand Lighting—1969 Catalog—pp. 6, 23-26.
Strand Lighting—"Leko" 1000 watt Ellipsoidal Spotlights Brochure 1992.
Strand Lighting—Bambino 500 watt, 200 watt Cut Sheet 1998.
Strand Lighting—Bambino 500W Quartz Halogen Fresnel Cut Sheet 2002.
Strand Lighting—Bambino 200/500 Parts List 2003.
Stelmar Brochure—undated.
Film-Tech—Strong Lighting History (online).
Strong Electric—Trouper Cut Sheet.
Strong Electric—Super Trouper Cut Sheet.
Strong Electric—Gladiator Cut Sheet.
Strong Electric—Super Trouper LT Cut Sheet.
Strong Electric—Super Trouper III Cut Sheet.
Strong Electric—Trouperette Cut Sheet.
Kneisley Electric—Super Spot Cut Sheet 1970.
Christie Electric—HAL Print Advertisement 1979.
Lighting Development Company—Starlight Interim Data Sheet 7/74.
Phoebus—Ultra Arc II LT Cut Sheet.
Phoebus—Ultra Arc Titan LT Cut Sheet.
Lycian—Super Arc 350 Cut Sheet.
Lycian—Current Product Line from website.
Robert Juliat—Company History from website.
Robert Juliat—Current Product Line from website.
Robert Juliat Heloise on Angled Yoke (photo).
Berkey-Colortran—Colorspot I & II Materials.
Berkey-Colortran—Ellipsoids Brochure 1977.
Mole-Richardson—Current Online Catalog—Chapter 12.
James L. Moody—Concert Lighting: Techniques, Art, and Business—pp. 92-99—copyright 1989.
ADB—Company History from current website.
ADB—WARP/Axis Brochure—6 pages.
Ciddor, Andy—WARP/Axis—online article Lighting Dimensions Apr. 1, 2004.
Electronic Theatre Controls—Source Four Brochure 1992.
Electronic Theatre Controls—Source Four User Manual 2010 release.
Altman—Satellite I Brochure.
Altman—Voyager Cut Sheet.
Altman—PAR 56/64 Cut Sheet.
Altman—PAR 56 Parts Drawing 2004.
City Theatrical—Followspot accessories page from current website.

(56) References Cited

OTHER PUBLICATIONS

City Theatrical—No. 1360 Source Four Follow Spot Handle (photo).
City Theatrical—No. 1500 Follow Spot Yoke User Manual 2003.
Images of Followspot Use (online photos).
Apollo Design Right Arm Cut Sheet.
Phida Follow Spots.

* cited by examiner

LIGHTING EQUIPMENT

This application relies upon Provisional Application No. 61/973,592 filed Apr. 1, 2014; the utility application Ser. No. 14/676,616, filed Apr. 1, 2015; and Provisional Application No. 62/481,749 filed Apr. 5, 2017 included in their entirety by reference.

SUMMARY OF THE INVENTION

This disclosure includes various improvements to lighting fixtures, support structures, and interconnecting cabling.

DETAILED DESCRIPTION

Figure 1A:
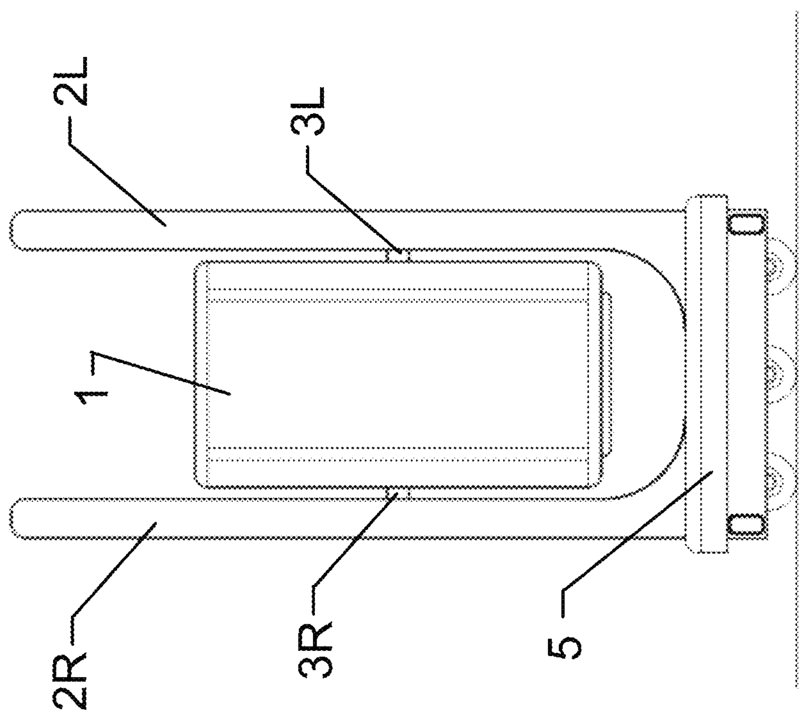
FIG. 1A is a frontal elevation illustrating one embodiment of the improved fixture design of the present invention, with the head vertical and at minimum height.
Figure 1B:
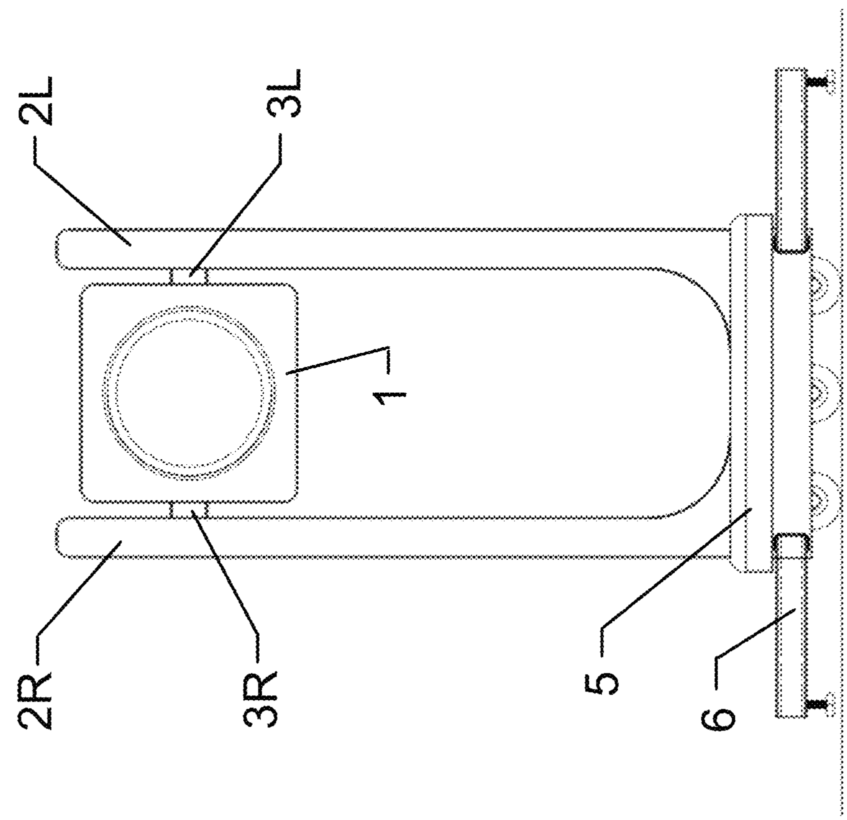
FIG. 1B is a frontal elevation of one embodiment of the improved fixture design as illustrated in the prior Figure, with the head horizontal and at maximum height.
Figure 2A:
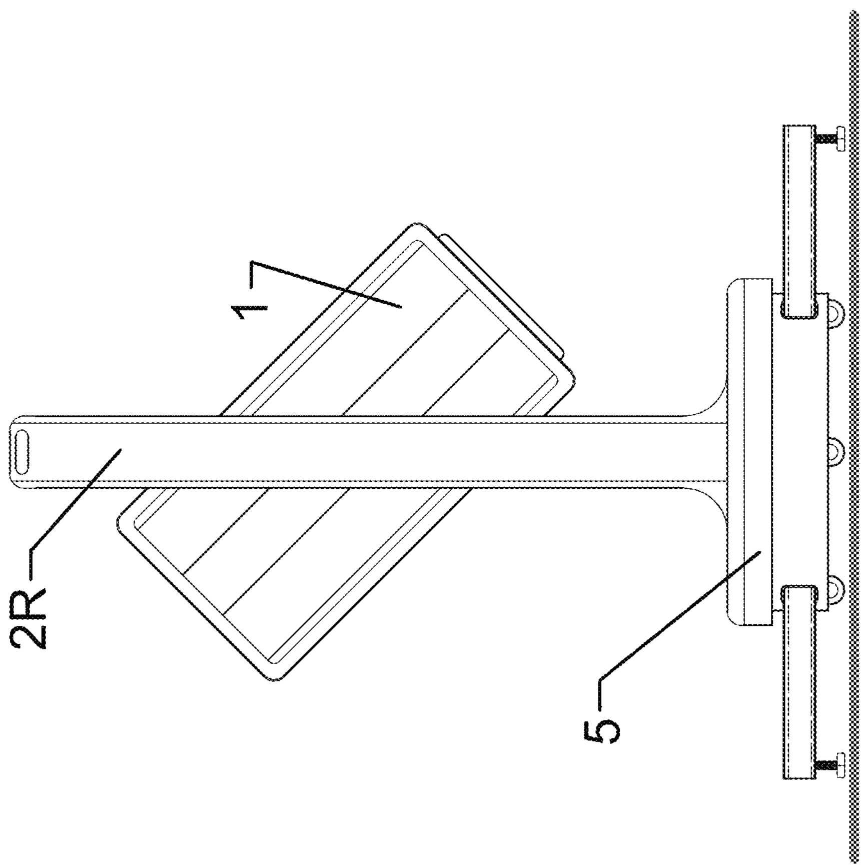
FIG. 2A is a side elevation of one embodiment of the improved fixture design illustrated in the prior Figures, with the head angled and at an intermediate height.
Figure 2B:
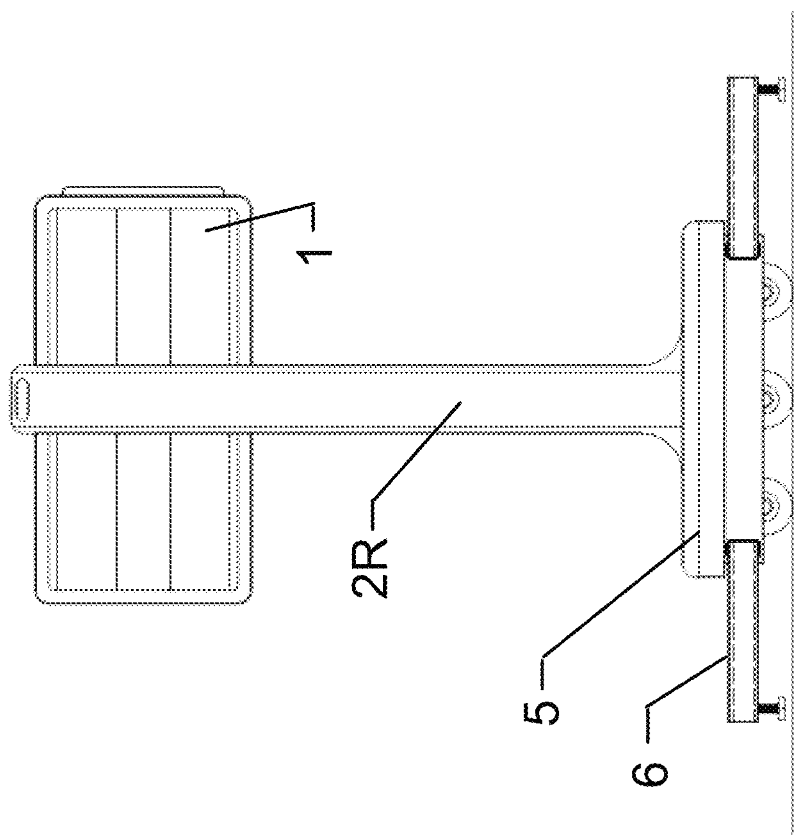
FIG. 2B is a side elevation of one embodiment of the improved fixture design as illustrated in the prior Figures, with the head horizontal and at maximum height, as in FIG. 1B.

The disclosures include improvements to followspots.

The "followspot" is a fixture type, more than a century in use, adapted to illuminate a performer or other subject as they move about, and/or a series of subjects at different locations, by the agency of a human operator physically re-aiming the fixture in real time. Followspots typically employ an optical system comparable to a projector or a "leko", one imaging an internal aperture whose size and shape can be mechanically altered to produce a corresponding change in beam size and/or shape.

The requirement that, to adjust it, a human operator must "lay hands" directly upon it limits the traditional followspot to positions at which its operator can also be accommodated. This has required installing, in venues used for performances and events, booths and platforms in their upper reaches to produce the vertical beam angle.

In other circumstances, existing balconies can be used, or temporary platforms must be suspended from an overhead building structure by lifting motors. In outdoor situations, temporary scaffolding towers are built.

These necessary accommodations, in turn, often dictate distances between a followspot and the subject lit ("throws") of hundreds of feet. Such distances require large fixtures built around high-powered light sources and large optical systems producing very narrow beams. The Strong Electric Supertrouper II xenon followspot has a head almost seven feet in length. Other brands and models with comparable output have been of similar size.

A carbon arc based followspot is disclosed in U.S. Pat. No. 2,650,292 to Strong, whose company dominated the market for many years. The fixture head L comprises a lamphouse with a rear portion R containing the light source and a forward portion F containing lenses. A stand S has a clamp 22 for a column 23 allowing adjustment of the height of the head L, which is supported in a cradle by trunnions, providing a horizontal axis for tilt/elevation adjustment. The yoke also permits rotation around a vertical axis for azimuth/pan adjustment. Height adjustment of the head is necessary, to avoid obstruction by railings on platforms and balconies; to align with ports/windows in booths; to adjust for ceilings and other overhead obstructions above the lamphouse; and to bring the operator's controls better into reach.

Followspot bulbs require ballasts to operate, which can be housed in a separate enclosure or, in some cases, are integrated into the fixture head to reduce the number of components and interconnecting cables, but that increases head weight.

The total size and weight of followspots, given the need to move them to and from distant operating positions often with only limited access, requires transporting them in their several component parts, with assembly and disassembly necessary at the point of use.

"Roadcases" (reusable shipping crates) are needed to protect a followspot's parts in transport, but can be too large to convey them to the point of use within a venue (for example, along narrow catwalks connecting platforms in a building's overhead structure). Or the components must be hoisted onto a scaffold tower. Uncased, the components can be unwieldy and difficult to handle, as well as being subject to damage.

Once a followspot's components have been conveyed to the point of use, it often requires four workers to lift the head onto its stand, as does changing the head's height after assembly. Working room at the point of use can be limited, making either process that much more difficult.

Given the great fixture-to-subject "throw" distances typical, only a tiny change in head azimuth or elevation results in a dramatic change in beam location. This renders vital to the results achieved, the ability of an operator to smoothly and precisely control the direction and the motion of the fixture. Prior art followspots have had various relevant defects and deficiencies in this regard, including play and deflection in the stand and yoke assembly. The yoke also limits maximum depression of the head, as might be required to reach subjects nearby.

Refer now to FIG. 1A-4, illustrating some embodiments addressing these issues.

FIG. 1A illustrates one embodiment of the improved fixture design of the present invention, with the head 1 vertical and at minimum height.

Head 1 contains the light source and optics. Head 1 is supported rotatably around a tilt/elevation axis by two parallel standards 2L and 2R, which extend generally vertically from a base 5.

The attachments 3L and 3R between the head 1 and the standards 2L and 2R allow vertical displacement of head 1 relative to base 5, preferably with little physical effort. The attachments might ride on a track, in a channel, or on a linear bearing. Chain, cable, or lead screws with counterweights, gas springs, or motorization are some possible lifting methods.

Figure 3:
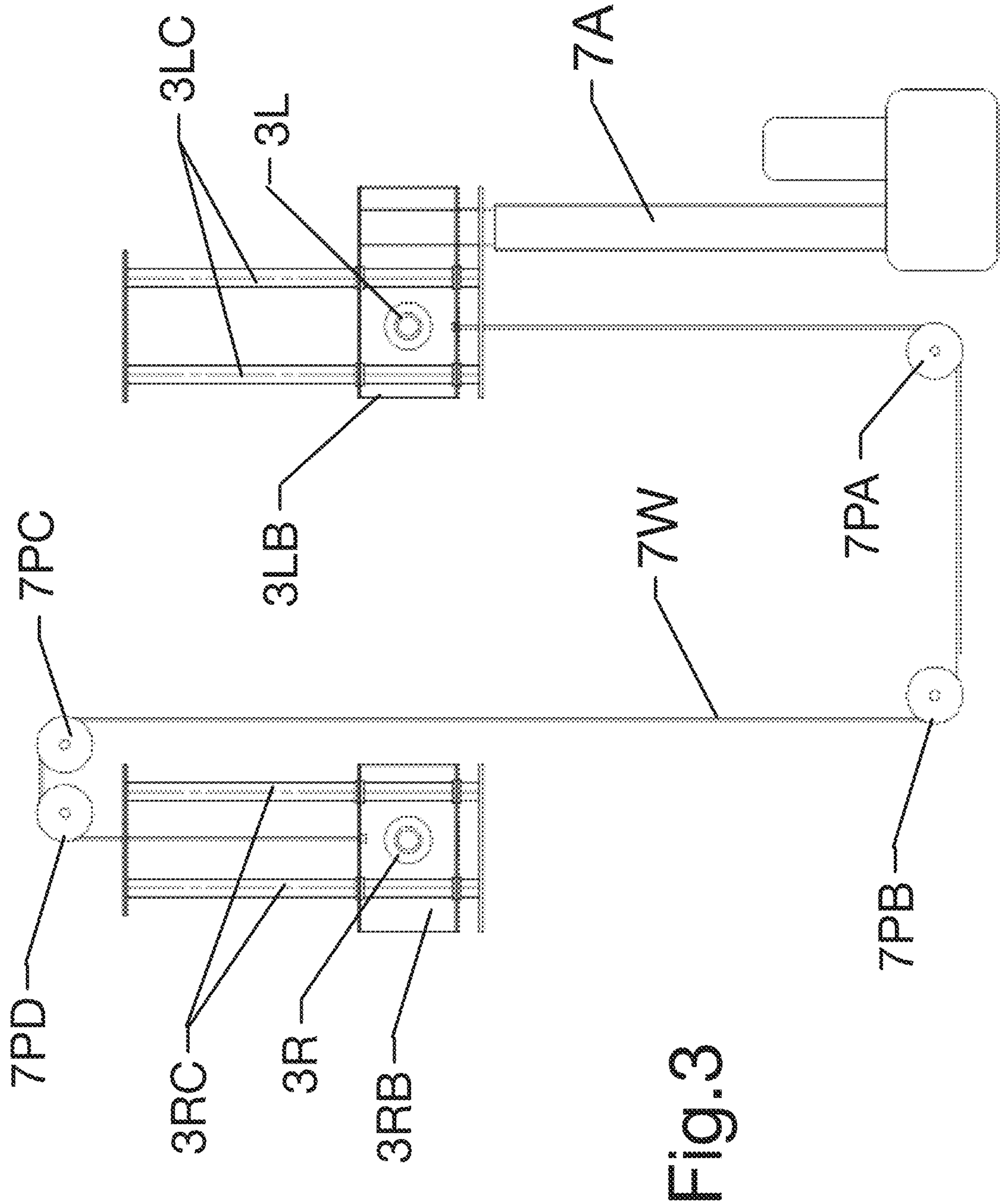
FIG. 3 illustrates one embodiment of a system for varying the height of the fixture head in an improved fixture design as illustrated in the prior Figures.

FIG. 3 illustrates one of many possible mechanical embodiments. The head attachments include brackets 3RB and 3LB that ride on parallel shafts 3RC and 3LC disposed vertically in the standards 2L and 2R, and that mount bearings 3R and 3L for the head's tilt axis. Bracket 3LB is coupled to one end of a linear actuator 7, whose lead screw is disposed in the standard, parallel with columns 3LC. Extension of actuator 7 pushes bracket 3LB up shafts 3LC. One actuator, powered or cranked) could be provided for each standard. FIG. 3 illustrates a shared actuator 7. Cable 7W, attached to bracket 3LB at one end, is routed downwards and crosses through the base from pulley 7PA to pulley 7PB. From pulley 7PB, the cable 7W is routed upwards through the other standard to pulleys 7PC and 7PD at the top, then downwards to attachment to bracket 3RB. As will be seen, when actuator 7 pushes bracket 3LB up, the cable system pulls bracket 3RB up as well.

While providing the necessary variable head height, the disclosure has many advantages over prior art: greater stiffness to reduce undesirable deflection; the ability to depress the head deeply during operation, and to lower the head while also substantially vertical, producing a compact form factor for transport and, as such, no need for assembly and disassembly to do so.

Figure 4A:
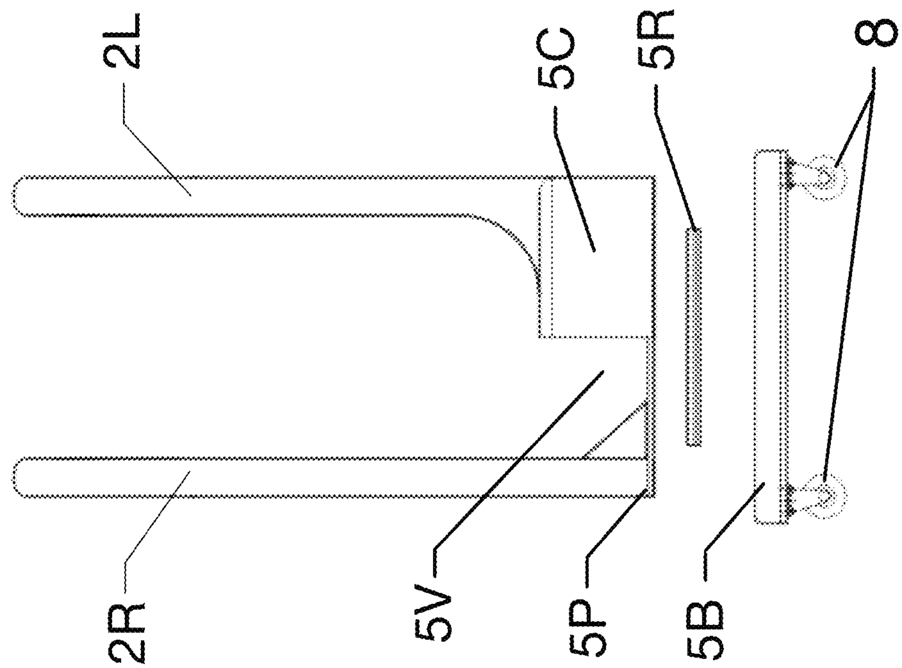
FIG. 4A is a split and exploded front elevation of one embodiment of the improved fixture design as illustrated in the prior Figures, showing a pan bearing and a volume in the base suitable for electronics both with and without a cover.

FIG. 4A illustrates a unit whose azimuth/pan rotation is provided for by a large circular bearing 5R (or other method), between an upper base portion 5P to which the standards 2R and 2L are rigidly attached, and the non-rotating portion of the base 5B, which in contact with the floor; improving stability by reducing deflection and play relative to prior art stand/yokes. Volume 5V, here defined under cover 5C (and which can be above and/or below any pan pivot), can accommodate power supplies, the lamp ballast, motor drives, etc. This has advantages including integration into a single unit; the considerable volume available without increasing the size or weight of the head; and thermal isolation from heat produced by the lamp.

The illustrated embodiment can be moved fully assembled while in a minimum footprint. Casters 8 on the base 5 permit it to be rolled into position, with or without being enclosed in a protective case. A split, "clamshell" roadcase can be applied and removed without lifting. Outriggers 6 can be inserted or folded down for stability before operation.

Figure 4B:
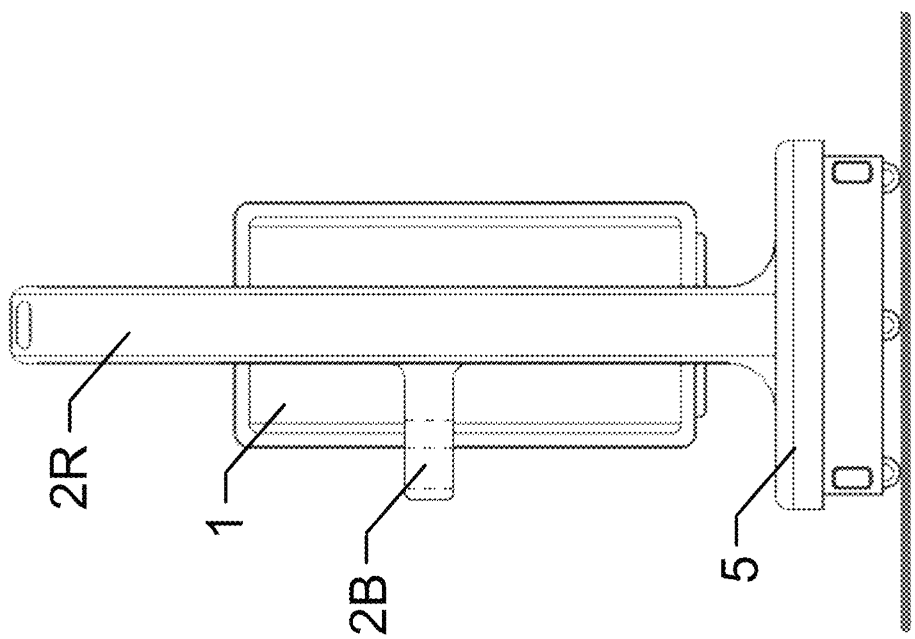
FIG. 4B is a side elevation of one embodiment of the improved fixture design as illustrated in the prior Figures, with the head vertical and at minimum height showing a brace connecting the two vertical standards.

As illustrated in FIG. 4B, additional structure (e.g., a brace 2B that might be U-shaped in plan view) can connect the two standards to further increase stiffness, without materially impacting the ability of the operator to tilt the head through the necessary operating range (including to vertical for storage and shipping). Such additional structure can be made foldable or removable when desired.

While the illustrated embodiments show the head displaced vertically on separate brackets along fixed standards, a U-shaped yoke or sub-frame to which the head is mounted for tilt can itself ride vertically along fixed standards to change head height. Similarly, the tilt pivots can be attached at the top of vertical members that can be extended/telescoped upwards, relative to lower members fixed to the base.

Alternatively, adjustment in height at the tilt pivot can be afforded by varying the elevation of substantially the entire fixture relative to the floor, rather than only the fixture's head relative to its base, such as by using scissor type lifts or motorized screw jacks, which lift both.

Operating Controls

Followspots provide for manual adjustment of beam parameters such as size, shape, intensity, color, and focal length using internal subsystems actuated by short control handles extended through the housing. Because followspots are often the brightest (if not the only) fixture illuminating the featured performers, the effect of such manual adjustments are very visible and, except in the hands of skilled operators, can be clumsy.

The efforts required in physically aiming a followspot are often conflict with simultaneously adjusting other beam parameters, as is often required during a high-speed transit from one subject's location to the next, or to compensate for changes in distance to a moving subject.

Handles on the head, provided for lifting and directional control, are generally far from the controls for parameter adjustments. Parameter adjustment controls are generally neither placed nor suitable for directional control and, in any event, using them for directional control can result in unintended changes to their settings.

In one example of the difficulties of multi-parameter manual control, certain event and performance types (for example, ice shows) include subjects that move rapidly across a rink or arena floor. The result (in addition to the challenge of keeping a followspot's beam on a moving subject) is a drastic change in fixture-to-subject distance ("throw") and therefore in both beam size at and intensity on the subject as the distance changes.

For example, a change from 100 feet to 300 feet not only effectively changes the beam diameter at the subject by a factor of 3, but also, if uncompensated, changes beam intensity by a factor of 8 (a particular problem for video cameras). Manually adjusting beam size, simultaneously with pan and tilt, while also accurately stabilizing intensity, is not practical with current followspots.

Problems with manual execution of parameter changes include with their timing and duration, relative to changes executed by the operators of other followspots (as between two and twelve followspots, each with its own operator, are used on many larger productions); with the wishes of the lighting designer; and with parameter changes in non-followspot fixtures under the control of computerized controllers. In most cases, verbal commands, relayed over an intercom system to the followspot operators, are the archaic method still used for coordination, with predictably uneven results.

Over the last century, proposals have been made, and sometimes reduced to practice, of motorizing and remotely controlling one or more beam parameters of a manually steered fixture, such as by a controller at another location.

Synchronizing parameter changes of multiple followspots with such supervisory control reduces the operator to a mere "driver", unable to react quickly and constructively to their subject's actions when stored values or a supervisor cannot.

Objects of the invention include addressing these issues.

Figure 5:
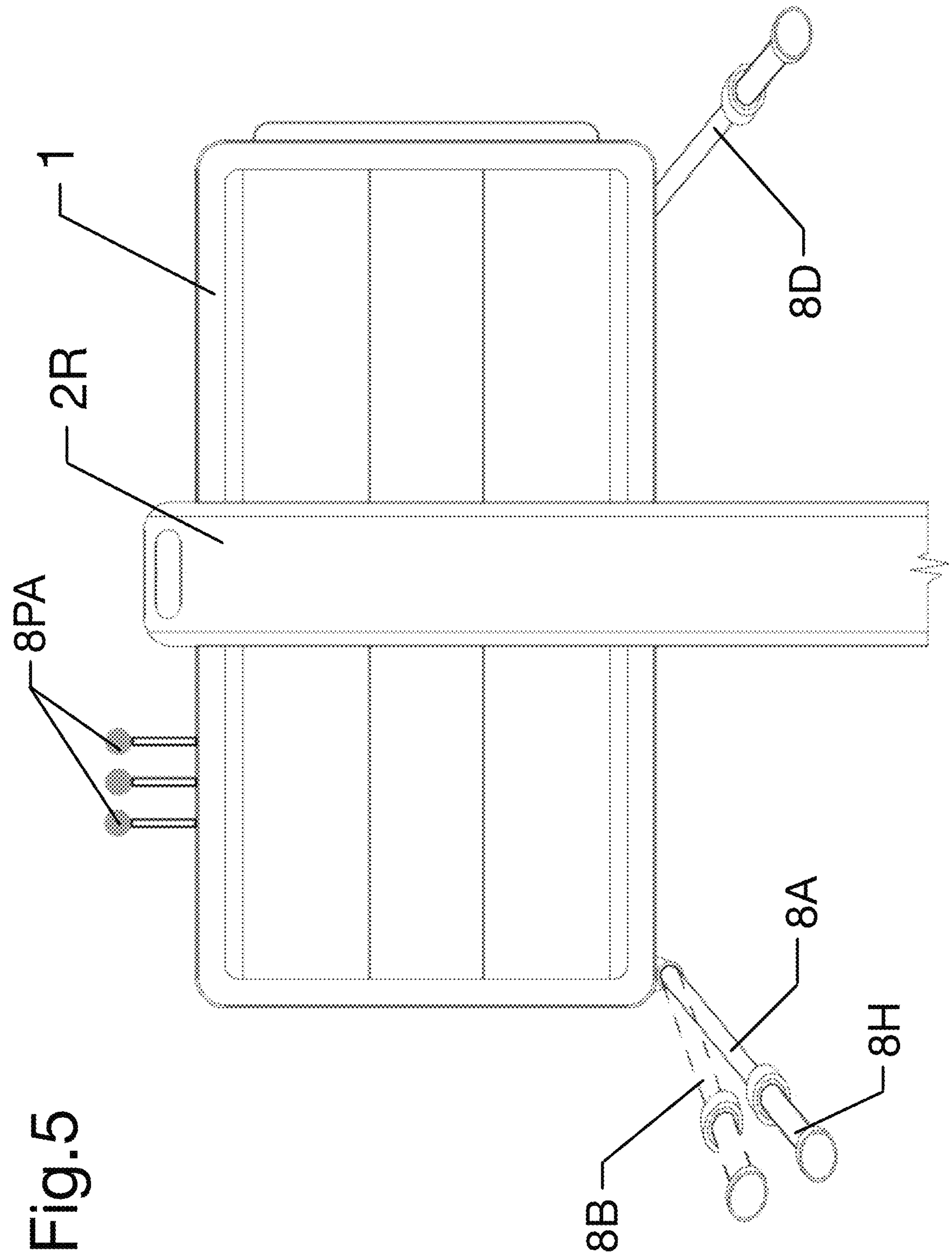
FIG. 5 is a side elevation of one embodiment of a improved fixture design, showing extended handles for directional control that are changeable in location and adjustable in angle.

As illustrated in FIG. 5, extended handles can be provided for aiming/pan and tilt adjustment, that have multiple possible attachment points to the housing (e.g., 8A and 8D), allowing the operator to be positioned on either side of the fixture or at its rear. Handles are adjustable in length and angle for operator comfort and efficiency (e.g., as 8A and 8B), and can fold into or close to the head for shipping.

Importantly, controls can be provided on the handle at their grip (e.g., 8G) for various beam adjustments. Thus, the operator can make necessary adjustments to other beam parameters while maintaining, literally, their "grip" on the fixture for directional control. Handle-mounted parameter controls can be coupled to their mechanisms mechanically or be motorized.

Figure 6:
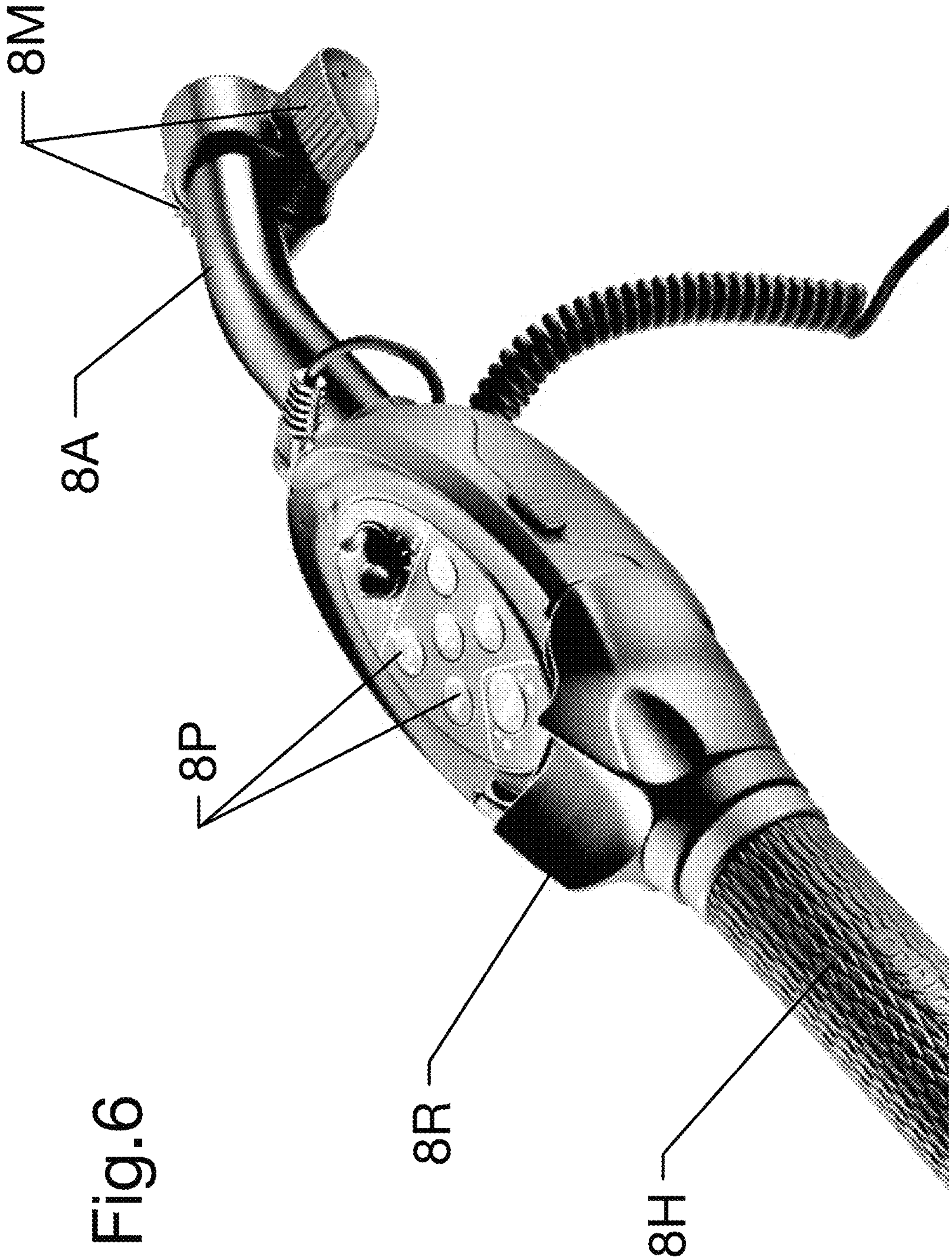
FIG. 6 illustrates a commercially available "pan bar" controller for video cameras which can be used in fixture parameter control.

FIG. 6 illustrates one method of providing controls for other parameters on the same handle that is used for directional control, here an aftermarket "pan bar" controller for video cameras (e.g., model SKU MVR901EPLA as offered by Manfretto of Upper Saddle River, New Jersey). Several options for electronic interfaces are available, including the LANC digital standard. The interface protocol can be readily interpreted to supply parameter values to a fixture, including in DMX-512 format, and to control and/or modify function, range, priority, and effect.

One improvement is the use of incremental controls that permit "loading" parameter values, whether stored and/or input from other hardware, such that operators can "take" control at the current value and modify it.

An improvement is the use of self-nulling rate-of-displacement controls, such as either mechanical controls having a spring return to center (e.g., thumb-operated control 8R), or Hall Effect types having little or no physical displacement, but producing output values that vary with the amount of force applied. Thus, a parameter value is unaffected until an operator applies force to the actuator, the parameter value increasing or decreasing depending upon the direction applied, and the rate of increase or decrease upon the amount applied. Unlike purely incremental controls, this approach inherently ramps or "feathers" the rate of change at the beginning and end of an actuation, smoothing the operator's execution of it.

Further, the amount of force or speed of displacement can also be used to produce non-linear changes in parameter value. For example, in controlling intensity, the amount of actuation can result in a smooth, fading change in intensity, of a duration determined by amount. However, an abrupt, forceful application can trigger an immediate jump to full value (a "bump") or to off (a "blackout"), or a fading change at a rate determined by a stored and/or an external-generated value, including one changing over time.

Automatic Adjustments and Execution

Useful adjustments difficult or impossible to perform with prior art followspots can be automated.

For example, by mapping a followspot's location in 3D space, azimuth and elevation sensed from its current direction can be converted into an estimate of the distance/"throw" to the subject lit (based on a presumption of a level surface/"Z-axis", or as modified by a 3D model of a stage or other area that accounts for varying terrain height/"Z"). "Throw" calculations can then be used to generate adjustments/corrections to parameters, including to beam size and intensity, that maintain substantially constant absolute values at the subject despite changes in throw (or to produce another desired outcome). Adjustments can be specified as an absolute value at the subject, for example, as a diameter in feet or intensity in footcandles, including with calibrations on a manual control or entry or recall of a numeric value (including from an external controller). The fixture will then be adjusted to produce the specified size and intensity (and/or edge sharpness, or other value) at the current throw, and will maintain it (if so desired) when the throw changes (including compensating for the different conic sections resulting at different incident beam angles).

Including in (but not limited to) such a system, fixture focal length, iris diameter, and dowser settings can be optimized for specific purposes, such as maximizing intensity for a given diameter or range of diameters at a given throw. For example, maximizing focal length before resorting to reducing iris size. Parameter values can also be associated with locations and zones, resulting in specified values there.

"Spatial awareness" can also be used for other purposes. Boundaries can be defined that trigger automatic dousing of the beam to prevent undesirably lighting pre-defined "no-go" areas. When shutters are provided to trim one or more edge of the beam, their blades can be rotated to maintain a defined relationship, such as being parallel to a stage edge, when the fixture is located off-axis, and to be automatically rotated and inserted so as to crop the beam at such boundaries.

When two or more subjects, each lit by one or more fixture, move close together, the "piling up" of multiple beams produces an increase in total light levels that is undesirable for video. Because the disclosed system "knows" subject and fixture locations and commanded beam characteristics, the intersection/overlap of multiple fixture beams can be modeled, as can the resulting cumulative intensity, and one or more fixtures be automatically adjusted in brightness, size, edge, and/or shape to compensate (including with assigned priorities, such as based on the relative locations of the subjects, for example, the fixture assigned to the closer subject maintaining its values, while others "defer").

Calculating fixture location in 3D space to produce the azimuth and elevation values necessary for beam intersection at a given point/subject has been known since the Syncrolite system of Keny Whitright in the early 1980s. Such techniques are also used in systems that automatically follow performers wearing emitters, such as Whitright's AutoPilot system as introduced in the early 1990s.

Followspot location and direction can be determined with precision by equipping the head with a pointing laser. In setup, the laser is aligned manually (or detected) on two or more targets that are a specified (or entered) displacement apart. Commercially available laser rangefinders can also be used in calibrating the fixture location, supplying not only the included angles between the two targets, but the length of the long sides. They can map 3D terrain, including by automated scanning. Terrain models can be linked to a scenic automation control system to update topology, and the location coordinates of a subject that is or is on a moving scenic element supplied. One or more "read heads" with photometric sensors can be placed for measuring intensity, color temperature, and other beam variables. Aiming (manually or automatically) a fixture's beam at one such sensor can remotely provide photometric data, including for adjusting values. The system can scan the beam across the sensor, not only to map deviations across the beam, but as an aid in locating the fixture in space and in modeling its response to input values. The sensor can itself be mounted on a motorized support to orient automatically towards the fixture being measured. A wireless read head can be "walked" through an area of interest to map light levels and characteristics and the contributions of individual fixtures determined by modeling and/or varying their level. Such data can be use to automatically vary the beam characteristics of one or more fixtures at points in the area and/or in transits within it to achieve desired objects.

Azimuth and elevation data from a lighting fixture that is manually pointed by an operator at a subject (whether physically with "hands on" the fixture or using remote motorized control) can be used to determine and adjust the azimuth and elevation of beams from other, unattended lighting fixtures required to intersect the same subject.

Thus, one manually steered followspot can also be used to steer multiple fixtures motorized in pan and tilt such as, for example, are supported above the performance area, replacing short-throw "truss" spots and their operators, with many benefits.

Multiple manually steered followspots can, when desired, share coordinates to synchronize their movements.

Desired parameter values can be selected in real time by an operator and/or commanded from a supervisory controller. The next desired value(s) can be preset or "loaded" from an external device, an onboard control, or a stored value with execution triggered independently, either by the operator or from a supervisory level, including synchronization with non-followspot fixture controllers.

The speed of parameter changes initiated by an operator can be subject to values dictated by a supervisory controller. For example, a DMX-512 value can specify the rate or duration of a parameter change that is triggered by the operator, which value (and therefore rate or duration) can be changed over time.

Parameter change duration can also be made conditional on whether the beam is visible.

When the fixture beam is "doused"/off, adjustments made in beam parameters are, of course, not visible. When the beam is visible, adjustments made in haste can be distracting. Pending changes in parameter values (such as in size or color) that are desired once a fixture has been redirected to a new or different subject (a "pickup") can be triggered automatically when the fixture's beam is doused during the change in direction. Similarly, an abrupt change/acceleration in direction can be interpreted as a quick move to another subject, and the beam automatically faded out, ready to restore automatically on deceleration or by the operator on arrival at the new position.

Rather than depending solely upon a supervisory controller to determine and store desired beam parameters for later reuse, an operator can be allowed to use their local controls to set values, and the desired values can be uploaded for storage and/or stored locally, referenced to another value used as an identifier/reference. The identifier (such as a known "cue number" or time code, including as might also be used in non-followspot lighting control) can be supplied from the supervisory level, including by the use of values in DMX-512 slots. Thereafter, an appropriate cue number, time code, or DMX value from the supervisory level (or entry locally) can access those stored values.

The succession of beam directional values (whether native azimuth and elevation angles for a fixture or its subject's spacial coordinates) that are required to "follow" a subject manually can be stored for later display and recall, and other beam parameter changes stored with them. A previous "pass" of manually-steered beam motion (i.e., the beam's path) can be recalled for display, editing, and/or re-execution, and the profiles of other beam parameters adjusted both for such stored recall and during subsequent manual passes along the same or similar path at the same locations. Values can be referenced to time, cue numbers, and/or an externally generated time code.

Data in addition to parameter values can be stored and/or exchanged. For example, where the fixture or its controller has a video display, the operator can be presented with a stored picture/still to identify or remind them of their intended subject. Text descriptions ("cue sheets") can be presented to the operator, as well as being entered and edited both locally and over a network including at the supervisory level, such that a database of both parameter values and notations/commentary can be developed and shared.

Improved Directional Control

Other improvements relate to beam directing, whether by physical manipulation of the fixture itself by an attending operator or via remote control.

At the distances or "throws" at which they are generally used, followspots magnify the undesirable impact of even small errors and irregularities in aiming, from whatever cause. The dynamics of prior art traditional followspots have also generally better suited the application than have some recent remote control systems.

A prior art attended followspot's head is a moment arm, the operator most productive when applying force near one or both ends of the housing, away from the pivots. If the head can be (and remain) well-balanced on low-friction such pivots, then the physical effort required to move it is reduced, relative to its considerable size and mass, and, in the hands of a skilled operator, the necessary resolution/accuracy in pointing can also be achieved.

The desired beam diameter range for a followspot is typically centered around the height of a human subject. Therefore, to maintain a similar beam size range in different followspot models that are intended for different ranges of fixture-to-subject distance, both the source wattage and the effective focal length of the optics must both increase with throw-resulting in physically larger, longer, and heavier fixture heads for "long throw" models.

The large mass of such a large followspot head requires the attending operator apply a significant "push" effort/input to accelerate it from rest, and a counteracting "pull" effort to decelerate it from motion to an accurate stop at the desired new angles. That is, in a point-to-point move, the operator must accelerate the head from rest into momentum and then actively restrain/decelerate it again to rest. When an operator is called upon to track or "follow" a moving subject, continuous management of the head's mass and of its resulting (and varying) inertia is part of the skillset required.

This inertial component can also serve to dampen the effect of at least some unintentional inputs and hardware deficiencies.

In many applications, followspots generally illuminate subjects within a defined performance area of limited size, such as a stage, therefore, setting limits on the range (and speed) of angular adjustment required.

The greater the distance between a followspot and such an area of interest, the narrower the angular range and higher the resolution of angular control required, but the brighter and therefore larger has been the fixture needed; one having both a longer moment arm and greater mass/inertia for/to control, allowing greater precision.

Conversely, for those followspots used at short throws (e.g., for side- or back-lighting subjects, and often hung from the same overhead "truss" structure employed for unattended fixtures), the range of angular adjustment required is much larger and the maximum speed required to traverse it often greater, but a far smaller and lighter fixture can be employed; one easier to so control in these circumstances.

A modern high-powered moving light aimed remotely using a relatively compact and low mass input device, such as described in U.S. Pat. No. 9,593,830 B2, has very different dynamics.

For example, with such an input device, an operator can accelerate their angular input far faster than a large motorized fixture can execute it in real time. This "decouples" the fixture's motion from the operator's input, leading to their conclusion (based on the apparently insufficient results of their input) that not enough was applied. The operator compensates by inputting for more angular change. High input acceleration can also produce head speeds with their own inertial effect, exceeding the ability of the fixture's drives to maintain control. For one or both reasons, the beam overshoots the intended target, at which point the operator dumps in reverse, corrective input. (Experienced operators act on muscle memory for the amount and speed of force required to set a traditional followspot in motion.) The results are not satisfactory.

There are times when a followspot must remain fixed at a specific location/pan and tilt. An attended fixture or a remote input device free to move might not remain at such a stop without muscular effort by the operator, which can still result in some undesirable motion.

In the case of traditional attended followspots, clamps are provided for pan and tilt, to immobilize the head, whether during fixture assembly/disassembly or for maintaining a desired angular adjustment.

Such clamping features also typically offer a narrow band in which some friction or "drag" is applied, attenuating the amount of head motion produced by a given force input, reducing some undesired motions and improving control.

However, clamping and unclamping to quickly fix a head position—much less alternating clamping with quick and careful adjustment to the exact lesser degree of friction required to reduce unintended motion and optimize motion control—is impractical.

The performance of both attended and remote followspots can be improved.

Long used in smoothing the motion of film and television cameras in the "fluid head", angular displacement can require forcing a working fluid through an orifice whose size can be varied to adjust the amount of resistance presented. A simplified approach employs, essentially, a peristaltic pump (e.g., Welco, Ltd of Tokyo, Japan) coupled across a pivot axis. The tubing inside, normally used in pumping fluids, is connected in a closed loop including a valve, which, adjusting resistance presented to the fluid flow, adjusts resistance presented to motion. A still simpler embodiment employs a resilient solid, rather than a fluid-filled tube, with the degree of "pinch"/pressure applied to the solid being adjustable to change the resistive effect.

Another approach, more closely reproducing the inertial effects of a traditional followspot, couples an axis to a flywheel system. Although the flywheel weight itself can be small, gearing or other means can be used to multiply its effect. The ratio between head angular displacement and flywheel rotations can be made variable. Indeed, bicycle-style gearing, complete with cable-connected operating levers on the handles grasped by the operator for head control/steering can be employed.

Braking at desired temporary stops can be provided by the same or other mechanism, such as magnetic clutches or disc brakes.

Control can be improved by interposing gear reduction between the operator's manual input and the resulting head movement. In one example, head tilt is controlled by handles attached at a yoke rather than to the fixture head, driving a gear, belt, cone, or other drive that reduces the angular rotation of the head around the tilt axis resulting from a given relative angular displacement of the handle; effectively increasing the resolution of the operator's control. Preferably, the ratio can be made selectable/adjustable, so as to permit choosing the ratio appropriate. By varying that ratio, control travel can, desirably, be made less or greater than the resulting head angular displacement, depending upon current needs.

Other approaches can be electro-mechanical/electronic. The attended fixture head or remote input device can be equipped with actuators or brakes capable of applying back-force or resistance to the manual input by the operator, which can be made variable.

Importantly, for any followspot parameter adjusted, a smoothing, resistance, damping, or other effect provided to modify the manual input by an operator can be made both variable and conditional. Where electromotive resistance or back-force is applied, the profile of its application can be made to duplicate the dynamics of an actual or theoretical manual followspot. In doused point-to-point movement, the effect can be markedly decreased in the interests of minimum transit time.

Actuators used to provide back-force on an attended fixture or remote fixture input device can also steer the fixture to prerecorded positions/angles, where the operator resumes manual control.

In the case of remote followspots, back-force (as most generally defined) can be used to improve control over the beam, by moderating the dynamic range possible in the operator's input, with the goal of limiting the rate of changes in value sent to the fixture's motion control systems, so as to maintain them within a range in which input value and actual position can remain aligned.

A feedback loop can also be closed between the head position and the input control itself, such that the positions of the input control and the fixture head are locked together, and the operator cannot exceed the ability of the fixture to execute an input. In effect, the operator "feels" the dynamics of the distant head again, and cannot exceed the fixture's motive performance.

Other strategies address other issues with remote fixture control.

Fully-remoted fixtures used as followspots can, desirably, be located closer to the subject than might an attended unit, as well as at steeper vertical angles. This substantially increases the angular range required to cover the area of interest. In the case of fixtures close to and above the area of interest, very large angular ranges can be involved.

The disclosed '830 system enforces a 1:1 correspondence between angular displacement of the input device and the fixture head. Large angular ranges of motion require corresponding displacement of the input device, which is mounted on a tripod so that the operator can circle around the base, and to stand or sit as might be required to steer the input device to the necessary angles, especially as the attachment of the display to the device forces the operator to maintain their relationship to it. Such physical demands on hamper performance.

More desirably, an input device—in whatever form—allows the operator to quickly "clutch in and out" of control of the head to prevent unintended motion and to change the angular relationship between the input device and fixture beam, both in relative terms/offset, as well as to change the ratio of angular displacement between the two based.

At times, absolute positioning of the head by the input device can be less useful than a rate of displacement mode in which actual movement of the input device is minimized, while range is unrestricted. Gross changes in beam angle can also be produced without requiring gross movements of the input device by storing starting locations and triggering an automatic transit to the new location, where manual control is restored, and/or by switching the ratio between input and head displacement for the purpose. A compound approach can be used in which displacement of the input device from a starting position produces angular displacement proportional to the degree of input device displacement at the selected "ratio". As the input device is moved farther, continuous displacement begins. A magnetic clutch or actuator can be used to fix the input device's position or produce a center null with resistance against movement and displacement from that center or force applied can be used for rate of displacement input.

Three or More Axis Beam Adjustment

More generally, a motorized fixture can itself be made better suited to the demands of remote followspot operation.

By definition, followspot use requires a high level of angular resolution and precision in control, as well as a wide range of speeds. Motorized fixtures having the necessary light output will often necessarily be relatively large and heavy, presenting challenges to their motive power, speed range, and precision in a followspot application.

By employing an approach including a mirror and having more than two axes of beam control, and exploiting characteristics typical of followspot operation (as previously described), these challenges can be more readily met. In the following Figures, one embodiment is illustrated.

In the long history of motorized fixtures, a number employing one or more or more mirrors for beam direction have been disclosed or built. Despite the drastic reduction in the amount of motive power required to move a mirror (versus moving the entire head) moving mirror fixtures never gained long-term acceptance for general lighting use, because the range of adjustment in one axis (the included angle between the beam centerline as incident on and as reflected from the mirror) is limited. As the mirror bends the beam back towards the housing, an angular limit will be reached at which the beam leaving the mirror will become occluded by the fixture housing. As the mirror tilts the beam in the other direction, the beam elongates until portions are lost off the edges of the mirror.

Figure 7A:
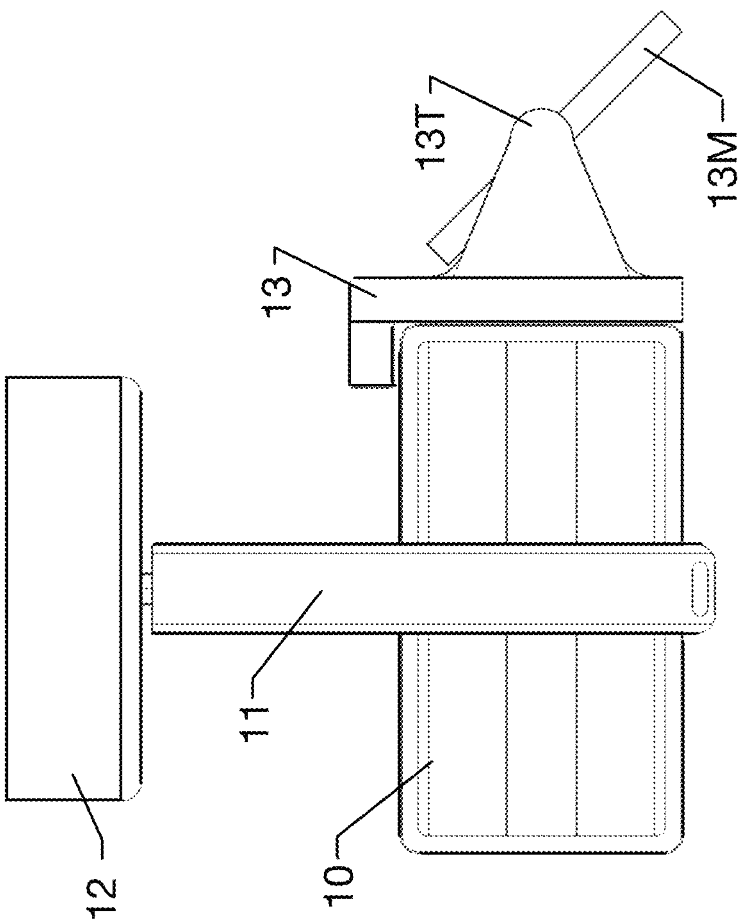
FIG. 7A is a side elevation of a yoked lighting fixture motorized for two axes of pan and tilt adjustment and further provided with a scanning mirror assembly attached at the beam exit.
Figure 7B:
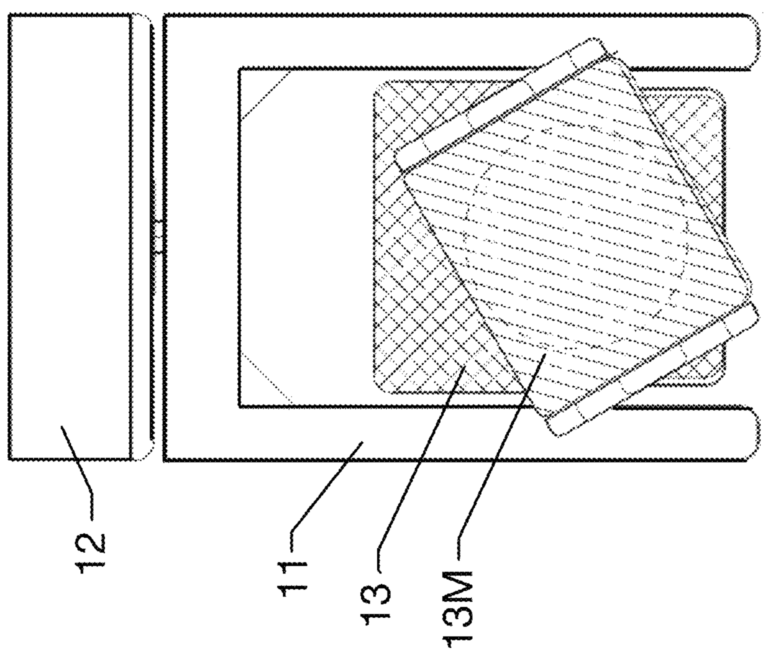
FIG. 7B is a frontal elevation of the fixture and mirror assembly as illustrated in the prior Figure.

In the FIGS. 7A and 7B, a scanning mirror 13M having two axes of adjustment is placed at the beam exit from the head 10 of a fixture. The "mirror turret" 13T illustrated is one adapted to install on a typical moving head fixture. While the "turret" could employ a more typical "L"-shaped pedestal extending forward of the mirror and supporting a two-axis motorized pan and tilt support to which the mirror itself is attached, the embodiment illustrated here employs a large circular bearing centered on the beam's exit from the fixture to which, in essence, a trunnion 13T is mounted.

The illustrated embodiment, however, also provides for at least one additional motorized axis of control for moving both mirror assembly 13 and head 10 together, here a conventional yoke 11 and a tilt pivot providing "head tilt". As illustrated, a pan pivot for both the head 10 and yoke 11 is also shown at the connection to typical "upper enclosure" 12.

In followspot use as previously described, such a compound of moving head and moving mirror has important advantages.

As front-light or back-light to a stage or other performance area, the most frequent and largest angular change is from side-to-side of the performance area ("cross-stage"), which is at right angles to the general venue centerline along which a followspot is often located.

This would seem to require a simple pan, but, with a vertical pan axis for the unit and a tilt angle off horizontal, a simple pan describes a conic section with the beam, so that the operator must also tilt the head to convert what would be an arc, where the beam intersects the plane of the performing area, to the desired, straight, "cross-stage" movement.

The pan function also requires moving the mass of both head and yoke, while a tilt moves just the head.

Therefore, the most frequent followspot operation is one requiring the movement of the most mass, for the greater distance, and with a compensating tilt operation required as well.

Referring to the embodiment illustrated, the use of a mirror with at least one additional axis of adjustment for both head and mirror drastically reduces the motion control demands in typical followspot operations.

With the compound system shown, in the typical case of a front-light or back-light for a limited area of interest, such as a stage, the head tilt function can be used to bring the centerline of the useable angular range of beam adjustment offered by mirror tilt alone near to the center of the beam elevation adjustment range required. Thereafter, most of both axes of adjustment needed during operation can be performed by manipulating the low-mass mirror, without requiring head or head-and-yoke movement.

When the fixture is used in an application in which the larger range of beam adjustment necessary is in beam elevation (for example, in a side-light position onstage), fixture pan can be adjusted so that the head's centerline is at right angles to the subject and head tilt is set to substantially horizontal. Thus, "mirror roll" allows essentially unlimited beam elevation adjustment in the required, larger, range, while mirror tilt provides beam azimuth adjustment.

Motion in head axes can increase the range of adjustment during operation beyond that offered by mirror movement alone. As, for example, mirror tilt is employed to change beam angle nears either the "occlusion" or "overshoot" limit, then the head tilt and/or head pan functions can be engaged to rotate the head in the direction of beam motion, keeping the beam within the practical range of mirror adjustment. Head beam motion can be at a high rate, so as to allow the rate of mirror motion to reverse, moving the mirror adjustment back towards the center of its range. Head motion can be made anticipatory. For example, when the input values, whether from an operator or a tracking system, rapidly accelerate, the inference can be made that a large displacement is likely and both head and mirror motion in the indicated direction be begun.

Both head motion and mirror motion can be used together, with mirror motion used to improve the performance of the larger head drives. Mirror motion can "lead the way", in starting a rapid beam movement, while the head drive(s) ramp up to speed. As the head achieves transit speed, the mirror adjustment can be trimmed. As the input begins to ramp down, control of head deceleration is less critical because mirror adjustments can be used to conform beam trajectory to the input profile, even if the gross movement of the head and its attached mirror assembly cannot.

A mirror turret as illustrated can be readily fitted to an existing motorized fixture, dramatically improving its performance as a followspot.

Imaging Systems

A remotely followspot is disclosed in a prior patent to the applicant, that is aimed with the aid of a video camera at the fixture, whose image is aligned with the beam. Such cameras lack the range of adaptability of the human eye to variations in light level and in contrast. In lighting, the range in light levels and contrast can be dramatic: between a performance area that is lit at low levels (or nominally in a "blackout") and one fully lit by other fixtures; between the target area with the followspot beam "on" and it doused; as well as between the area lit by the beam and the area beyond it can each be extreme and require compensation, if the image is to be useful in aiming.

Various improvements, beyond automatic or manual irising, can be employed.

Either auto-iris or a reflected light sensor with a field of view aligned with the central area of interest can be used to make gross adjustments to camera sensitivity/iris for the general ambient light level. Camera adjustment can be linked to douser setting, with or without being based on a calculation predicting the beam light level expected at the target's subject, based on distance, zoom position, douser setting, and the known effects of various filters; compensating camera sensitivity/iris to better suit. Multiple cameras (and/or streams of processed images from a camera) can be used to compensate for wide variations in intensity within the field of view. One approach is to combine the images from multiple cameras or image processing streams in a single image. The current beam size and shape is determined, and used to create a matte in the camera image corresponding to it. The central/interior portion of the matte is "filled" by an image whose exposure is determined as being appropriate for the current light level delivered by the fixture's beam, while the surrounding area/field is an image determined by the ambient light level beyond it.

A display for aiming can be used for various purposes including showing current parameter values and steering cues to stored locations. A display can be used to allow the operator to access instructions in the use, maintenance, and repair of the fixture in text, graphic, and/or video form. Support can be provided by a "assist" function, permitting audio/video access to support technicians at another location. Status and feedback information derived from various fixture sensors and systems can be collected and reported via internet or by other means to other locations for diagnostic purposes; to suggest preventive maintenance; and for other purposes.

Camera images can be stored as video or a series of still images referenced to identifiers that relate them to angles, locations, cue numbers, or time code for reference.

Improved Beam Modifier

Other improvements relate to beam parameter modification.

It has long been desirable to modify attributes of a fixture's beam such as intensity and color. A variety of approaches have been disclosed and employed for the purpose.

In many approaches, filter material is mechanically inserted to varying degrees (and therefore, effect) into the beam at some point in a fixture's optical path. A challenge is to produce an equal effect at all points across the beam when it reaches the subject-despite the unequal impingement of the filter material at the point of its insertion. Some fixtures have regions in their optical path where such insertion will produce the desired, even effect. When an optical design does not, various techniques have been employed to reduce unevenness, including the insertion from two or more sides of multiple filter segments (or "flags") and/or graduation of the filter in effect.

Figure 8A:
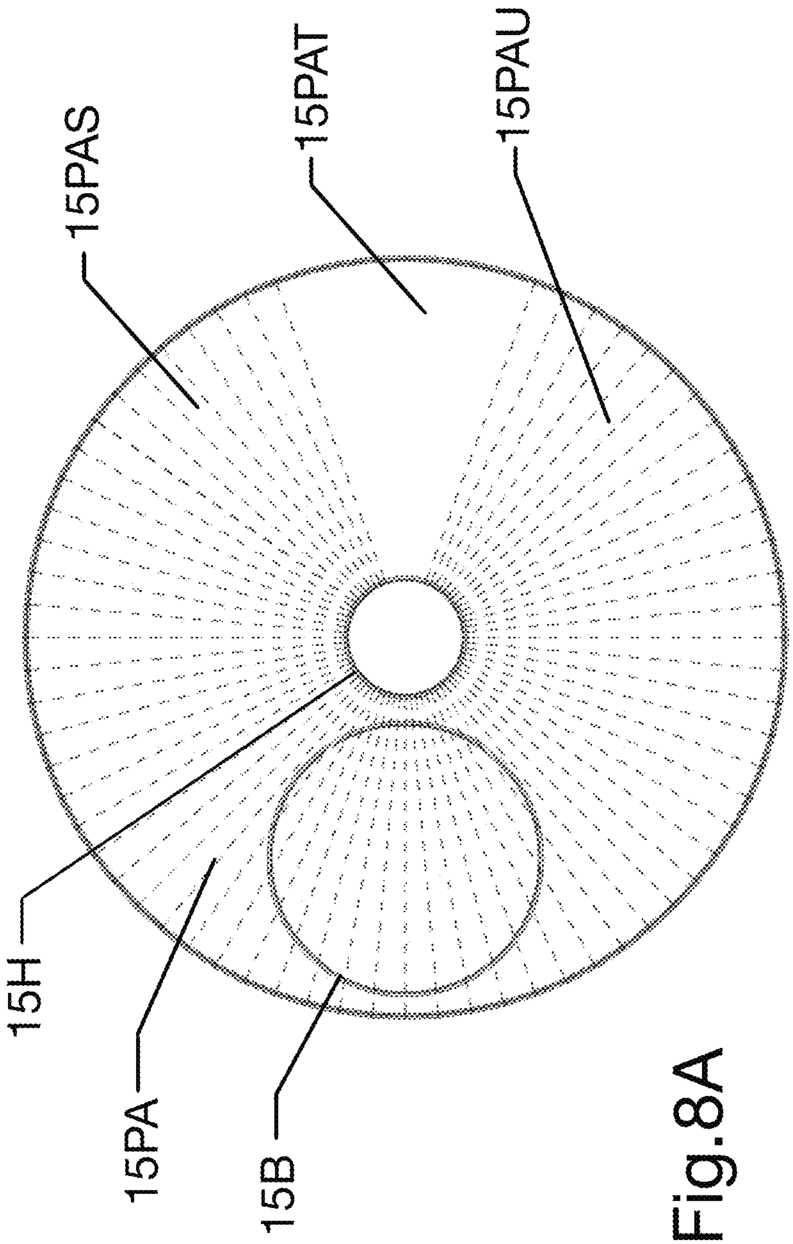
FIG. 8A is a view of a prior art filter wheel having varying effect depending upon its rotation.

FIG. 8A illustrates a prior art filter wheel 15PA graduating the degree of effect along the filter's travel, in this case, around the circular beam path produced by the filter's rotation about hub 15H; from no effect when the light beam 15B is in filter region 15PAT, through increasing effect from region 15PAs through to region 15PAU. By, in effect, lengthening the filter by use of a circular beam path, the degree of variation in its effect across the beam at any given point of its intersection can be dramatically reduced, making more practical the desired evenness of effect at the subject. Graduation may be continuous or stepped, by means including graduation in saturation/effect or by a pattern whose ratio of areas of effect versus of no effect varies.

Even with graduation, when fixture optics and filter location dictate a large beam diameter at their intersection, the variation in filter effect across the beam intersecting it, for a filter of reasonable size, can result in unacceptable variation across the fixture's output at the subject.

In some fixtures, an optical element is needed to mix or "homogenize" the beam to blend out irregularities. In others, this is not practical.

Figure 8B:
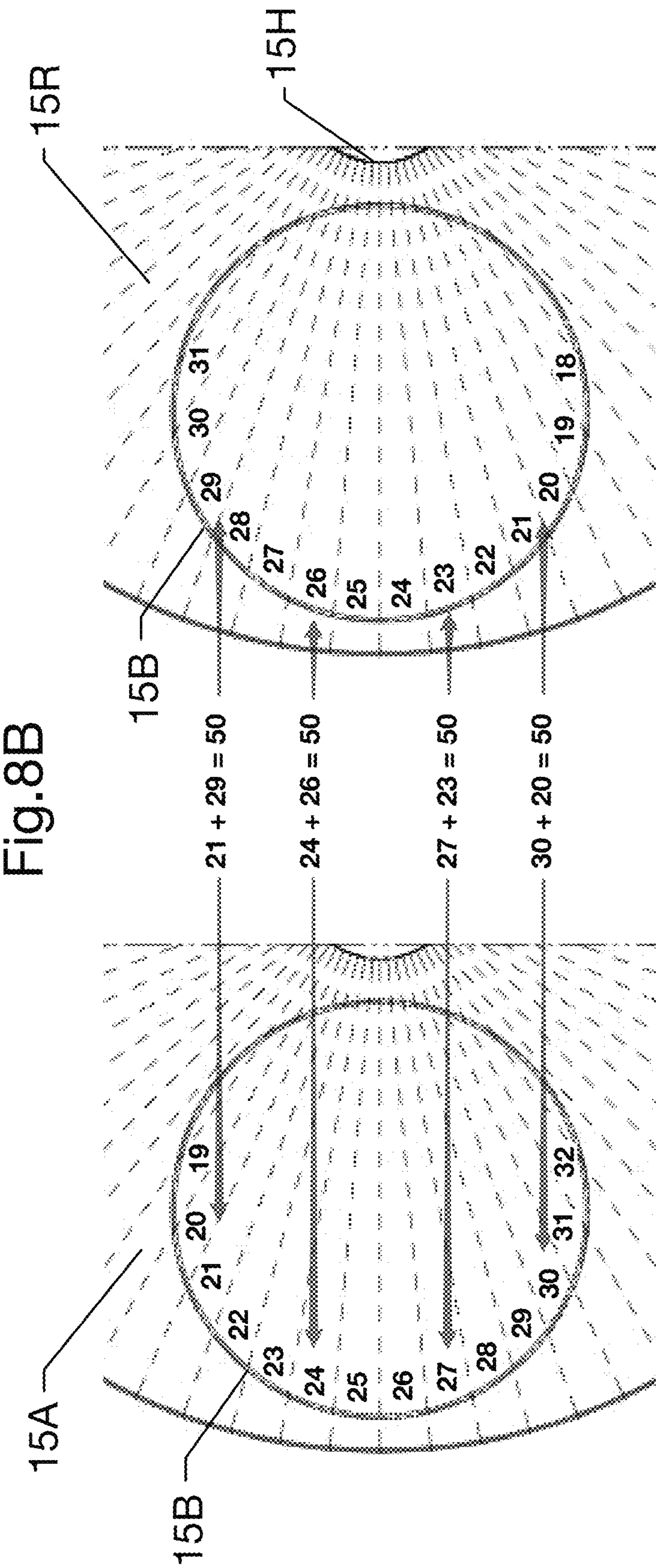
FIG. 8B is an exploded detail of comparable areas of two filter wheels through which a light beam is passing, here having reciprocal variation in their effect relative to the first wheel, such that rotation of both wheels in opposite directions around a common center produces an effect that is uniform across the beam.
Figure 9A:
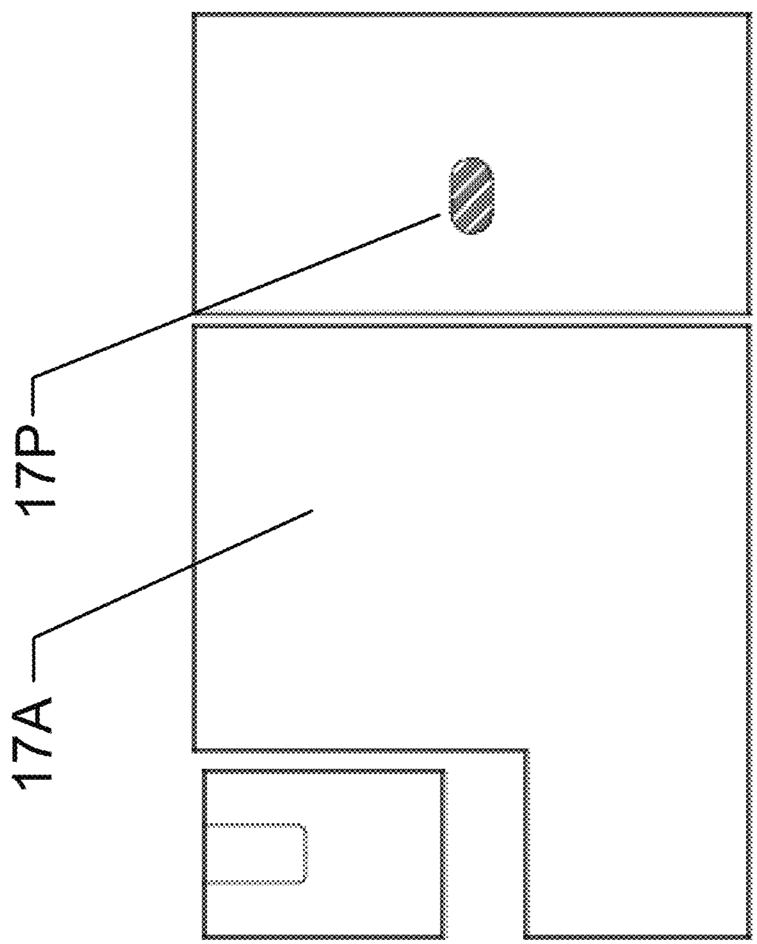
FIG. 9A is a side view of a first connector having a feature used in alignment for mating.
Figure 9B:
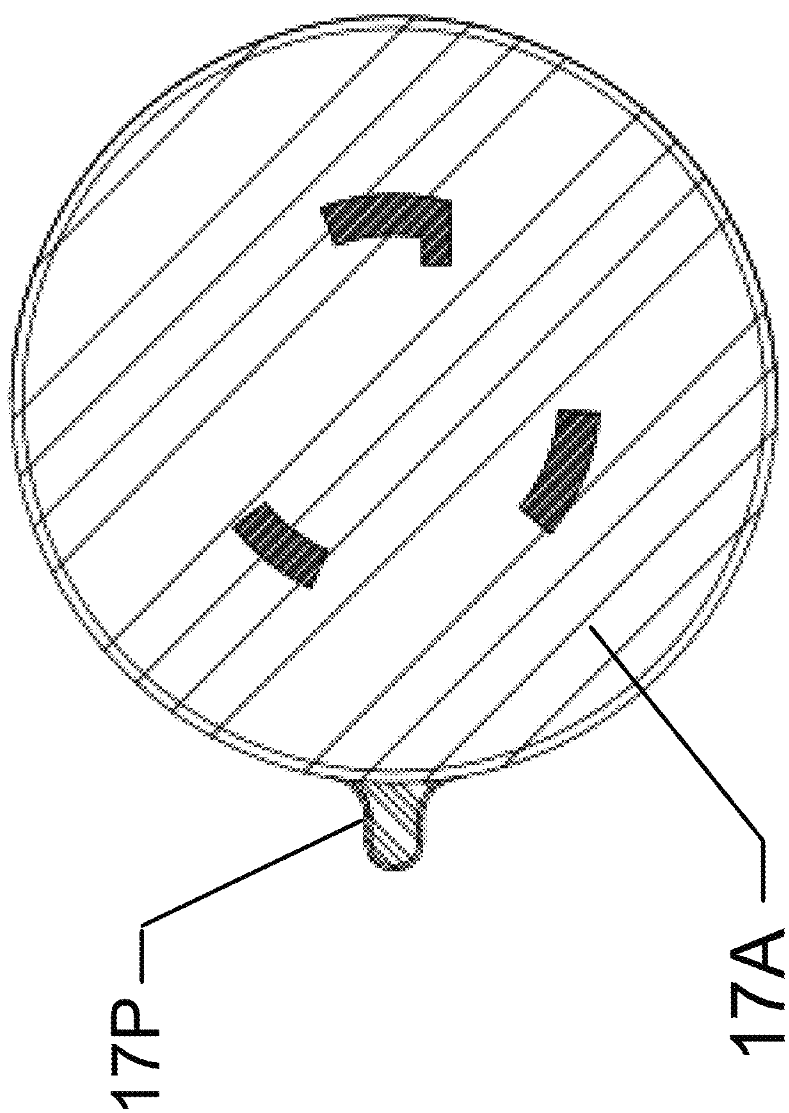
FIG. 9B is an end view of the connector of the prior Figure.
Figure 9C:
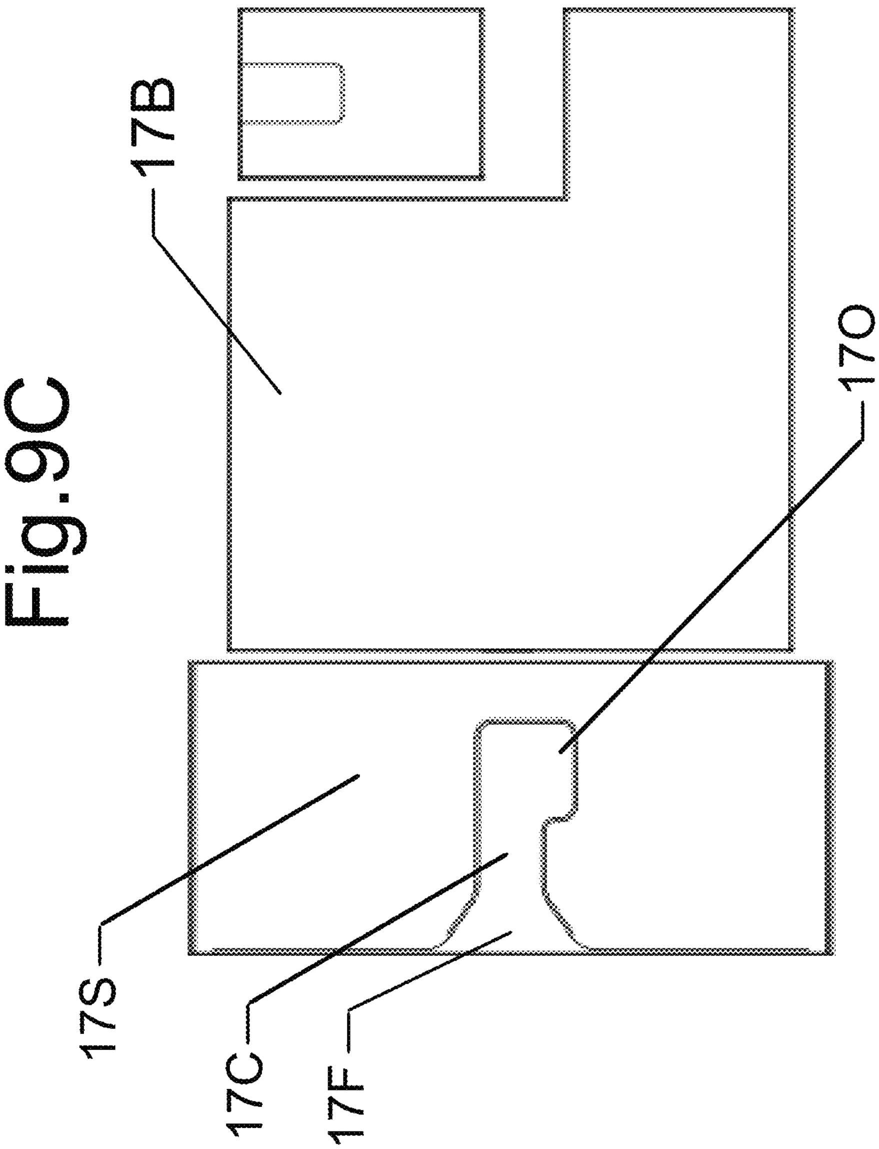
FIG. 9C is a side view of a second connector mating with the first connector of the prior Figures and cooperating with its feature in alignment.
Figure 9D:
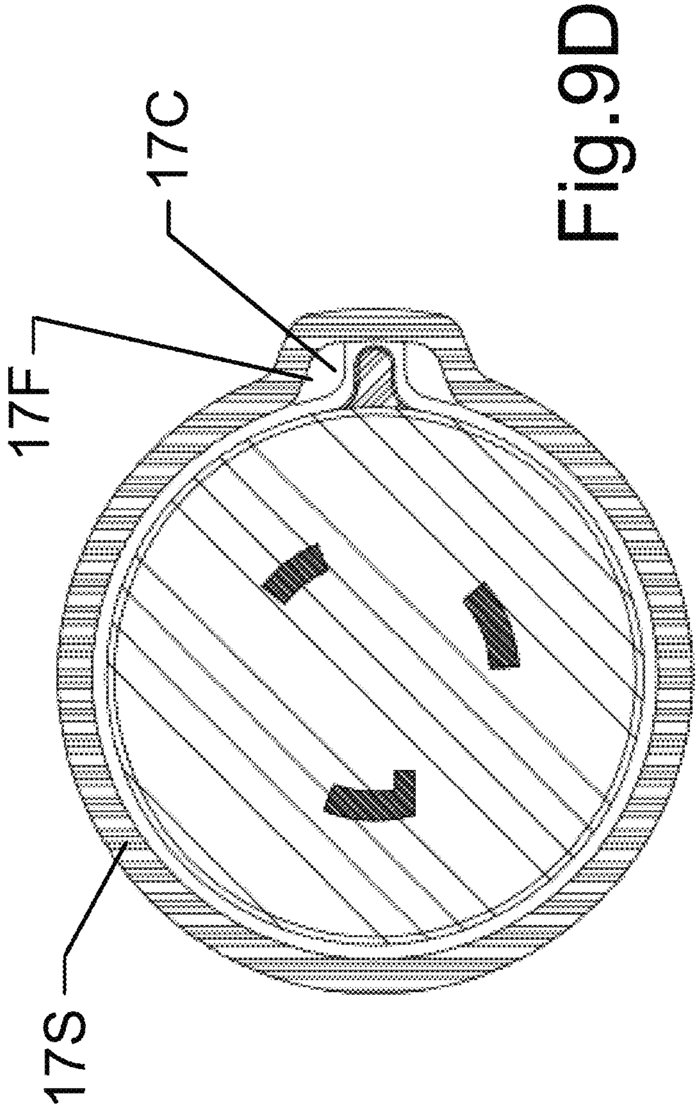
FIG. 9D is an end view of the second connector of the prior Figure.
Figure 10:
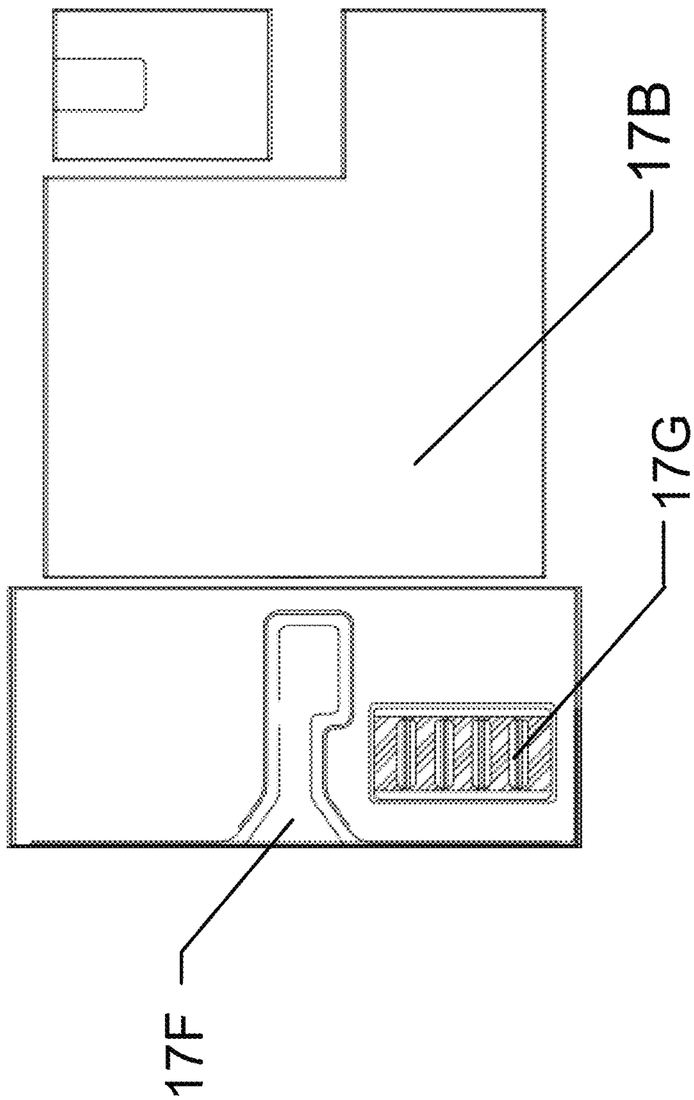
FIG. 10 is a side view of a second connector cooperating with the first connector of the prior Figures.

In FIG. 8B, portions of two coaxially mounted filters 15A and 15R are shown, each filter graduated in effect in at least the region where the beam intersects it. Their graduation, however, is reciprocal, such that the total degree of effect upon substantially any ray of light in the beam 15B passing through both filter 15A and 15R at any one location will be substantially the same as that upon a ray passing through at any other location, because, as illustrated by the formulas between the two filter details, the graduation in degree of saturation/effect on each wheel is the inverse of the other. Rotation of the wheels in opposite directions will produce a gradual change in effect, equal across the entire beam. The same filter wheel can be used, with one "flipped", or two wheel designs. The distribution of filter effect can be adjusted to compensate for beam divergence or convergence in the path between the two wheels. Other filter designs and actuations (such as linear, rather than rotary displacement) can be used.

Prior difficulties with uneven distribution across the beam at the subject are addressed, and without need of "homogenization" of the beam. Because the effect is a sum of both filters, the range in graduation required of one filter is substantially less than that required of a single filter, allowing a smaller wheel.

Improved Power Connectors

Improved methods and apparatus for supplying power and control data to fixtures and to other consumers are disclosed.

Over the last three decades, lighting systems in the U.S. have increasingly employed fixtures operating on 208 volts, distributed using twist-lock connectors, typically the NEMA L6-20 configuration (and to a lesser extent, the L6-15). (Prior to that, the twist-lock connector saw use in some theaters and television studios.)

For all of its extensive uptake, the twist-lock has long suffered from many practical disadvantages.

Coupling a male and female connector requires, first, visual inspection of both to identify the relative rotational orientation of the two; finding the male plug blade having an inward- or outward-extending key or "tang", as well as the corresponding blade opening in the face of the power-side receptacle; then rotationally aligning the two to permit insertion. Once inserted, the connector set might not remain mated unless the user deliberately rotates the connectors relative to each other to nest the extending portions of the male blades behind the face of the receptacle. Workers plugging such connectors don't always twist them to lock, and strain transmitted via the cable can "untwist" and unlock a mated set.

A further disadvantage is the ease with which the exposed male blades can be bent in handling and use. Bent blades must be straightened before connectors will mate. Manufacturers have long offered cylindrical shrouds that enclose and protect from damage the male blades, but the same shroud renders mating more difficult by making the male blades harder to see (and therefore align). Shrouds also prevent mating plugs with typical panel-mounted receptacles.

A shroud can also be flared outward at its open side to steer the two connectors into axial alignment. The shroud can be made of a resilient material, which can be bent or folded back for use with a panel-mounted receptacles, or be spring-loaded to retract.

At least one feature is provided to facilitate rotational alignment of the two, here, a projecting key 17P on one connector 17A and a channel 17C to receive it on the other connector 17B. Both are visible externally (and despite the male blades of plug 17B being shrouded). The channel 17C on the connector 17B (in this illustration) has a funnel opening 17F that captures the key 17P, even if not exactly rotationally aligned, and that steers the two connectors 17A and 17B into such alignment before the male blades reach the receiving openings in the face of receptacle 17B. The channel 17C includes an offset area 17O to allow rotating the pair to lock conventionally—and preventing premature rotation before full mating. Other embodiments in which a feature on one connector "steers" by indication and/or requiring or encouraging physical pre-alignment of the connector blades and of the openings that receive them are possible.

Other improvements relate to assuring that mated connectors lock and/or remain so, without relying upon the user.

Refer now to the following FIGS. 10A-11B.

To the elements of the prior Figures has been added a locking feature, comprising a locking ring 17G, which rotates around the axial centerline of connector 17B and is urged by a spring or other means (not shown) such that tab 17H closes channel 17C sufficiently that feature 17P on connector 17A cannot pass. Tab 17H is beveled towards the exterior side of the channel. As seen in FIG. 10A, at least a portion of locking ring 17G is externally visible and accessible to the user.

Figure 11A:
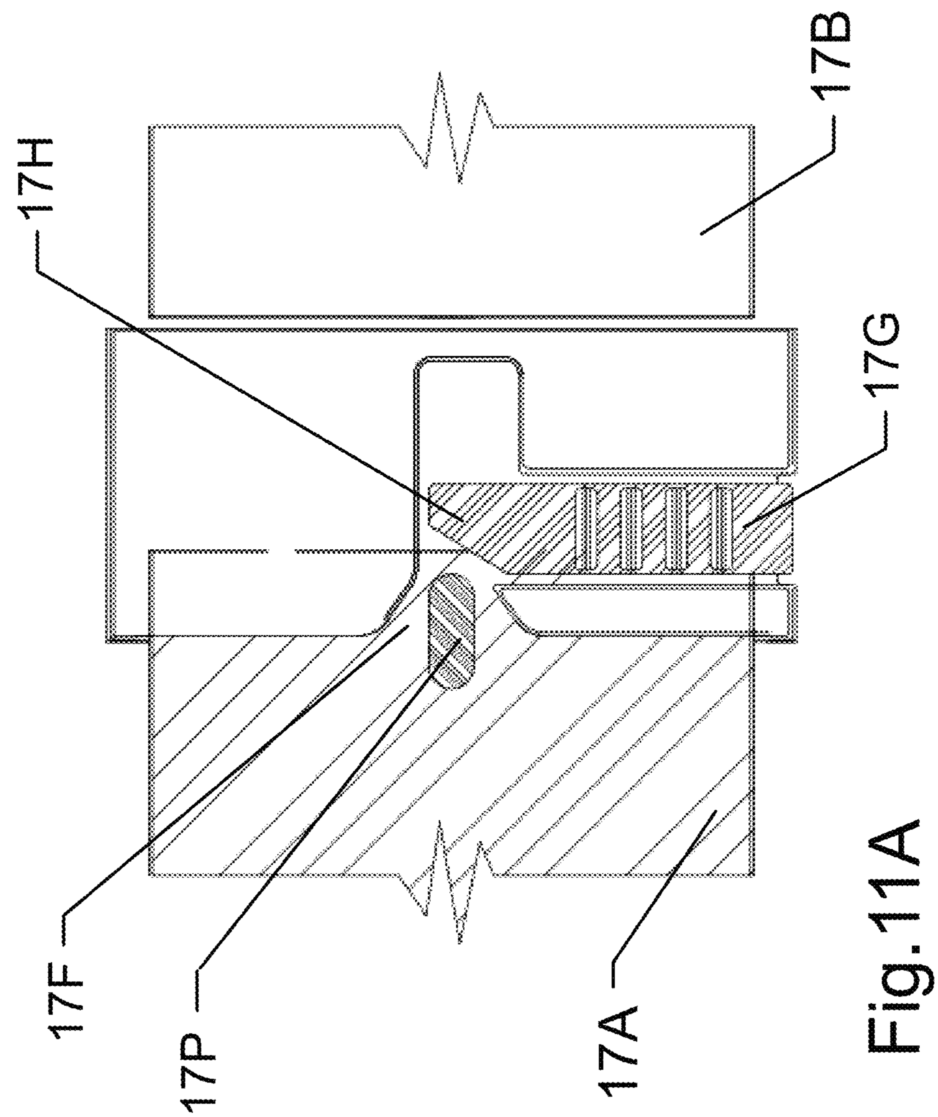
FIG. 11A is detail of the connectors of the prior Figures showing the locking feature of the first connector approaching a ramp on the locking feature of the second connector.
Figure 11B:
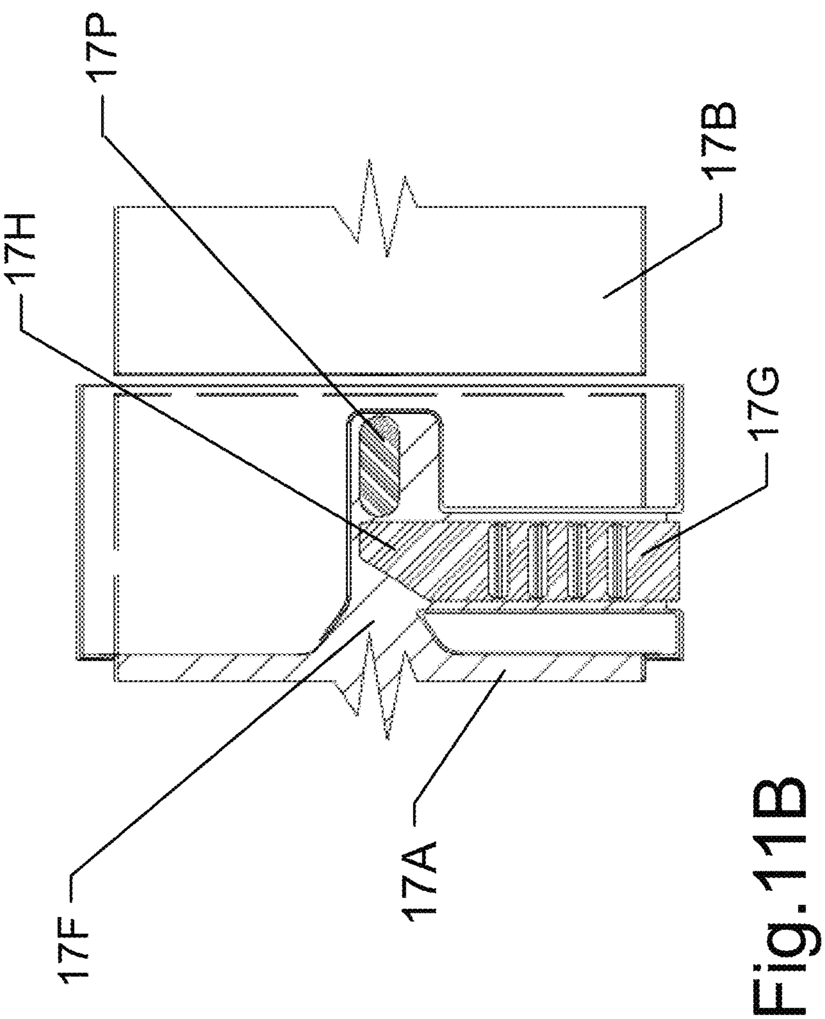
FIG. 11B is a detail of the connectors of the prior Figures showing the first connector, having been fully inserted, the locking feature having engaged.

As seen in FIG. 11A, mating of the connectors will cause the feature 17P of connector 17A to contact tab 17H of locking ring 17G and further pressure will force ring 17G and its tab 17H, against the urging of the spring, to rotate until feature 17P can pass to full connector mating depth. Once past, the spring will act to close locking ring 17G and tab 17H behind feature 17P (as is seen in FIG. 11B), preventing withdrawal/un-mating unless and until the user manually forces locking ring 17G back against the spring to re-open channel 17C.

Thus, the connectors will remain mated and current passed, even if the user fails to twist the mated connectors against each other in the conventional manner.

Other locking methods are possible and some illustrated in the following Figures.

Figure 12A:
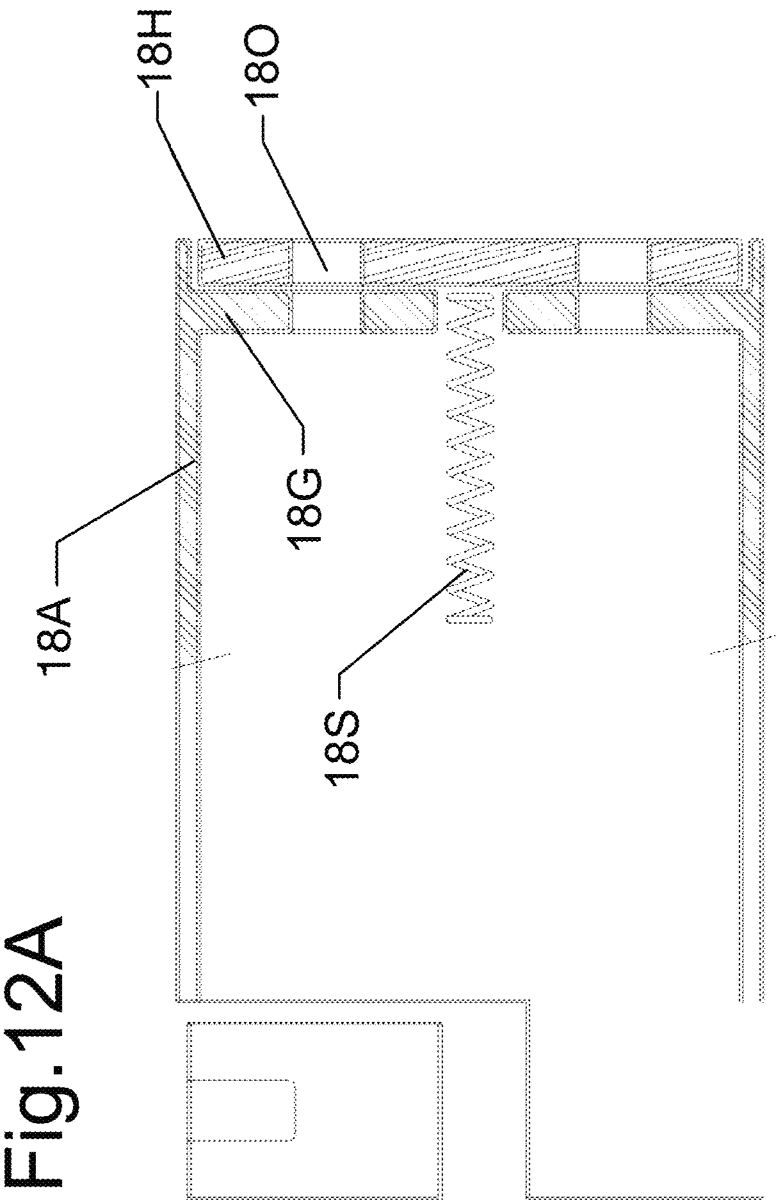
FIG. 12A is a section through an improved receptacle having a shutter that, when not mated, at least partially obstructs the openings that accept the blades of a plug.
Figure 12B:
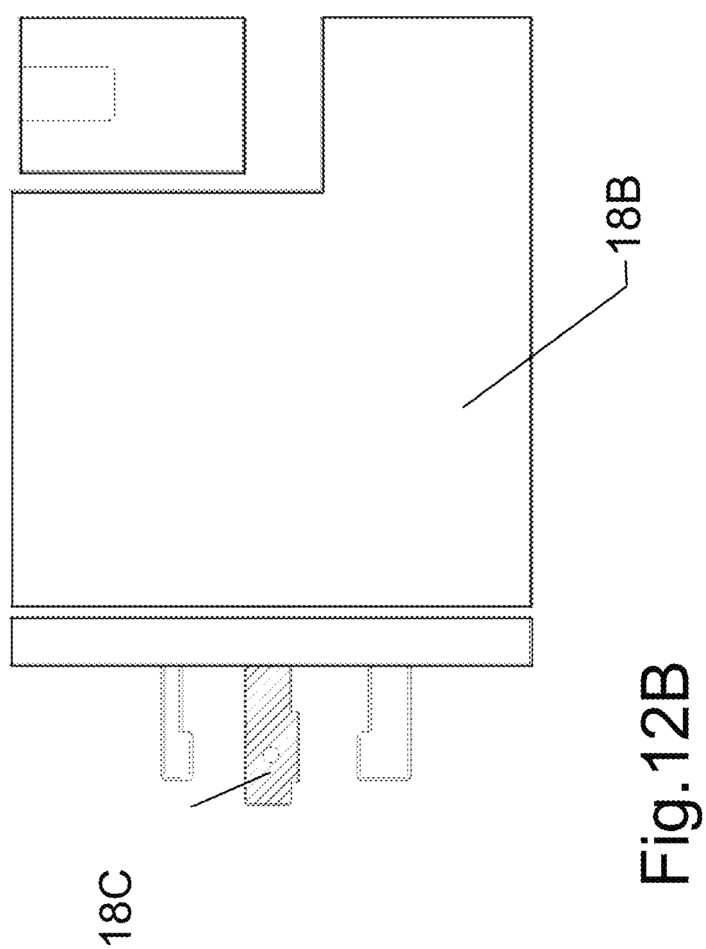
FIG. 12B is a side view of a plug mating with the improved receptacle of the prior Figure.
Figure 12C:
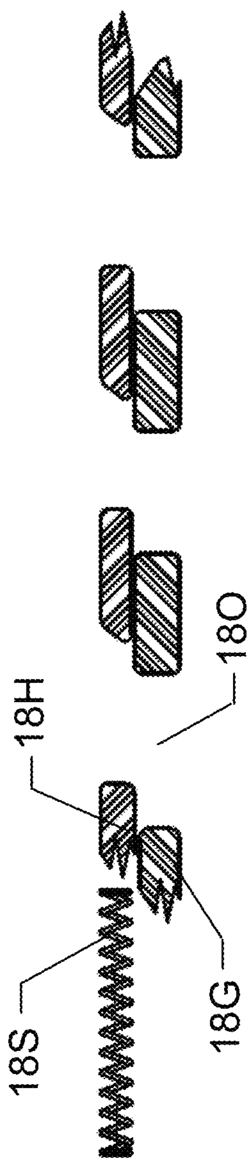
FIG. 12C is an unwrapped cylindrical section showing elements of the receptacle of the prior Figure when not mated.

FIGS. 12A and 12B illustrate one embodiment of a connector set in which the locking feature has been made internal to the female receptacle.

FIGS. 12C through 12F are cylindrical, axial sections "unwrapping" the contact arrangement and openings in the receptacle face to illustrate its sequence of operation.

Figure 12D:
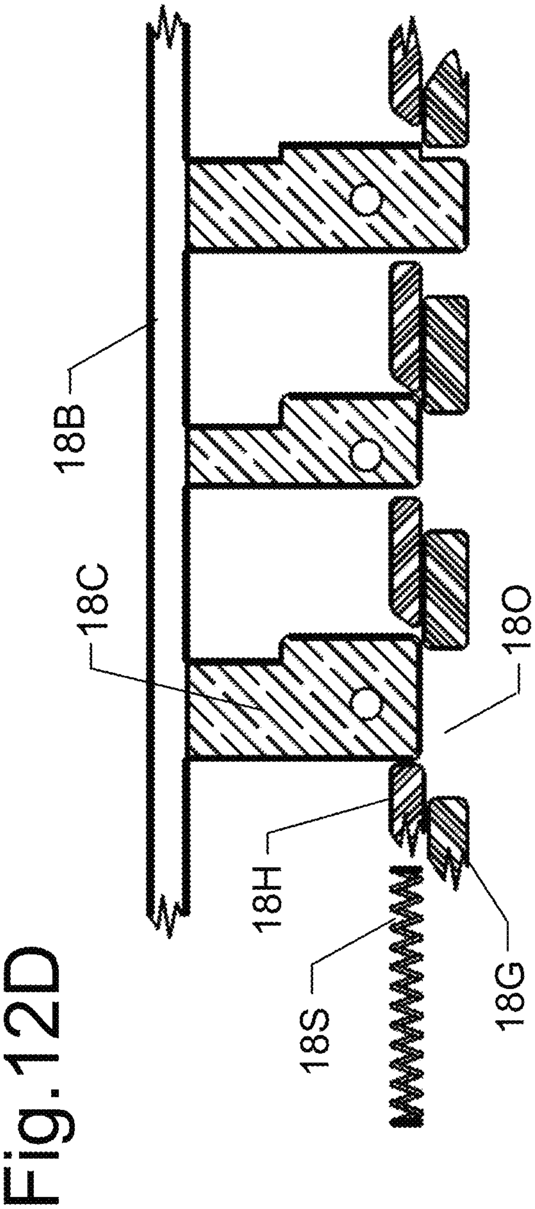
FIG. 12D is an unwrapped cylindrical section showing the offset shutter of the receptacle of the prior Figure blocking insertion of the plug blades into the receptacle.

As illustrated, the face of female/receptacle 18A is divided, at least at the blade openings 18O, into two layers, one of which 18H, hereafter the "shutter", is moveable relative to the other layer 18G. 18H is illustrated as coupled to a spring 18S or other resilient means. Under normal circumstances, the shutter 18H is rotated by the urging of spring 18S to a position in which the openings 18O to receive at least one of male blades 18C of the plug 18B are not aligned with each other, such that the attempt to insert the male blades 18C will be blocked by at least part of the second layer 18G, not being aligned, as is seen in FIG. 12D.

Figure 12E:
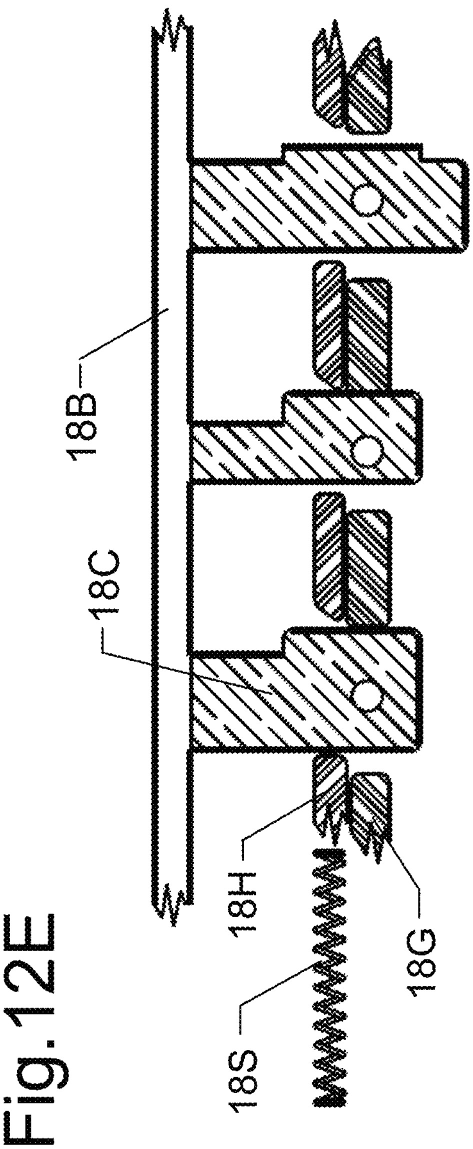
FIG. 12E is an unwrapped cylindrical section showing the shutter of the receptacle of the prior Figures having being pushed sufficiently clear of the openings in the receptacle to admit the blades.

To mate the connectors 18A and 18B, the user inserts the male blades 18C into the partially obstructed opening(s) 18O, twisting connector(s) such that the vertical face of at least one male blade 18C, pressing against the face of its corresponding opening in the shutter 18H, forces (against the urging of spring 18S) the opening in shutter 18H into alignment with the opening in the second layer 18G sufficient to allow the male blades 18C to be completely inserted in the receptacle. FIG. 12E illustrates this permitted insertion in process.

Figure 12F:
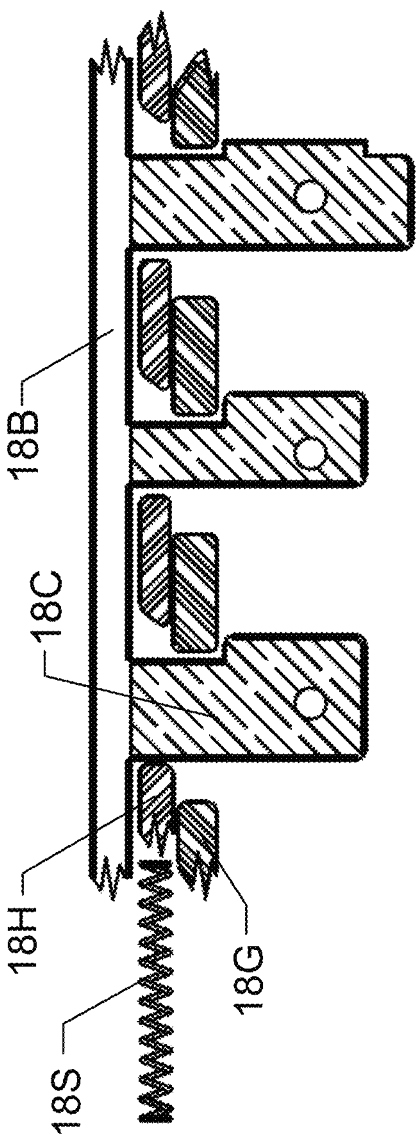
FIG. 12F is an unwrapped cylindrical section showing, the blades having been sufficiently inserted, the shutter of the receptacle closed against the blades to prevent un-mating.

As illustrated in FIG. 12F, upon releasing the connector(s), the shutter 18H, urged by the spring 18S, pushes the male blades 18C towards the locked position, and holds them there against withdrawal.

To unplug the connector set, the user rotates the connector(s) in the un-lock direction in the conventional manner, forcing the shutter 18H back against the urging of spring 18S, permitting the re-alignment of the two layers of openings 18O, such that the male blades 18C can be withdrawn.

Many variations are possible.

Figure 13A:
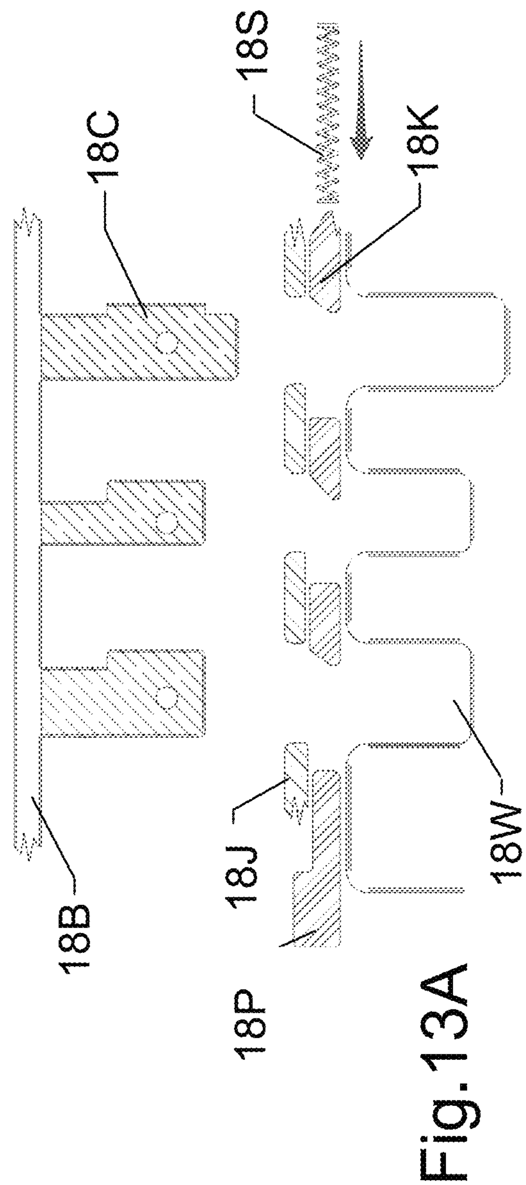
FIG. 13A is an unwrapped cylindrical section showing the receptacle shutter of the prior Figures blocking insertion of the blades into the receptacle and presenting a ramped surface, pressure against which will result in displacement of the shutter, allowing passage of the blades.
Figure 13B:
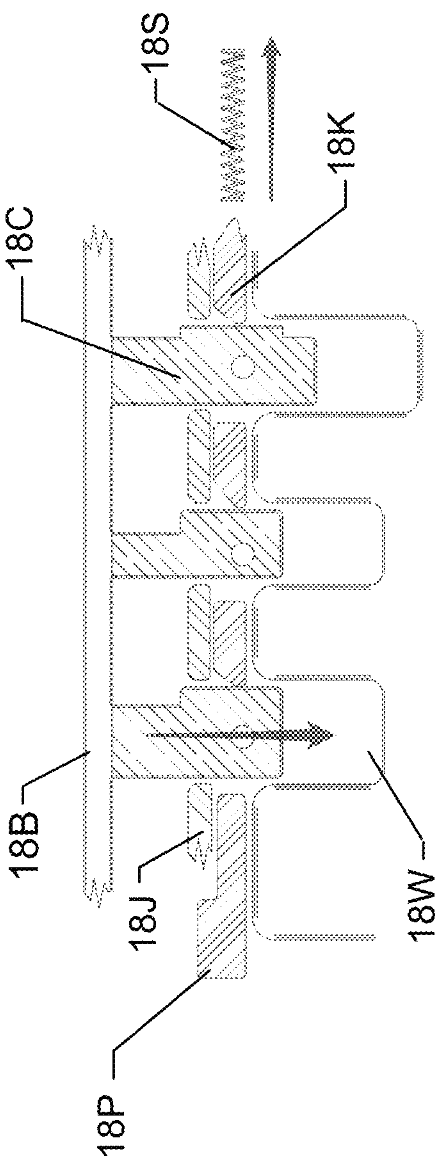
FIG. 13B is an unwrapped cylindrical section showing the shutter of receptacle of the prior Figures having being pushed by the user sufficiently clear of the opening in the receptacle to admit the blades.
Figure 13C:
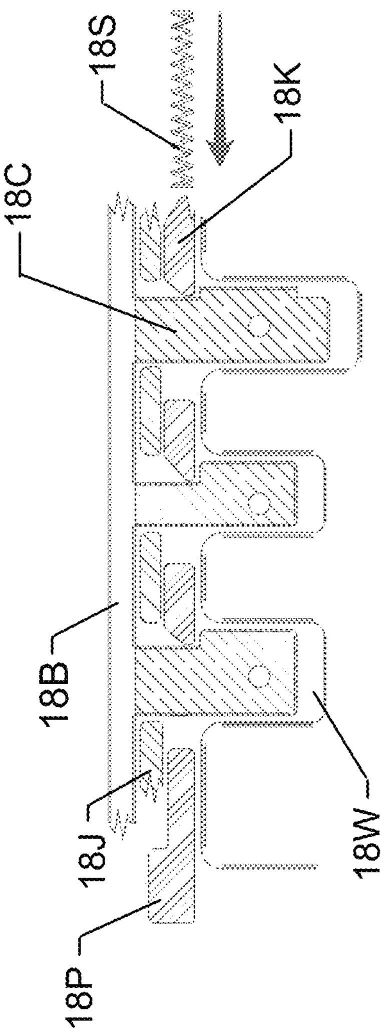
FIG. 13C is an unwrapped cylindrical section showing, the blades having been sufficiently inserted, the shutter closed against them to prevent un-mating.

In FIGS. 13A through 13C, retention is automatic upon insertion of the plug blades 18C into the connector body.

In this embodiment, the "shutter" is the internal layer 18K. Blades 18C bear against a beveled face on shutter 18K which, urged by spring 18S, partly obstructs the openings 18O, pushing shutter 18K aside. Once the wider portion of the blade has been sufficiently inserted, the shutter 18K closes behind it, retaining the connectors together. No locking rotation is required of the user. Yet, the locking receptacle will retain unmodified prior art connectors.

The user can release the connectors by pressing the illustrated button or "plunger" 18P or otherwise displacing the shutter back to align the openings.

Embodiments are also possible in which, for example, the displacement of the retaining element is not rotational but radial, the function of a lock can performed by, for example, a spring-loaded detent that closes behind the male pin after manual rotation to the locked position, preventing unlocking until retracted or released, for example by a button or a ring.

Another locking approach employs a spring-loaded pin that can extend parallel to the axial center of the plug and projects beyond its receptacle-side face. On insertion of the connector, the pin is forced back by the receptacle-side surface against the spring. When the connector(s) are rotated to lock, the pin aligns with a well or steep-sided depression in the receptacle-side surface, into which the spring drives the pin. With the pin (or other feature) in this, extended position, the connector(s) cannot be rotated in the un-locked direction without the user pulling the pin back, using a button or other actuator on the plug body.

Power and Data Distribution

The choice of a twist-lock or other connector for distributing power to automated and LED fixtures began in an era when most commercially-available such fixtures were supplied with a 6-foot line cord to be terminated with a customer's choice of connector. Different users employ different connectors, including for the same voltages. Fixtures with switching power supplies are capable of operating at different voltages, which are distributed by users with different connectors. For these (and other reasons) there was appeal in finding a universal power connector type, one not limited to use at a specific voltage, comparable to the "IEC" connector found on consumer and other electronics, and locking. Neutrik of Schaan, Lichtenstein met the requirement with a "POWERcon" connector, widely adopted.

One drawback of the POWERcon is that a female cable connector will not mate with a male cable connector. Therefore, cables cannot be extended by simply chaining them together without an intermediate adaptor.

Subsequently, Neutrik introduced a "True-1" connector, not intermateable with the POWERcon, but permitting the mating of cord-mounted connectors of the same model.

While both connector types allow unplugging the line cord from the fixture, both for convenience in handling and to allow for substituting line cords with different male power connector types, the line cord, therefore, be undesirably misplaced in handling.

Early automated fixtures dedicated one cable to each fixture, connecting it with a splitter box, which, in turn, was supplied with power and data for a plurality of fixtures via a trunk cable. Modern generic distribution systems seek to share a circuit among several fixtures, within the limits of their own power draw versus the total supply circuit capacity, in order to reduce the quantity of cabling and distribution equipment required.

Figure 14A:
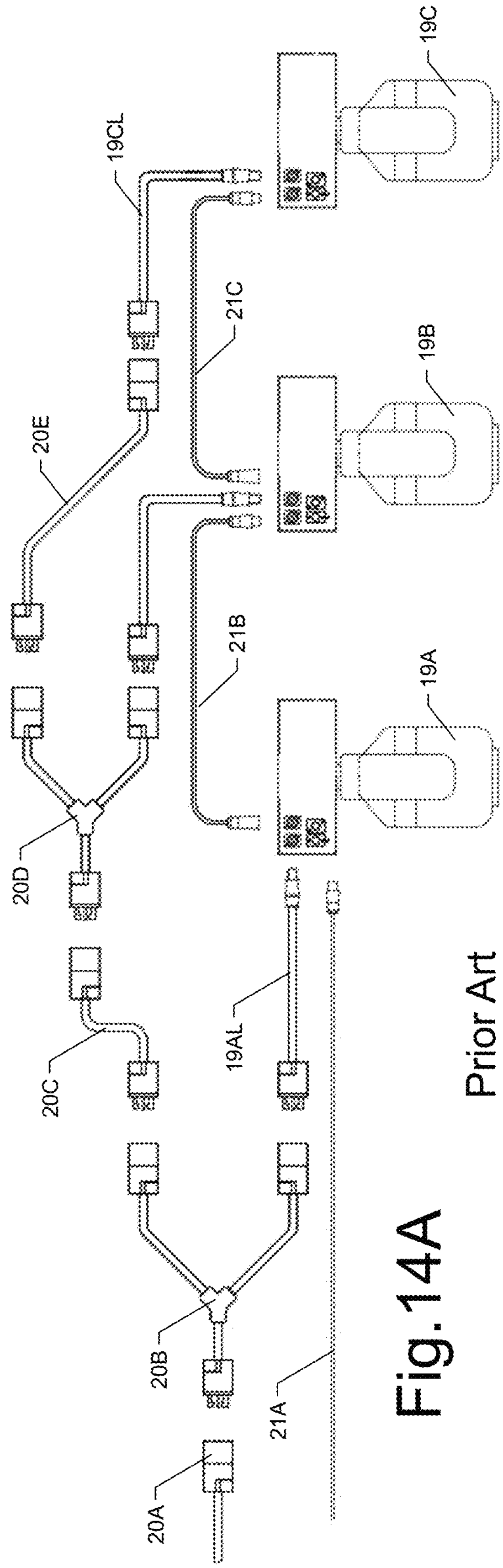
FIG. 14A illustrates the use of prior art cabling to share power and data among a plurality of consumers, such as lighting fixtures.
Figure 14B:
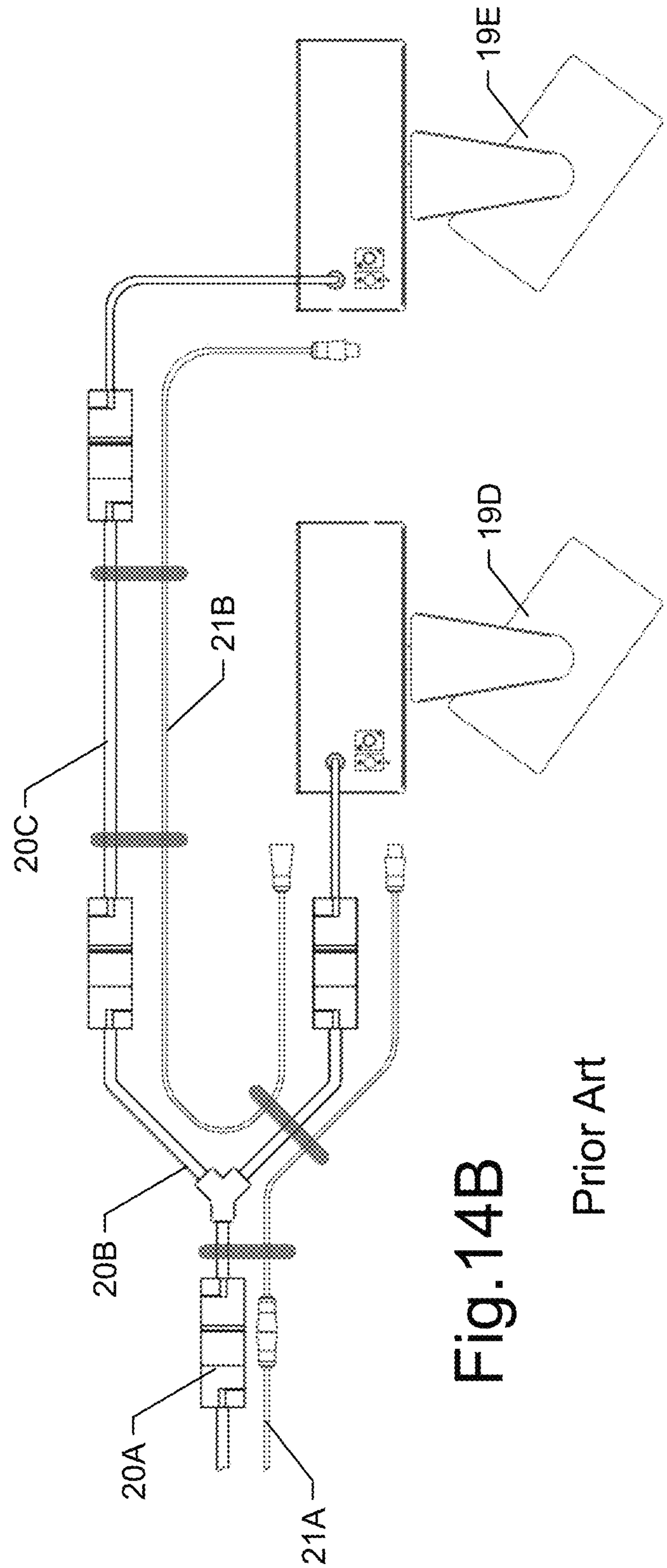
FIG. 14B illustrates the bundling of power and data cabling.

In FIG. 14A, fixtures 19A-19C are illustrated with such separable line cords (e.g., 19AL and 19CL). In FIG. 14B, fixtures 19D and 19E have fixed line cords.

In either eventuality, a power "twofer" (e.g., 20D), which parallels two female output connectors to a single male input connector, supplies two fixtures from one feed. Where the fixtures are spaced apart, for example, on a truss or pipe, an extension cable ("jumper") (e.g., 20C or 20E) might be required to extend to the next fixture.

In control data distribution, the use of an analogous "Y" adaptor is not permitted, as the "stubs" created are a potential source of reflections that degrade data integrity. Data cabling must be "daisy-chained" from receiver to receiver, each fixture or other consumer providing one each male and female receptacle, internally paralleled (as is illustrated here) in the case of data "jumpers" 21B and 21C.

As will be seen in FIG. 14A, sharing power among three fixtures 19A, 19B, and 19C from a common supply 20A, requires two "twofers" 20B and 20D; two power extensions/"jumpers" 20C and 20E; and the mating of fourteen connectors-plus the three connections of line cords to the fixtures. With, in some cases, hundreds of lighting fixtures in a single system, the cost in parts and labor, as well as the potential for failures at each connection, are substantial.

Some fixtures offer, for power, a female receptacle of the same type as the power inlet (both either a POWERcon or a True-1) allowing "daisy-chaining" multiple fixtures together. To do so, extension cables with the corresponding connectors are required, and in a variety of lengths, and of both types.

The need for multiple cables and for different cable types to share power among multiple fixtures or other consumers increases the complexity of the distribution system; the number of components and potential points of omission or failure; and assembly labor. All have various associated costs. Such cabling and related components can undesirably add bulk to the fixture position and can require restraint with tape or tie-line (as illustrated in FIG. 14B) for appearance, to prevent their obstructing fixture motion, and their catching or being caught by workers or by other equipment in transport and handling-further increasing labor. In many situations, fixtures on multiple power (if not data) feeds are intermixed along a supporting structure, increasing the complexity of the cable bundles and their associated costs.

The instant disclosure includes methods and apparatus for sharing power and data among fixtures and other consumers in a more efficient manner.

Figure 15:
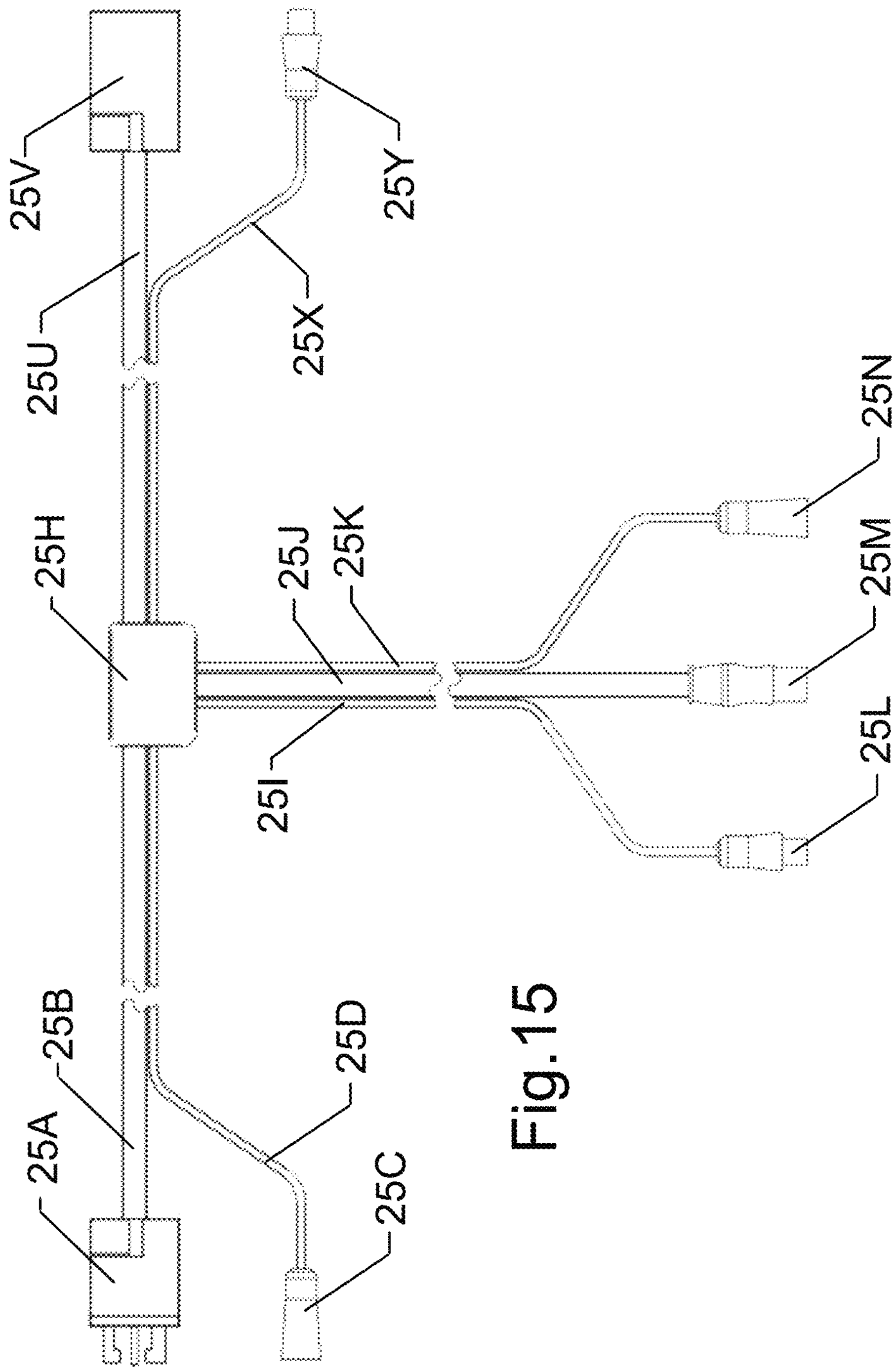
FIG. 15 illustrates an improved unit that distributes power and data.

Referring to FIG. 15, an assembly comprising, in effect, a power twofer, is combined with data cables in a single unit. Two female power connectors 25V and 25M are supplied from a common male power connector 25A. In this Figure, one female power connector 25V is of the same type (here, a twist-lock) as the male power connector 25A, and the second female power connector 25M is of a different type (here, a POWERcon or True-1)—although all connectors could be of the same type. Data cable(s) 25D and 25I connect male data connector 25C with female data connector 25L. Data cable(s) 25K and 25X connect male data connector 25N with female data connector 25Y.

Paralleling of the two power output connectors to the male power input connector can be performed in the labeled "housing" 25H or at the male power connector 25A. The data cables can be molded into a housing or, in one possible embodiment, dressed through the parts of a split housing that organizes discrete power and data cables; one then assembled around them. The data and power cables can be gathered together for at least part of their length by any known means, including co-extrusion, adhesion, taping, heat-shrink, sleeving, or banding. Data pair(s) can be disposed within a common jacket with power conductors and "broken out" for termination in separate connectors near their ends, or by a pendant with the connector for one (typically data) issuing from the backshell of the connector for the other.

Figure 16:
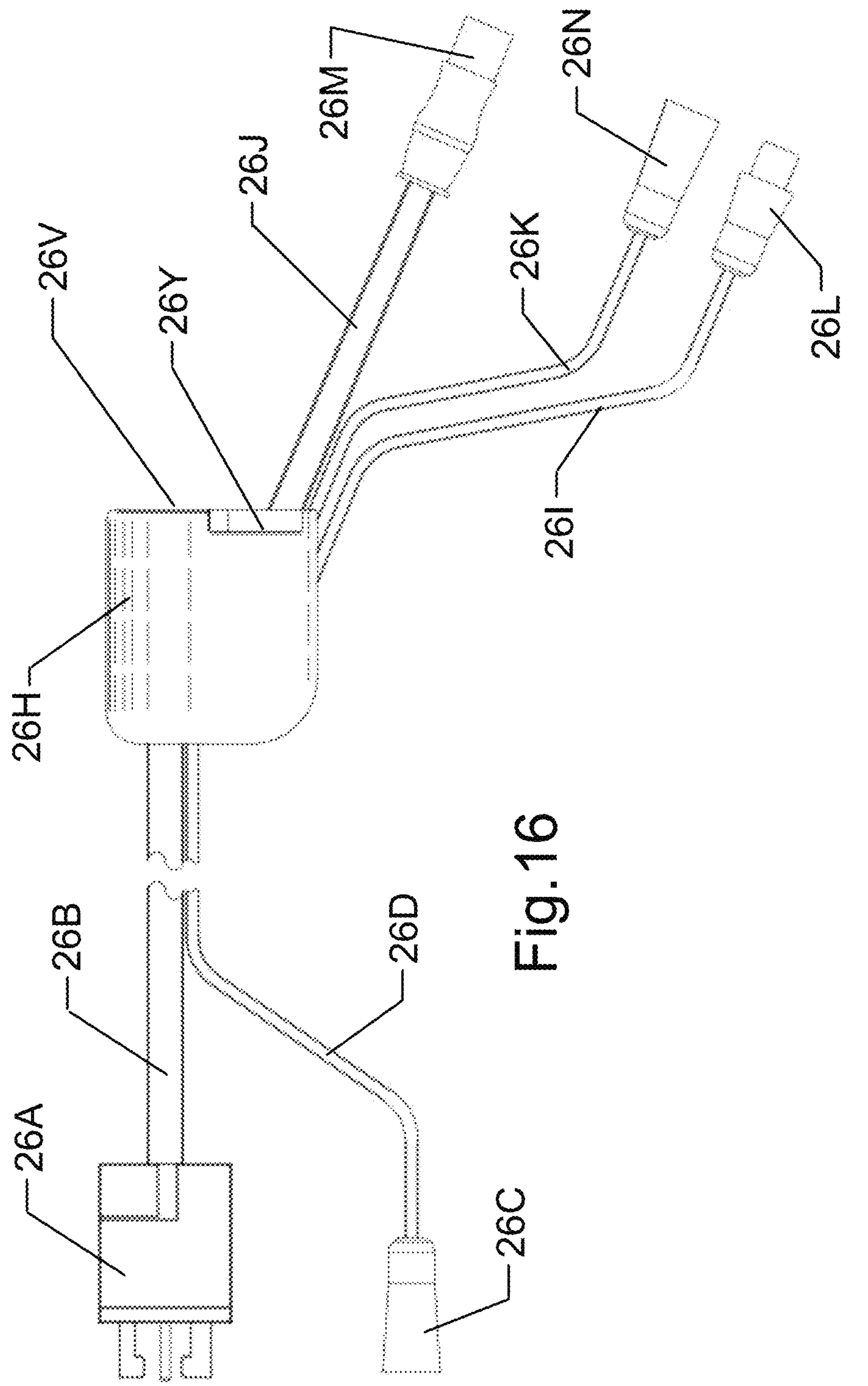
FIG. 16 illustrates an improved unit distributing power and data in which one set of connectors is incorporated in a housing.
Figure 17A:
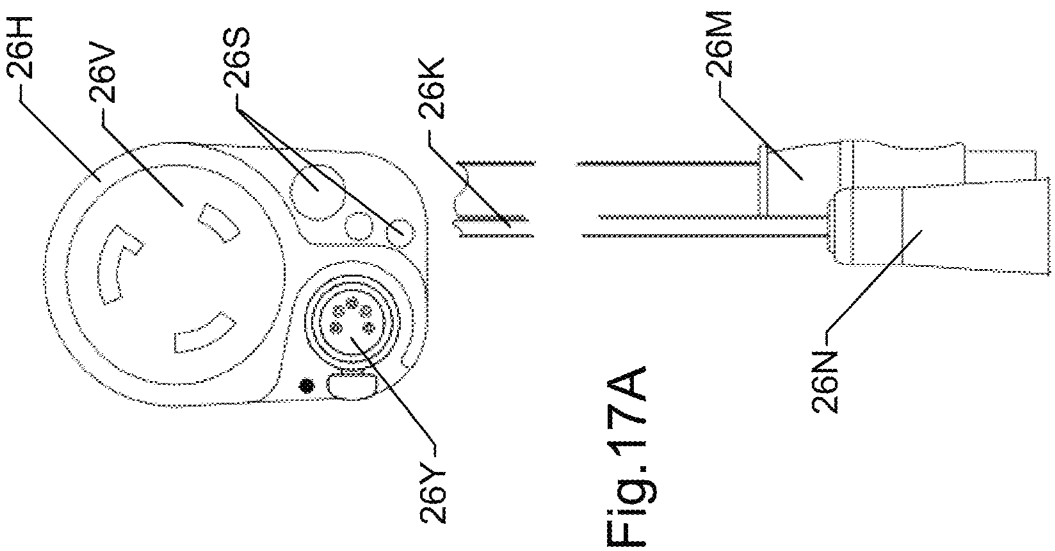
FIG. 17A is an end elevation of the improved unit of the prior Figure.
Figure 17B:
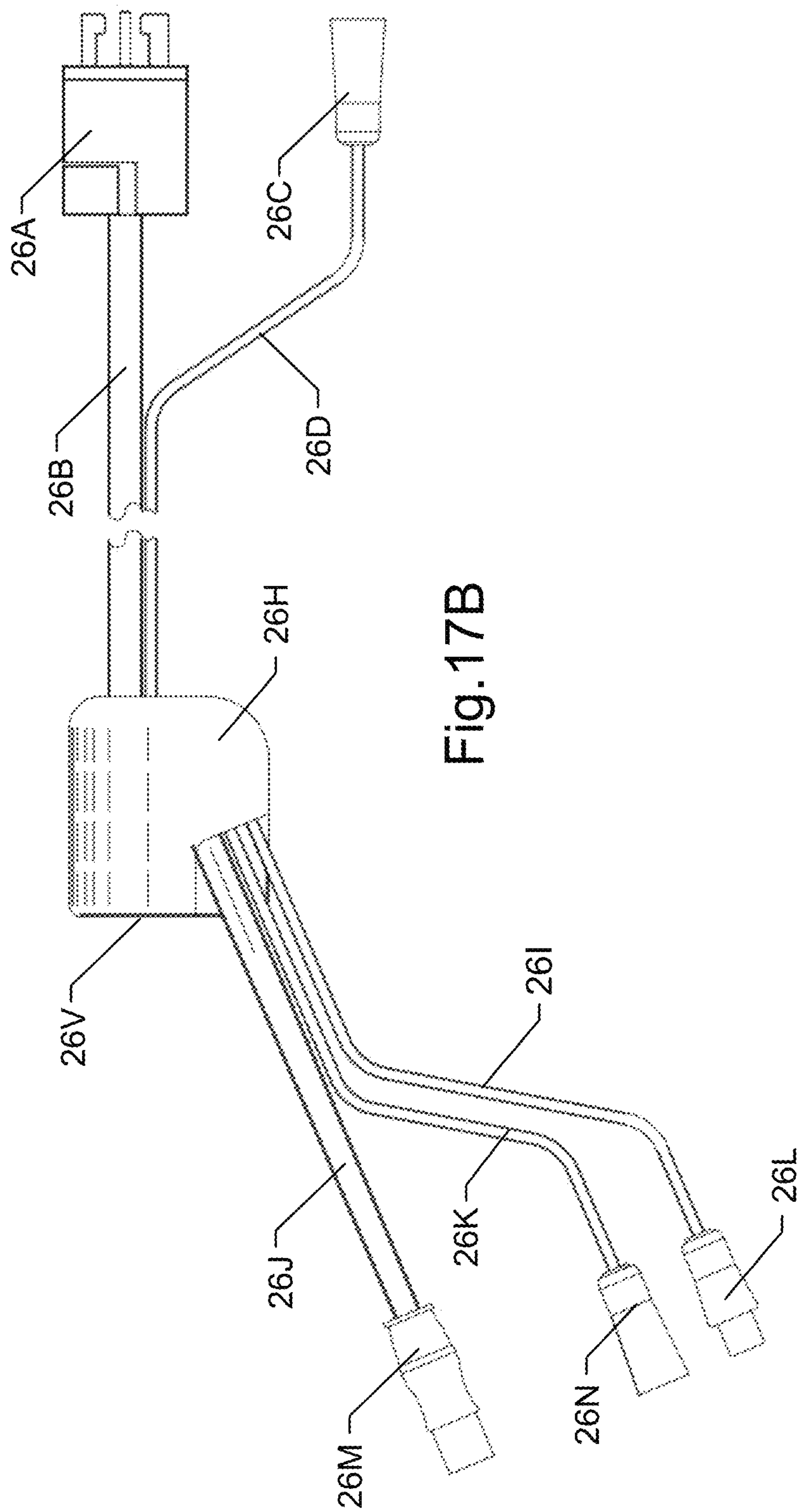
FIG. 17B is a reverse of FIG. 16, showing example strain relief provisions for the captive cables.

FIGS. 16-17B illustrate an improvement, in which one set of power and data connectors are incorporated in a "housing" 26H, here, power receptacle 26V and data receptacle 26Y. Cable 26B connects male power connector 26A with housing 26H. Cable 26J connects female power connector 26M with housing 26H. Data cable(s) 26D and 26I connect male data connector 26C with female data connector 26L. Data cable 26K connects male data connector 26N with female data connector 26Y.

Various of the advantages of embodiments such as those illustrated will be explored below.

Improved Data Distribution

As previously noted, the use of simple "Y" cables (as data "twofers") is not accepted practice for data transmission in the application, because of reflections resulting from the "stubs" produced. As a result, connecting a plurality of data consumers to a common data stream has required "daisy-chaining" them, by using jumpers between a data outlet/thru receptacle on one unit and the data input receptacle on the next. This results in large numbers of connections to be made, as well as loss of data to all downstream consumers if both connections are not made at any upstream consumer. Internally, the two data receptacles on a DMX-512 consumer are generally simply paralleled.

An improvement parallels the data input cable feeding a fixture or other data consumer to a data "thru" cable feeding the next consumer at the contacts of the female data connector that supplies the first consumer, rather than relying upon a prior art connection through the first consumer (hereafter, referred to as "touch and go").

Figure 18:
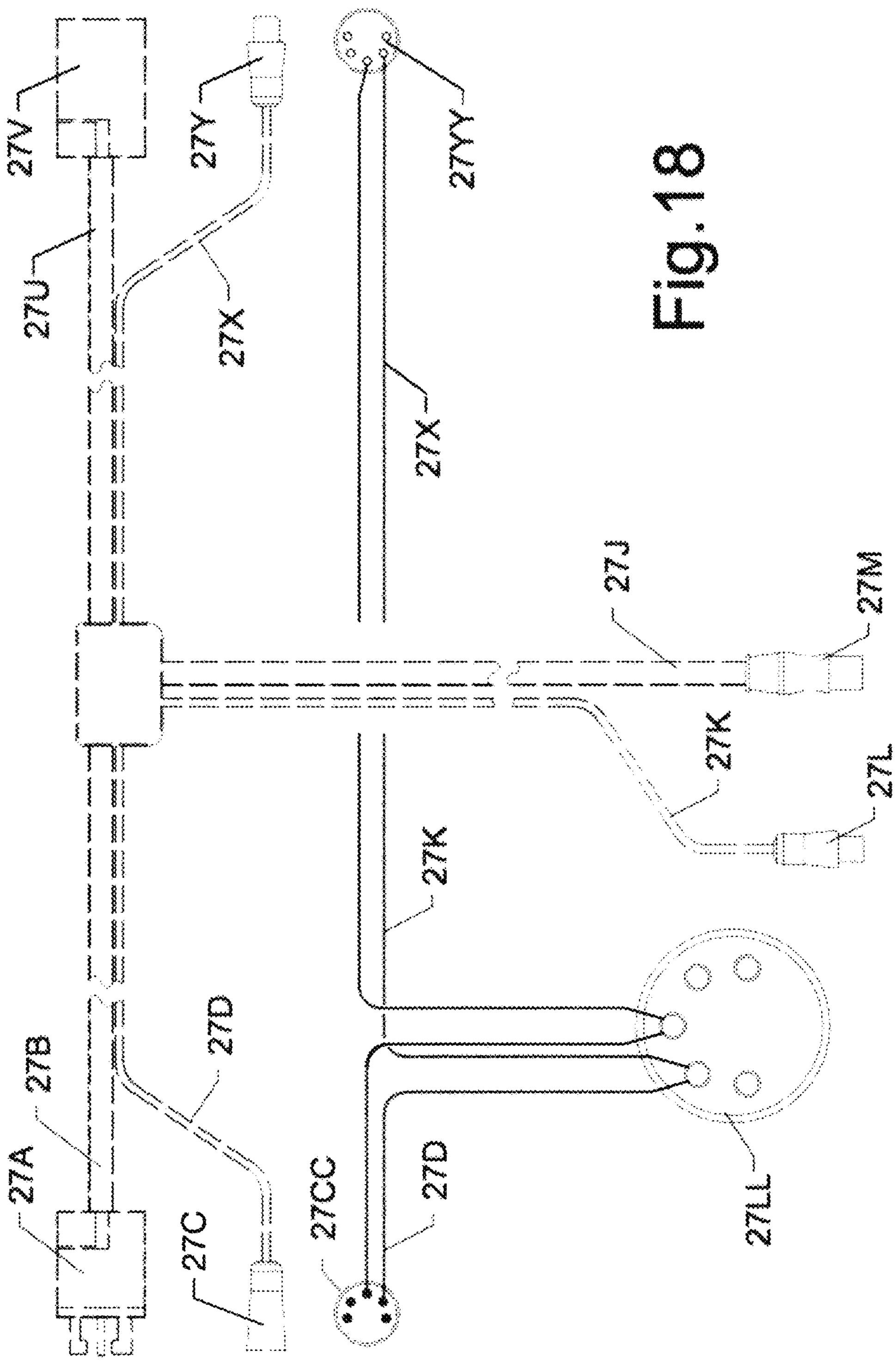
FIG. 18 illustrates an improvement wherein the input and output data lines are connected at an intermediate connector.

FIG. 18 illustrates the distinction; combining an elevation of a power distribution unit as illustrated in FIG. 15, with a diagram of its modified data signal wiring.

As will be seen, a data pair 27D connects the male data input connector 27C with female data connector 27L. Unlike prior Figures and practice, the data pair supplying female data connector 27Y is not supplied from another male connector, which couples data from input 27C only via a feed-thru connector on an intermediate fixture or other consumer. Instead, the extending data pair is terminated to the incoming data pair substantially at the contacts 27LL of female connector 27L. Because the data feed-thru on most consumers is a passive bridge between adjacent male and female connectors, the disclosed connection substantially in the connector 27L supplying data to the consumer is functionally the same as a feed-thru, and the additional conductors beyond the new connection are of insufficient length to significantly impact data integrity. Suitable cable types having two data pairs in a jacket are widely available, such that a single cable can be used for both the data pairs to and from such a connection.

The advantages of the disclosed improvement include a dramatic reduction in cost, by eliminating the second connector and reducing cable; the elimination of the operating labor step required to separate and identify two cables/connectors at each data consumer and plug both; and improved data integrity, because whether or not a consumer is plugged into any intermediate connector has no impact upon whether data is present for other consumers downstream of it.

The benefits of the disclosed "touch and go" data distribution can also be offered in either single data-only versions as well as in data festoons.

Figure 19A:
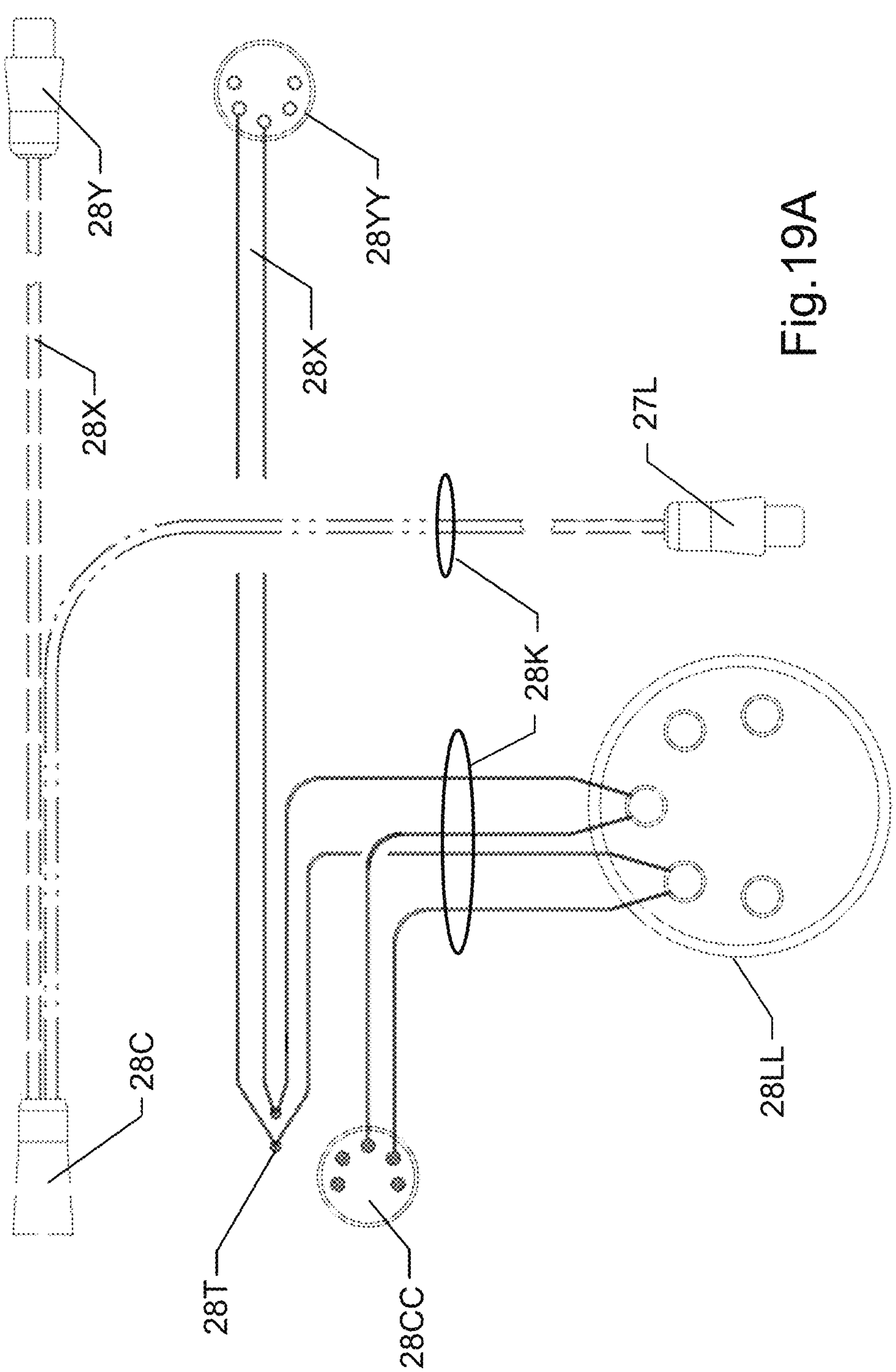
FIG. 19A is one data-only application of the data distribution technique illustrated in the prior Figure.

FIG. 19A illustrates a data-only version as well as a topology in which the extension 28K is routed back from connector 28L to the male connector 28C, for thru-connection at 28T to connector 28Y via 28X.

Figure 19B:
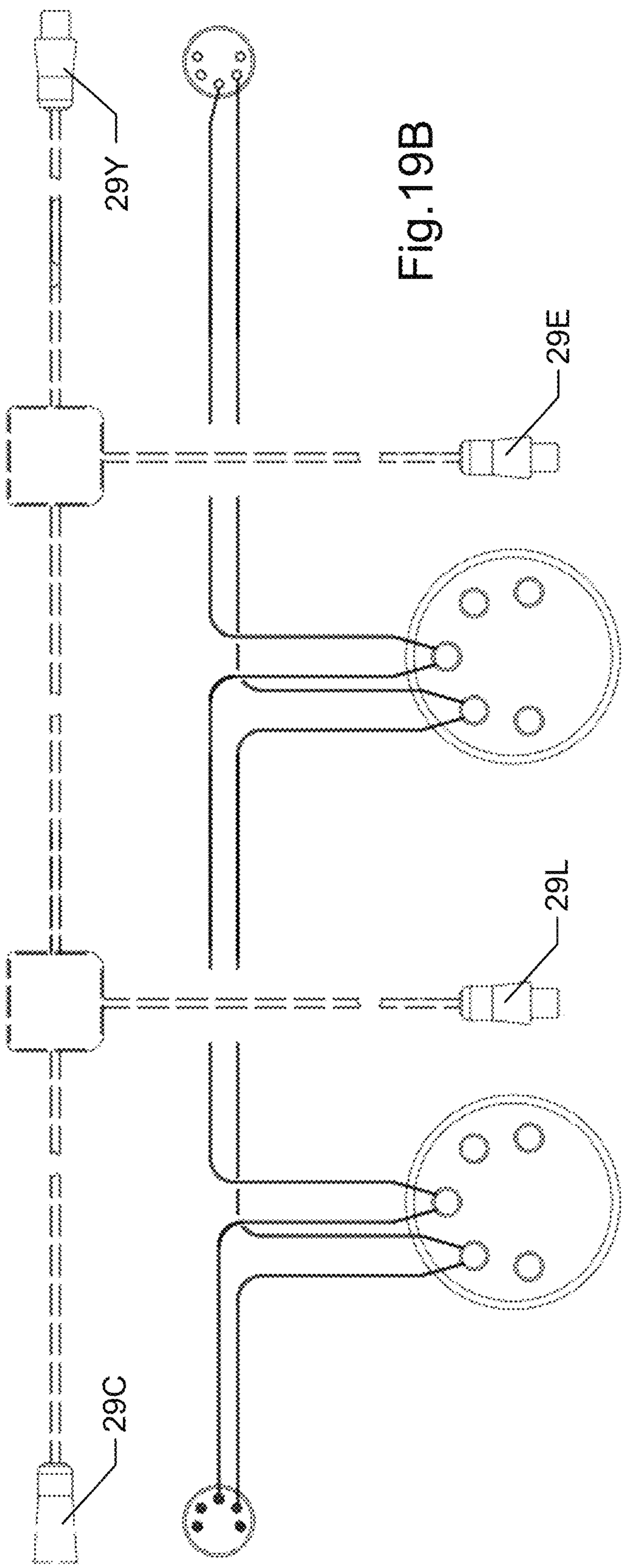
FIG. 19B illustrates a "data festoon".

FIG. 19B illustrates a "festoon" that allows a large number of consumers to be supplied from a common data input with the advantages cited.

Figure 20:
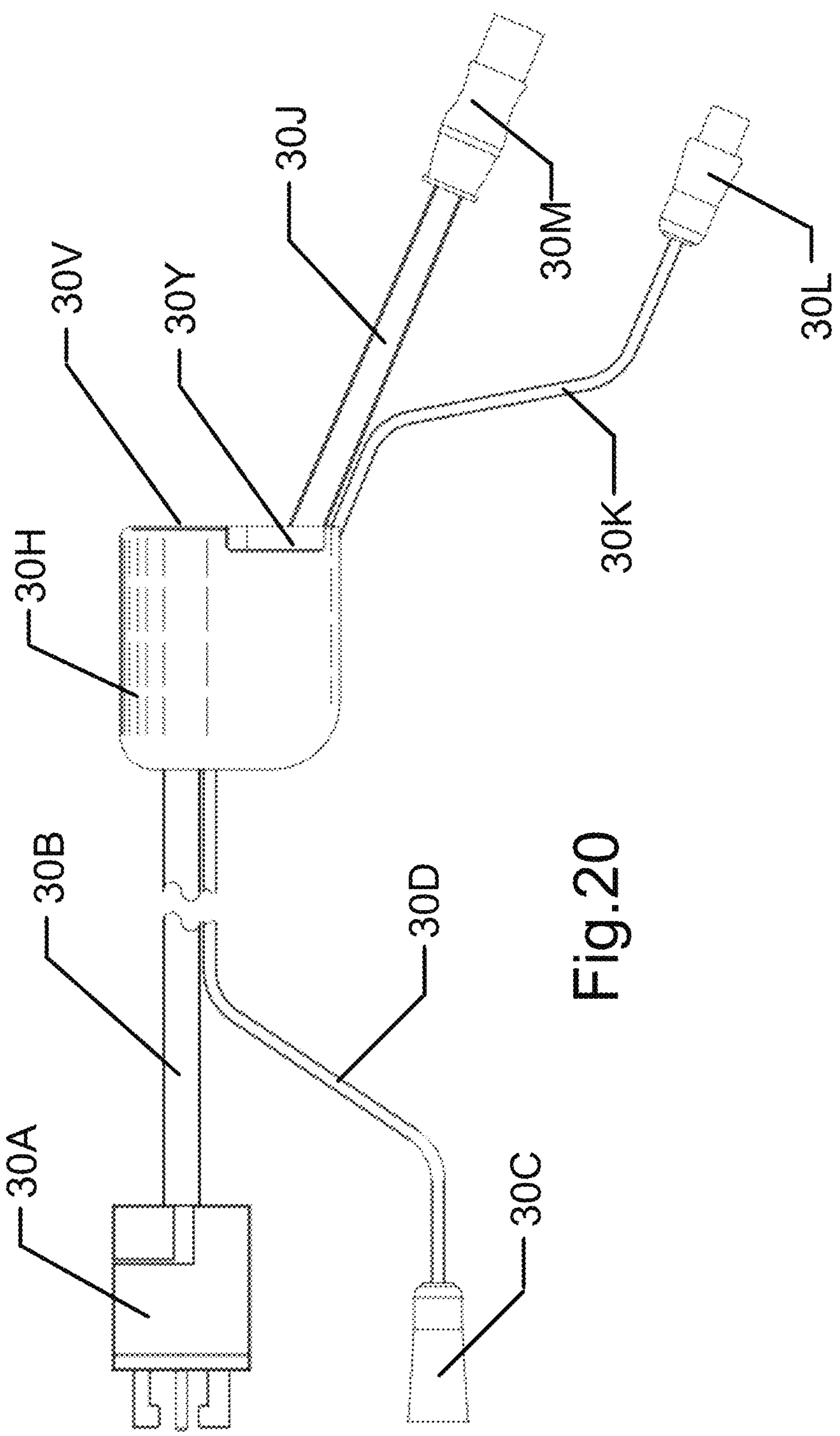
FIG. 20 illustrates an improved unit that distributes power and data to a consumer that employs the improved data distribution method of the prior Figures.

FIG. 20 illustrates the combined power and data distribution unit seen in prior Figures employing the improved data distribution method. Cable 30B connects male power connector 30A with housing 30H, here mounting female power receptacle 30V and female data receptacle 30Y. Cable 30J connects female power connector 30M with housing 30H. Data cable 30D connects male data connector 30C with housing 30H, which mounts female data connector 30Y. Data cable 30K connects female data connector 30L with housing 30H.

The "touch and go" data approach, when applied to the illustrated power distribution unit, offers a further simplification.

Figure 21A:
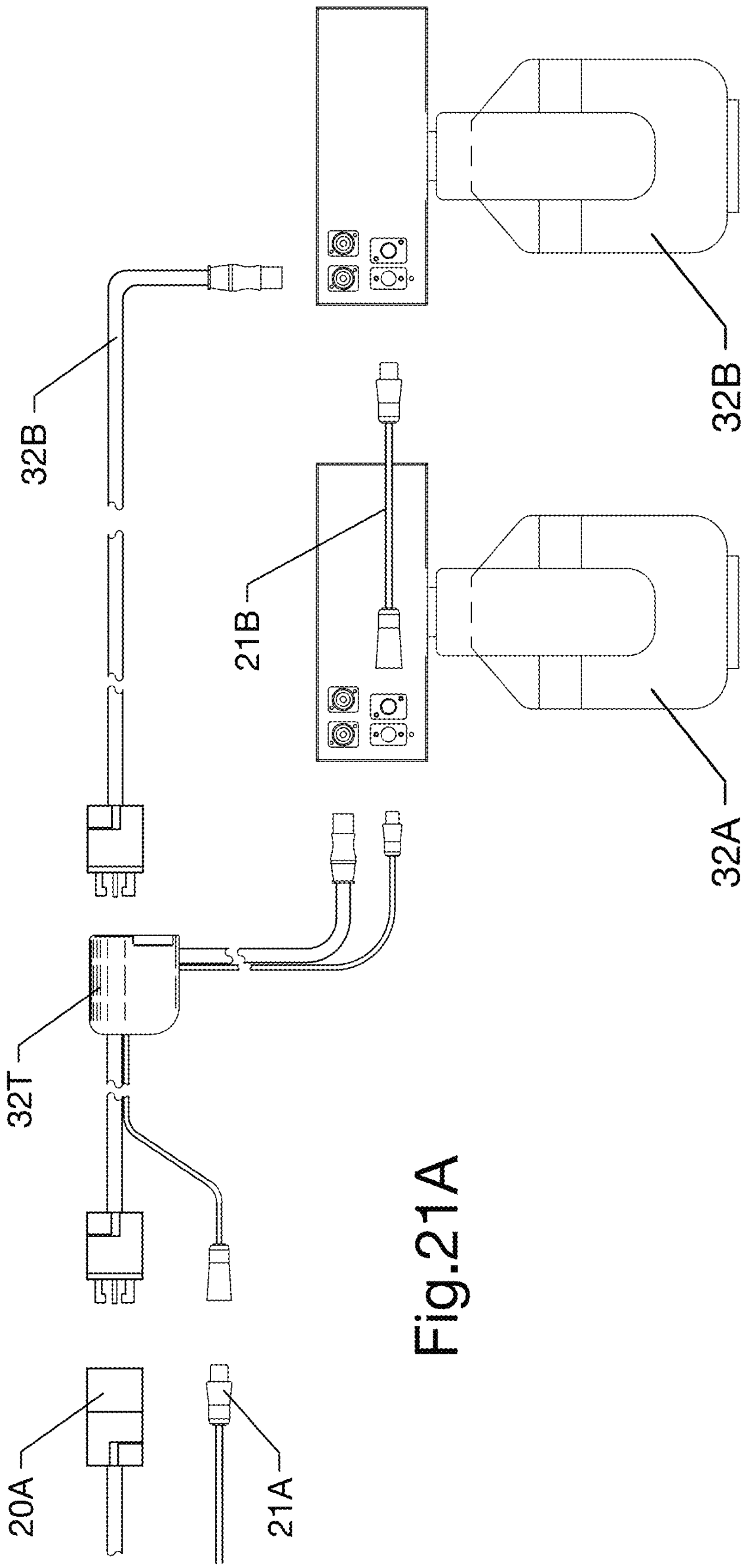
FIG. 21A illustrates such an improved unit simplifying the distribution of power and data to a plurality of consumers.
Figure 21B:
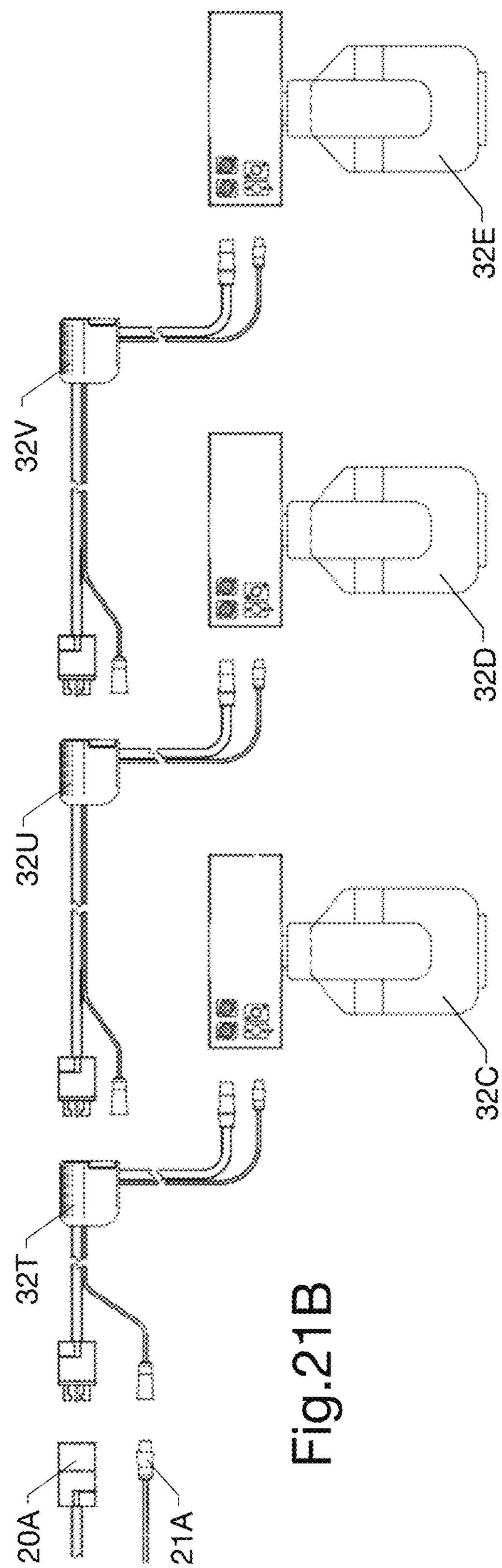
FIG. 21B illustrates how a plurality of such improved units simplify the distribution of power and data to a plurality of consumers.

As seen in FIGS. 21A and 21B, in comparison with FIGS. 14A and 14B, the disclosed simplifies the sharing of both power and data among a plurality of fixtures or other consumers. As seen in FIG. 21B, such units can be chained together. They can be built with power and data inlet cables of different lengths to accommodate different mounting centers/distances between fixtures. Standard twist-lock (or other power connector) and XLR data cables can be used in extensions.

Figure 22A:
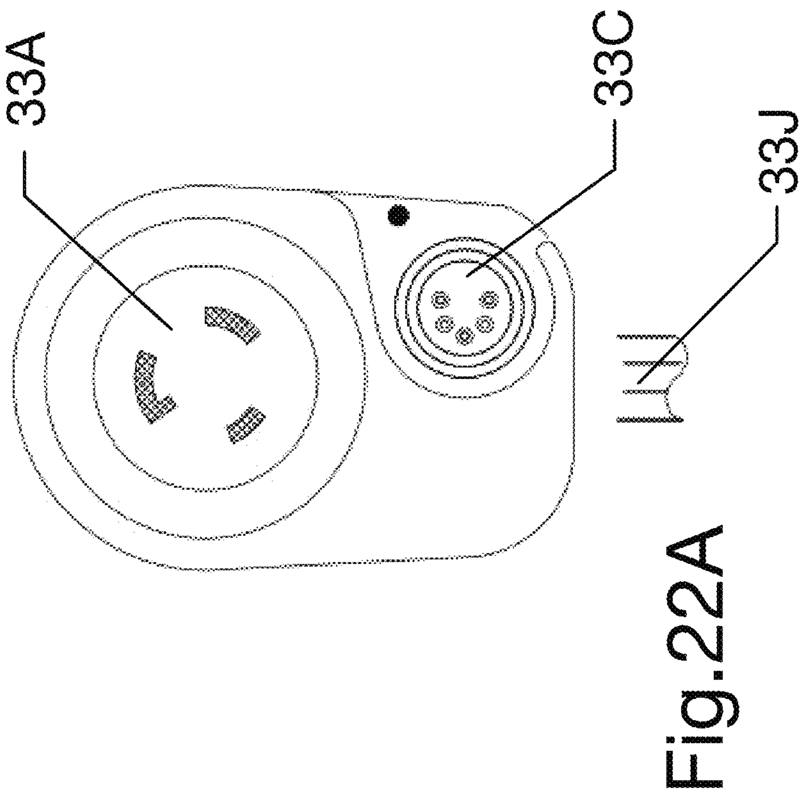
FIG. 22A is one end elevation of a variant unit used for in-line insertion in a cable run.
Figure 22B:
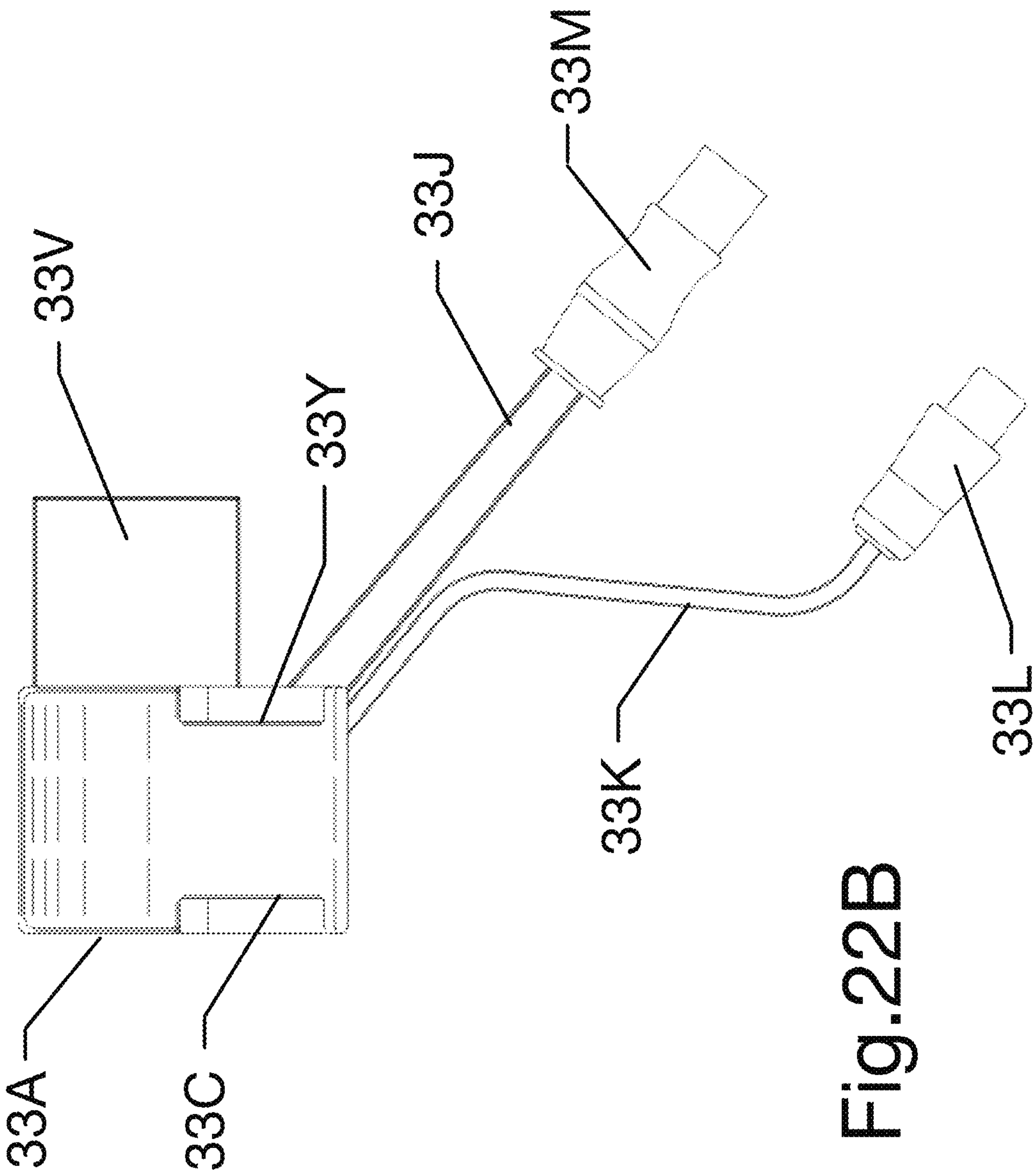
FIG. 22B is a side elevation of the variant unit of the prior Figure.
Figure 22C:
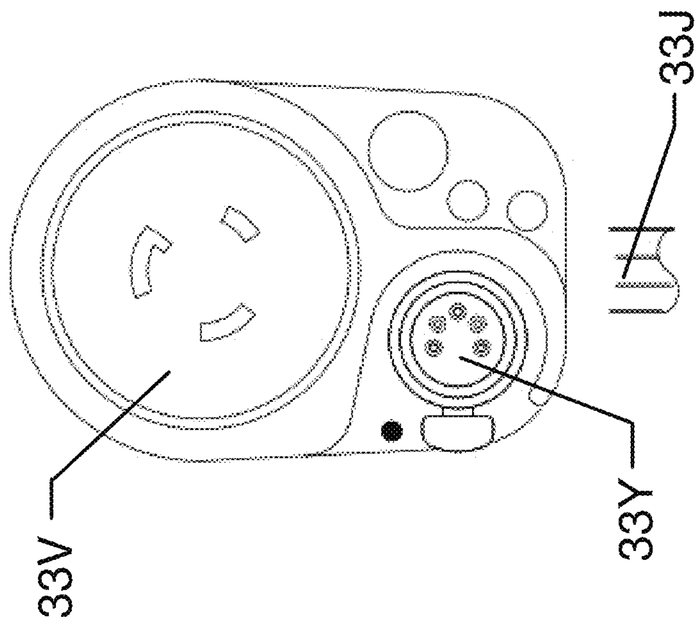
FIG. 22C is the other end elevation of the variant unit of the prior Figures.
Figure 23A:
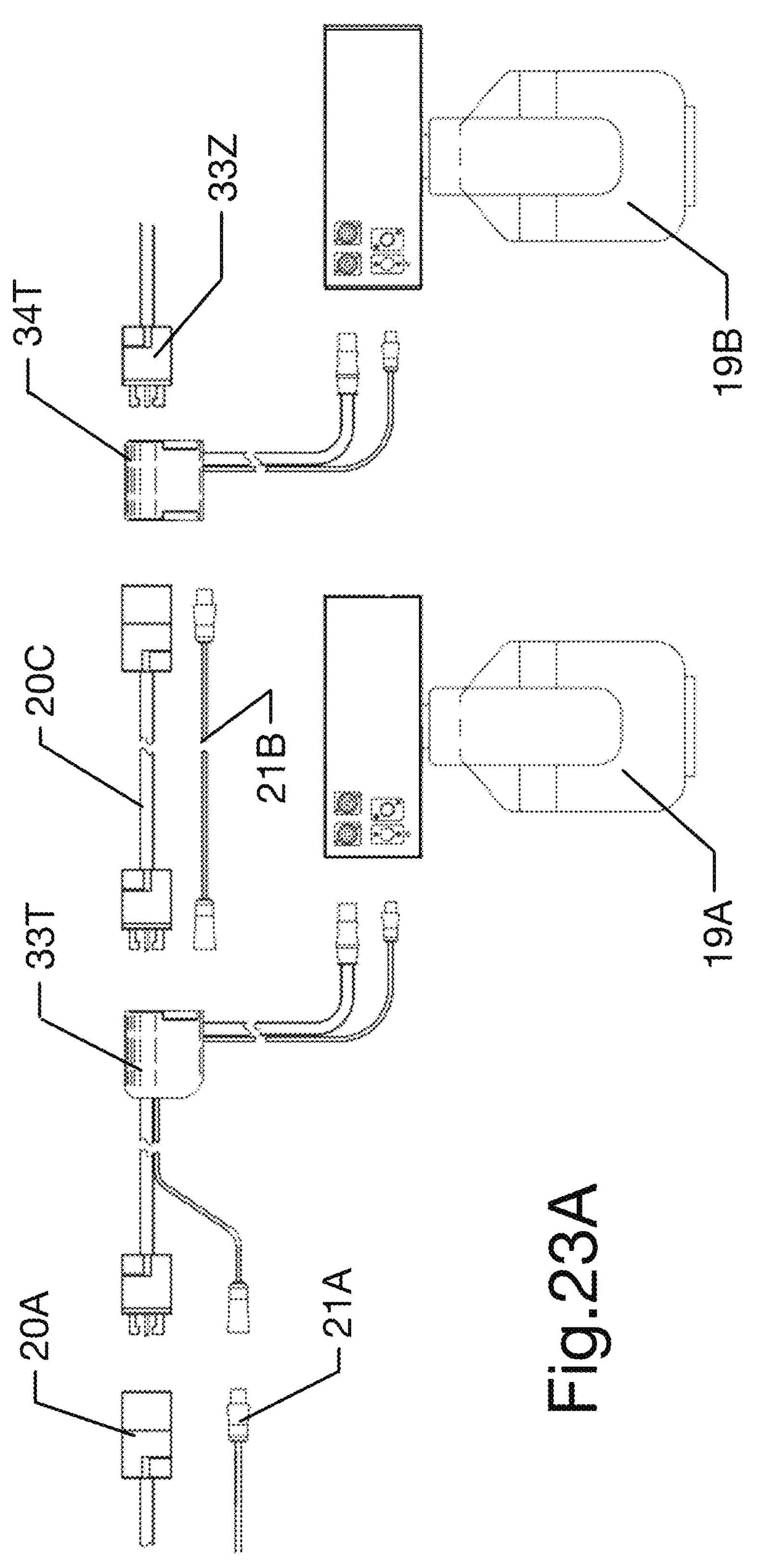
FIG. 23A illustrates an application of the variant unit of the prior Figures.

FIGS. 22A-22C illustrate a variant that employs power and data inlet connectors 33A and 33C rather than pigtails with plugs. As seen in unit 34T in FIG. 23A, this allows inserting such units in runs of prior art power and data extensions (e.g., 20C and 21B) of any length, to suit spacing requirements.

Figure 23B:
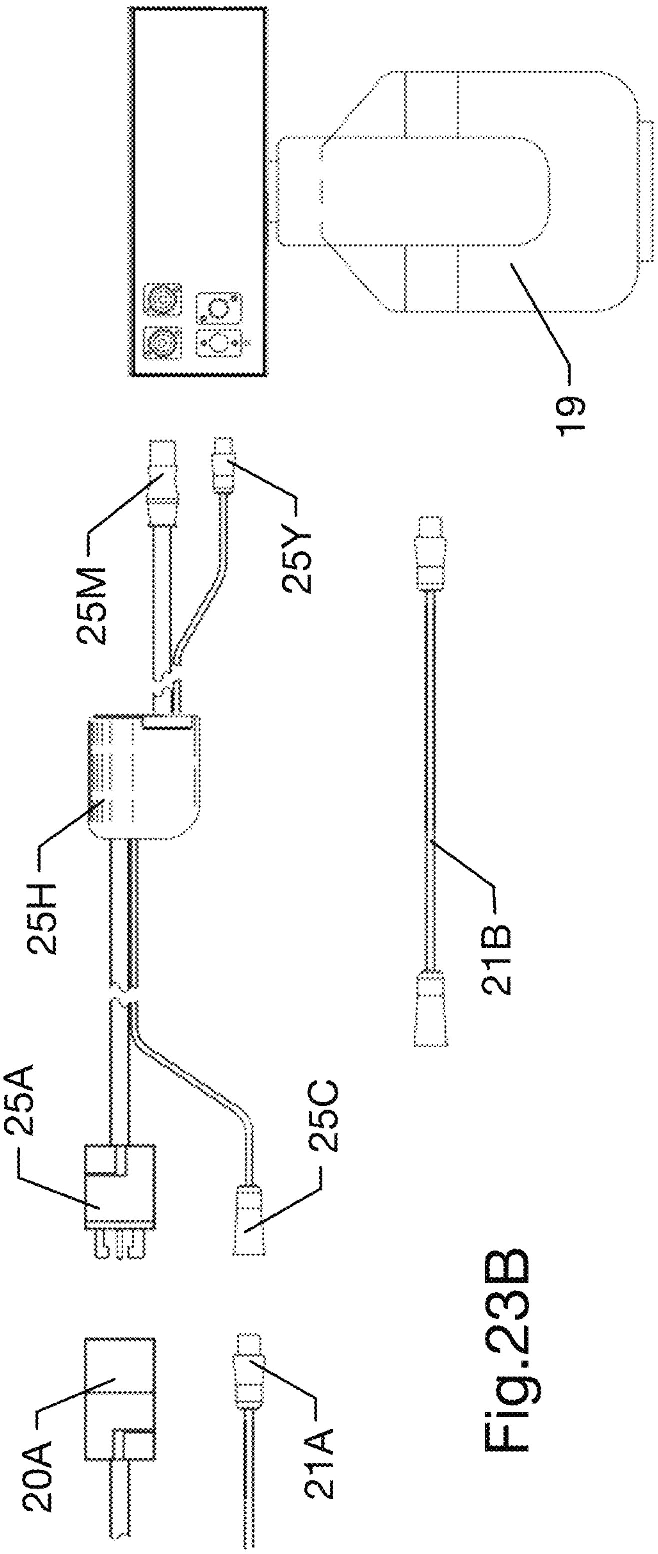
FIG. 23B illustrates the application of the units of the various Figures as a line cord supplying a single consumer.

An important advantage of the invention is that unit can, as illustrated in FIG. 23B, also be used as a line cord for a fixture or other consumer. Thus, the buyer can chose to specify (or a vendor supply) one in lieu of a prior art line cord for the fixture, at modest additional cost, and that single purchase be employed with a fixture either as a line cord, or to share power and data with a downstream consumer more efficiently than prior art methods as described. It will be understood that embodiments that incorporate data with power have been illustrated, but that variants can be employed which are for power only, including in applications in which consumers do not require data, or where data is supplied separately, in the prior art manner.

Connectors on the power inlet, pendant, and output can be of different types and configurations. Embodiments are possible in which connectors can be field-exchanged to suit requirements and that can also provide adaption/conversion from one connector type to another. FIGS. 24A-D illustrate split housings 36HC, 36HD, and 37HR having different functions that can be assembled in different combinations. FIGS. 24B-24D illustrate a variant in which the data wiring and connector(s) are disposed in a separate sub-module, to allow ready choice of different data connector type (e.g., 3-pin versus 5-pin XLR) and for isolation.

Figure 24A:
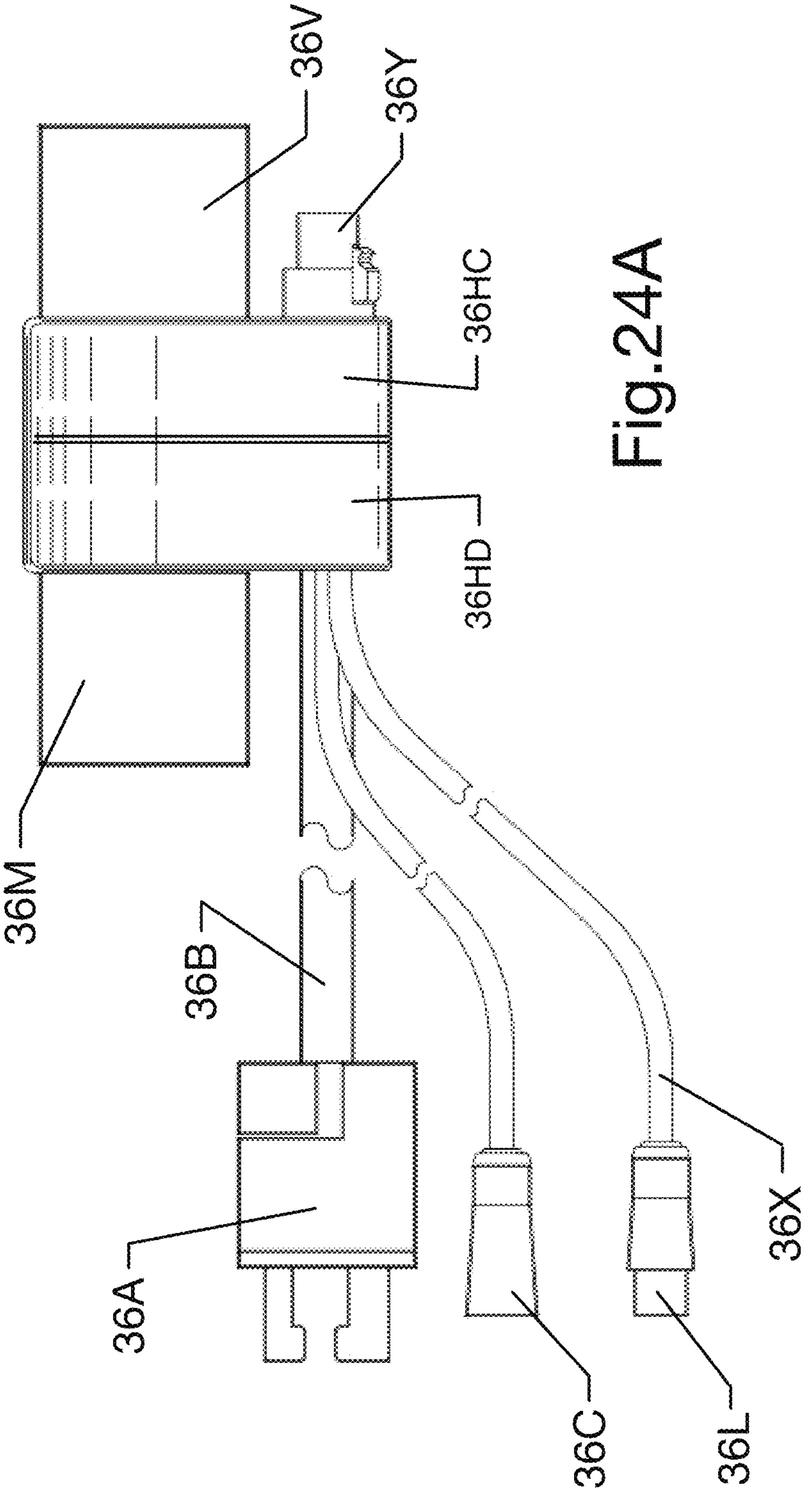
FIG. 24A is a side elevation of a variant unit adapted for consumers having fixed line cords and also illustrating a split housing.
Figure 24B:
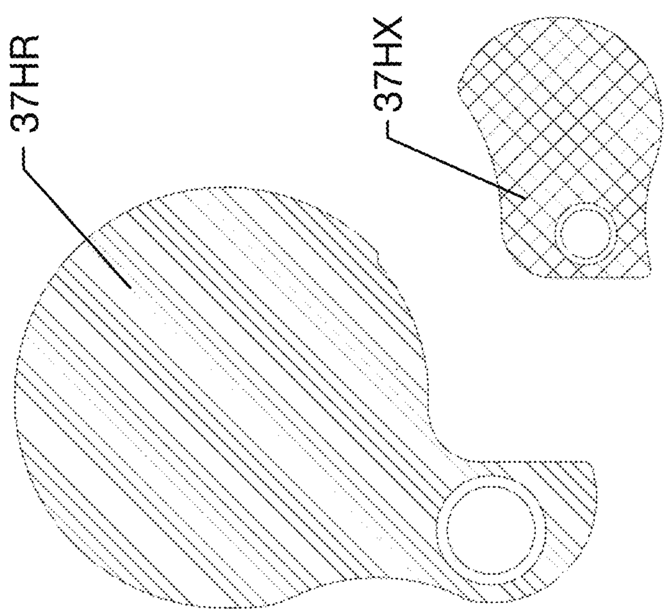
FIG. 24B is an end elevation of a unit illustrating a separable module for data wiring and connectors.
Figure 24C:
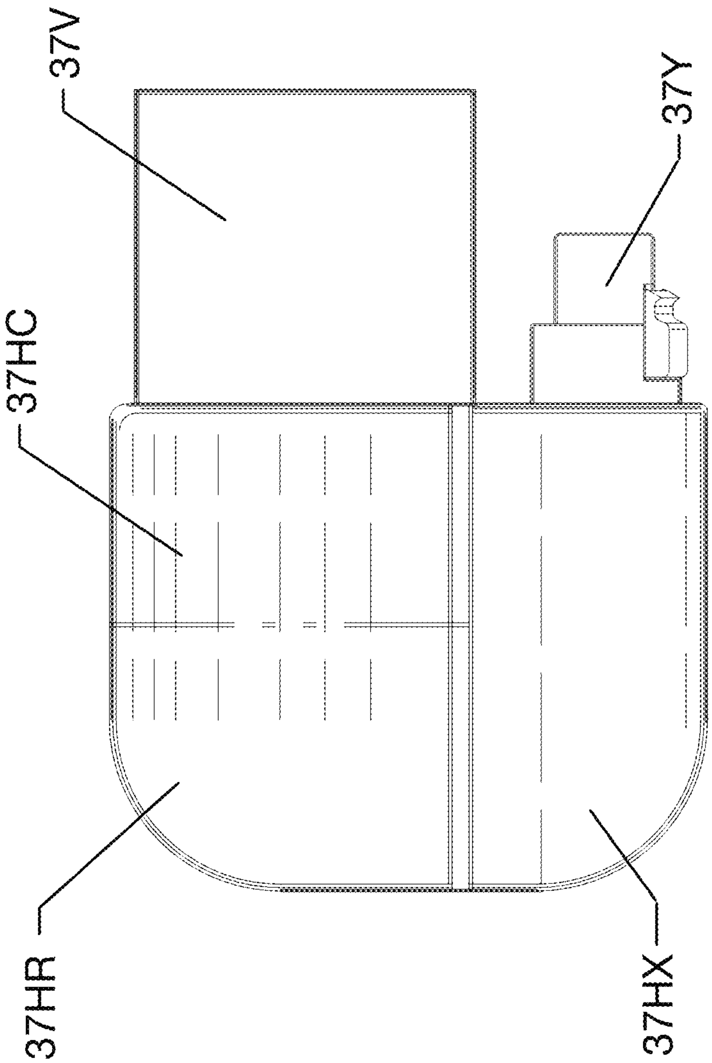
FIG. 24C is a side elevation of the unit illustrated in the prior Figure, with the separable module in place.
Figure 24D:
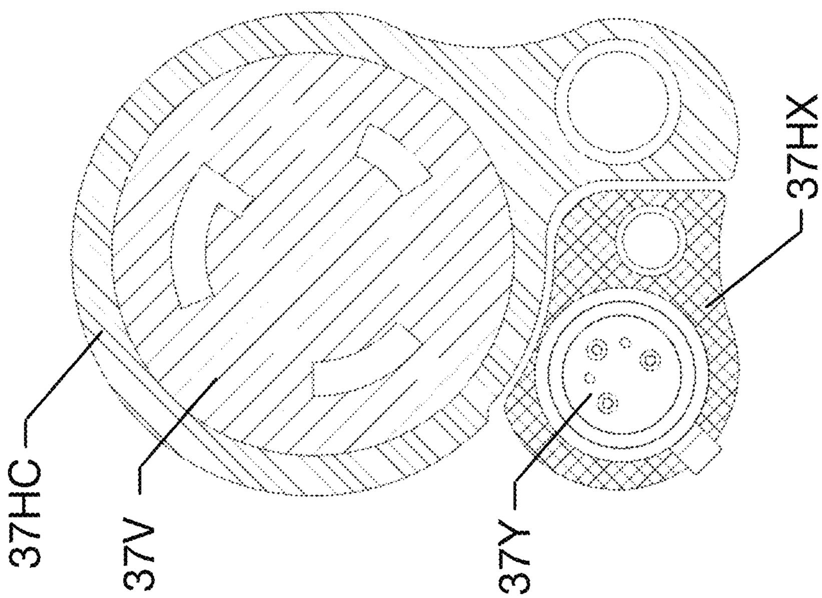
FIG. 24D is the other end elevation of the unit illustrated in the prior Figures.

FIG. 24A illustrate a variant intended for when the consumer is one having a fixed line cord, whose unneeded length would add bulk to cabling if used with a unit such as in the prior Figures. In such cases, with the variant in this Figure, only the data extension 36L is needed and the consumer's line cord can reach the receptacle 36M on the housing. The housing shape is also illustrated with curved surfaces to nest against the pipe or tubing on which they will often be used.

Improvements to Truss Design

Lighting fixtures (and other equipment) require not just supporting power and data infrastructure, but physical support as well. Since 1972, there has been extensive development of modular, portable support structures, notably "truss", for the purpose.

The prior incorporated applications, included in their entirety by reference, disclose improvements to a truss type (itself disclosed in U.S. Pat. No. 8,099,913 B1), in which wheeled "leg carriages" are temporarily attached to a low-profile "pre-rig" truss for its transport; manufactured as the "GT" truss by Tyler Truss Systems of Pendleton, Indiana. Various problems with this design are described in related filings.

The Tyler/GT truss design proposes to invert the leg carriages for storage during fixture use, in the same sleeves 40 that accept them for supporting the truss during shipping. Figures herein include improvements addressing many issues.

As illustrated in FIGS. 51A-51C of the applicant's prior application, sleeve 40 includes two prior art pass holes 40G and 40H. In combination with prior art pass holes 53H in the leg 53, the leg carriages can be fixed with the truss at different heights above the floor/ground for shipping, depending upon which one of holes 53H are used with locking pin 40P and pass hole 40H. Similarly, the pass holes 53H will be used with pass hole 40G in sleeve 40 to fix the height of the leg carriage above the truss during inverted storage. The Tyler/GT design has experienced persistent problems with fixing leg height correctly in both modes.

In the applicant's prior related filing, pass holes 40L are provided in sleeve 40, here at right angles to pass holes 40G and 40H. Insertion of a pin or bolt 41P in one such hole pair produces a mechanical stop, which fixes the depth of insertion possible of leg 53 in sleeve 40, and therefore in the shipping height of the truss. Unlike prior art tape marks or mechanical stops, the disclosed improvement determines leg height in each truss section itself, so that the desired height is produced regardless of the leg carriage employed with it, allowing different sections to be shipped at different heights, depending upon their needs.

Figure 25A:
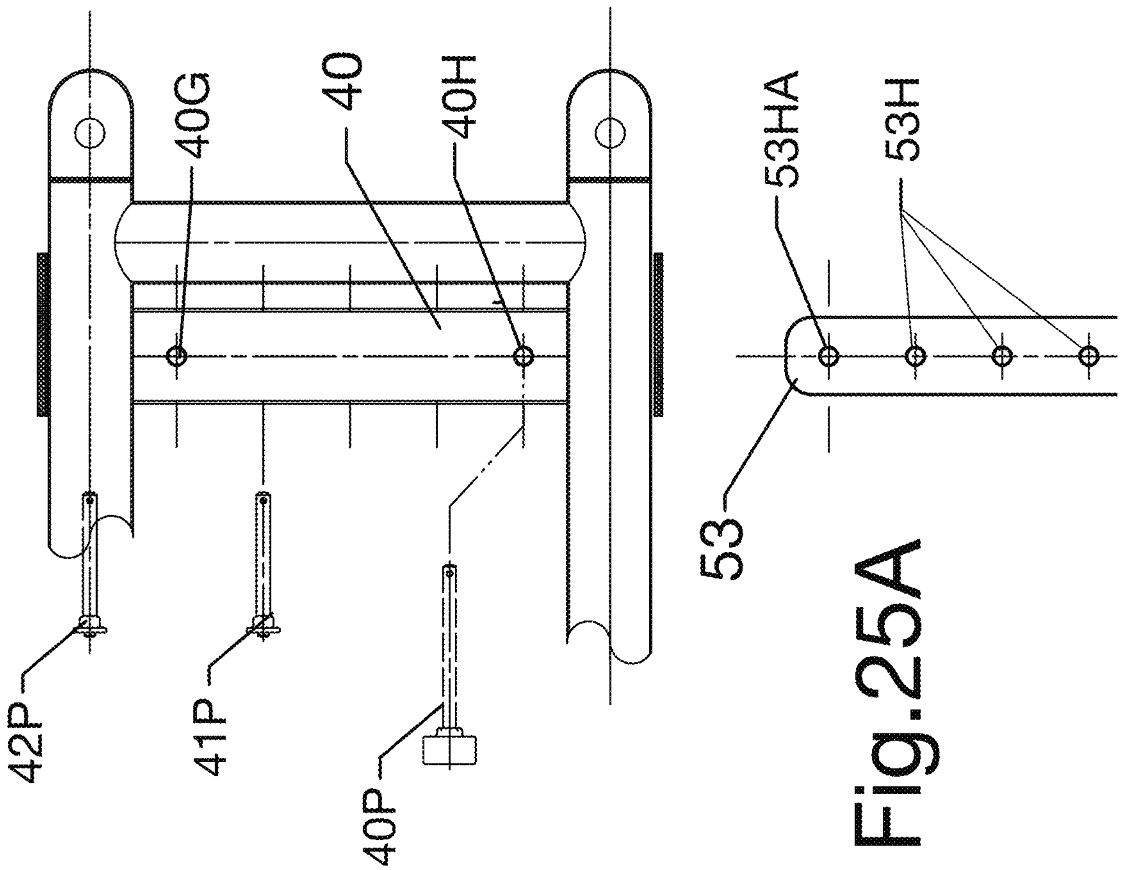
FIG. 25A is a side elevation of a pre-rig truss showing improvements to the acceptance of leg carriages for shipping.
Figure 25B:
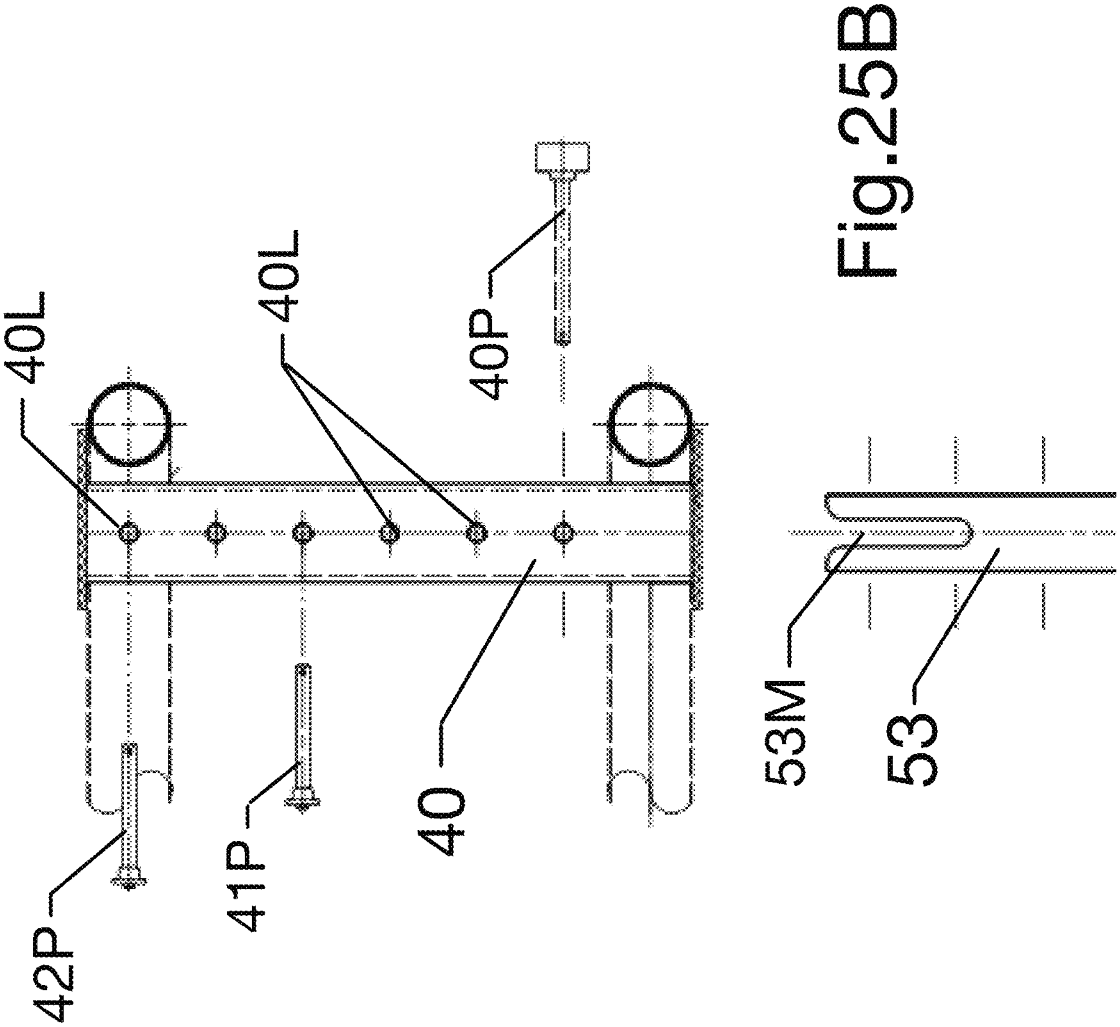
FIG. 25B is a section through the pre-rig truss of the prior Figure showing improvements to the acceptance of leg carriages for shipping.
Figure 26A:
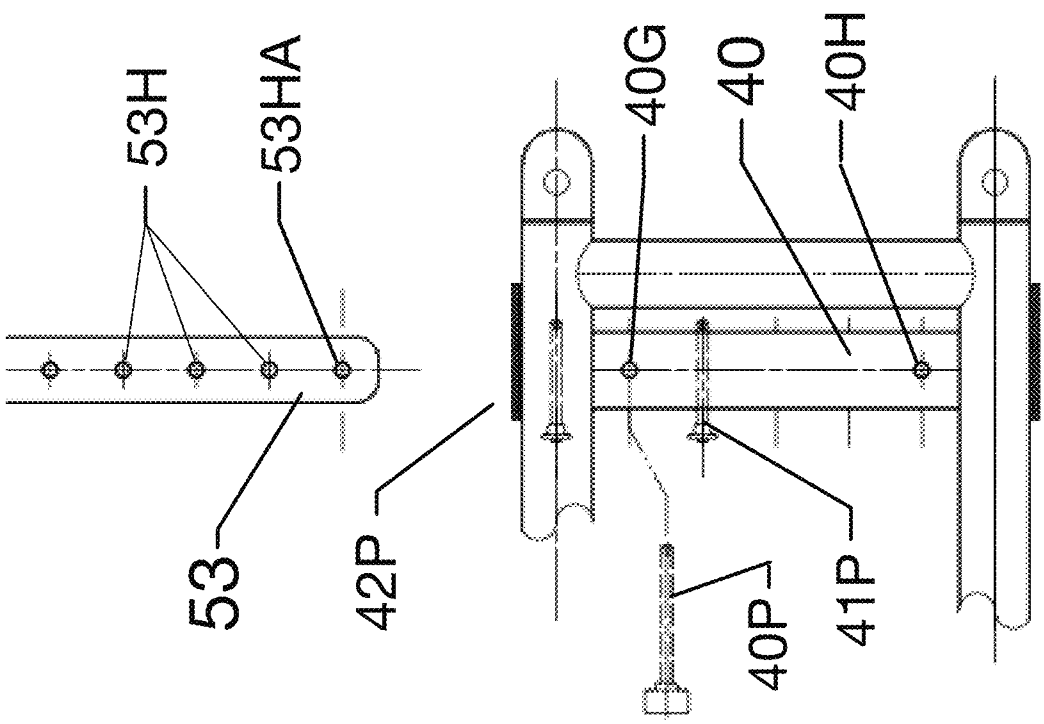
FIG. 26A is a side elevation of a pre-rig truss showing improvements to the acceptance of leg carriages for inverted storage on the truss.
Figure 26B:
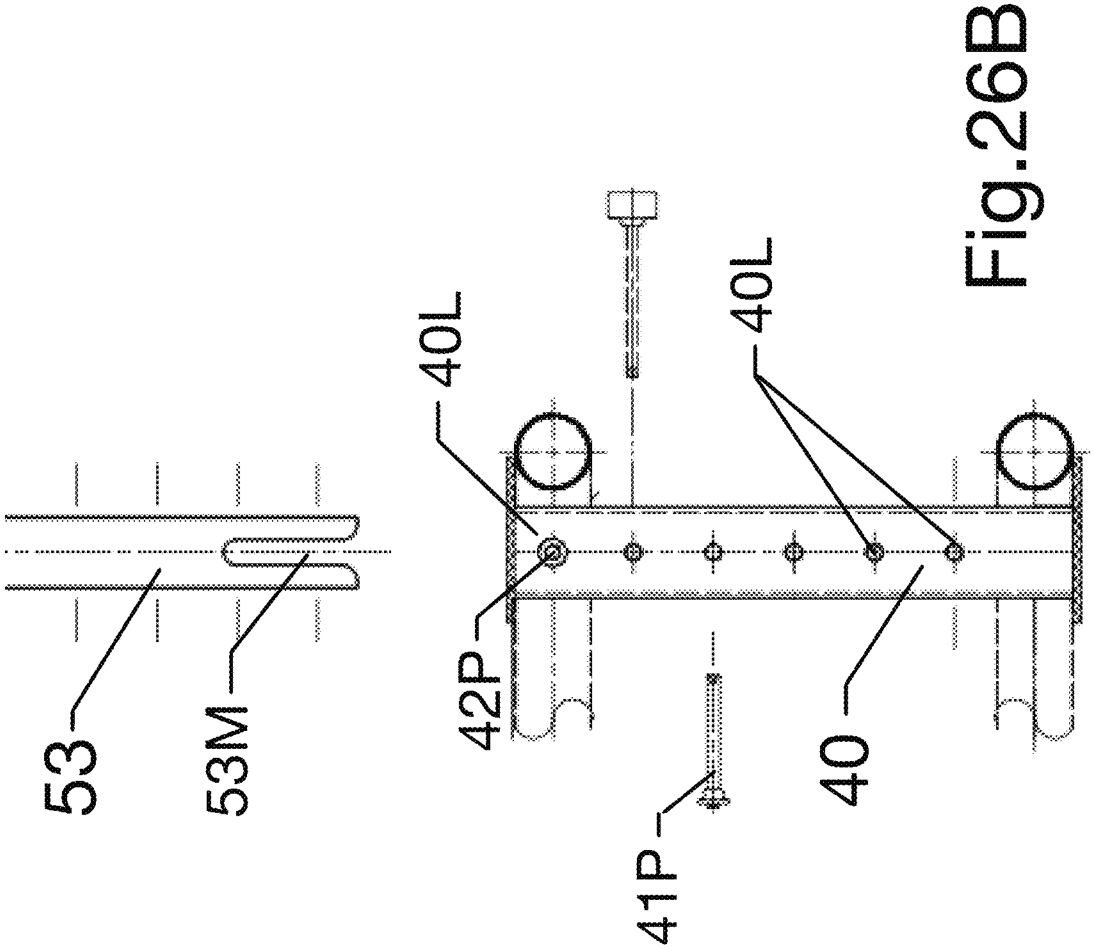
FIG. 26B is a section through the pre-rig truss of the prior Figure showing improvements to the acceptance of leg carriages for inverted storage on the truss.

In FIGS. 25B and 26B herein, a notch 53M in the axis of pass holes 40L is sufficiently deep that, when the leg carriage is inverted and leg 53 is inserted in sleeve 40, the leg can be stopped by a feature, such as bolt or pin 42P, that has been placed in leg sleeve 40 near its nominal top (e.g., in hole 40K); and that the top hole 53HA in the leg 53 aligns with upper hole 40G in sleeve 40, to allow fixing the leg in place with pin 40P inserted sufficiently far as to be safely engaged. Notch 53M also allows, in shipping mode, deep insertion of the legs despite the stop provided by feature 42P. Shipping heights of less than that resulting from full upward insertion of leg 53 until notch 53M reaches feature 42P are set by insertion of a pin or bolt in a lower one of holes 40L.

Another problem with the insertion of leg carriage verticals 53 into the sleeve 40 (and their removal) has been binding of the legs when the workers at each end do not keep the low horizontal rail 54 parallel with the truss (and, therefore) the leg verticals 53 aligned in the sleeve 40. A discussion of the use of a reduced leg diameter with rings and fittings to reduce the binding problem is found in the prior related application. A simpler approach is to employ a shape for leg 53 that is, for example, oval; a relatively tight fit with the sleeve across the narrow dimension of the truss (as is required to prevent the legs flexing in that axis, changing wheelbase; but looser in the elongated axis of the truss, which addresses the root of the binding problem with little impact on stability once the legs are pinned for shipping.

Improved Leg Carriage Storage and Stiffening

Another drawback of the current Tyler design is the method used to store leg carriages when not inverted atop truss sections. A T-shaped dolly offered by the manufacturer accepts inverted leg carriages.

Another requirement is for the use of "stiffeners" to brace either facing low horizontal rails 54 of the leg carriages under a truss section, or their facing legs 53, to reduce leg flexing and play under the load of stacked sections, which can present the hazard of tip-over. Although such "snap-braces" have been used in various contexts for decades, their insertion and removal demand additional labor; they require storage when not in use; and they might not be replaced (or replaced correctly) for shipping.

Figure 31A:
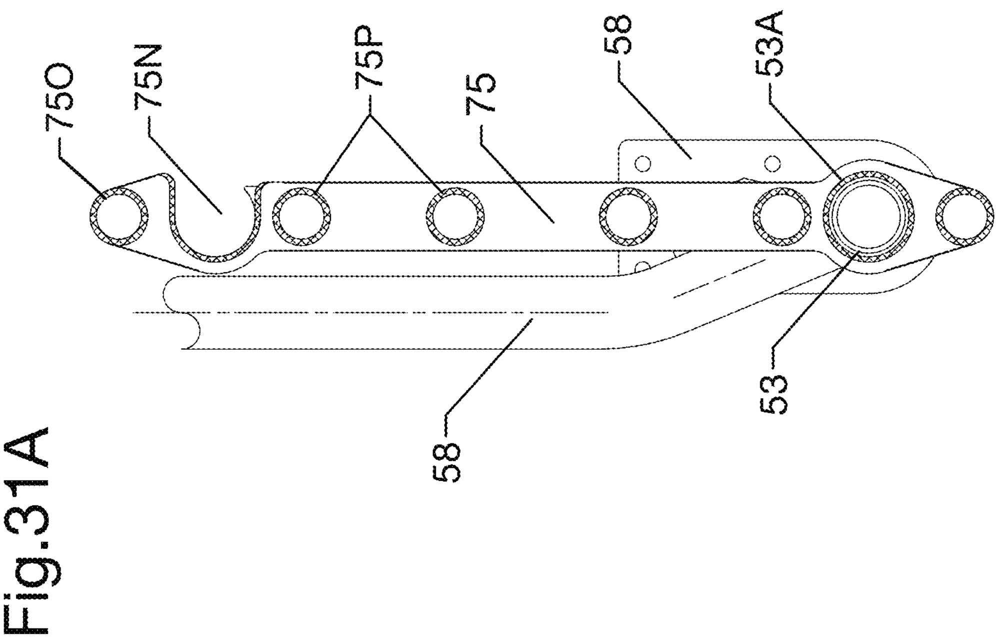
FIG. 31A is a plan of an improved leg carriage stiffener and storage rack as folded.
Figure 31B:
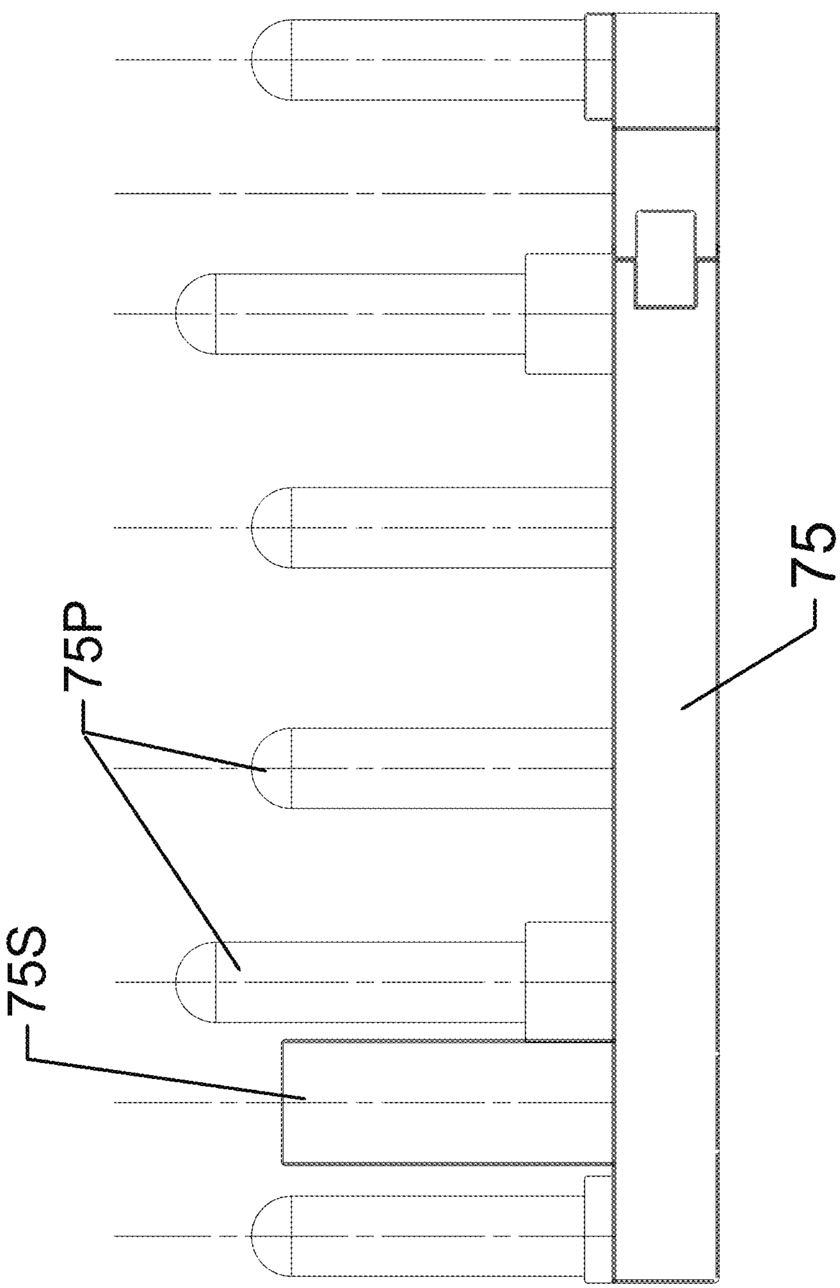
FIG. 31B is an elevation of the improved leg carriage stiffener and storage rack of the prior Figures.
Figure 31C:
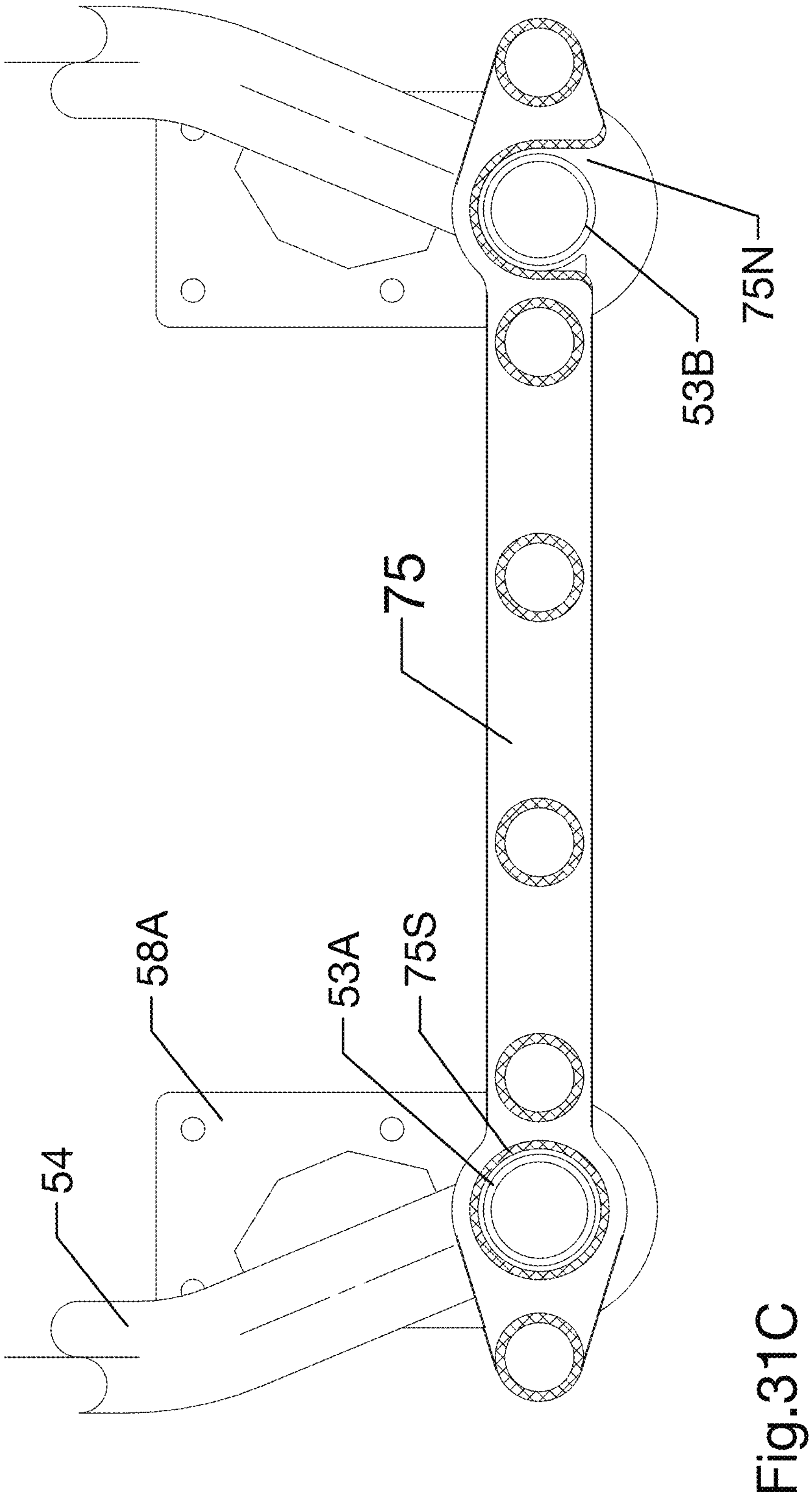
FIG. 31C is a plan of the improved leg carriage stiffener and storage rack of the prior Figure in use position.
Figure 32A:
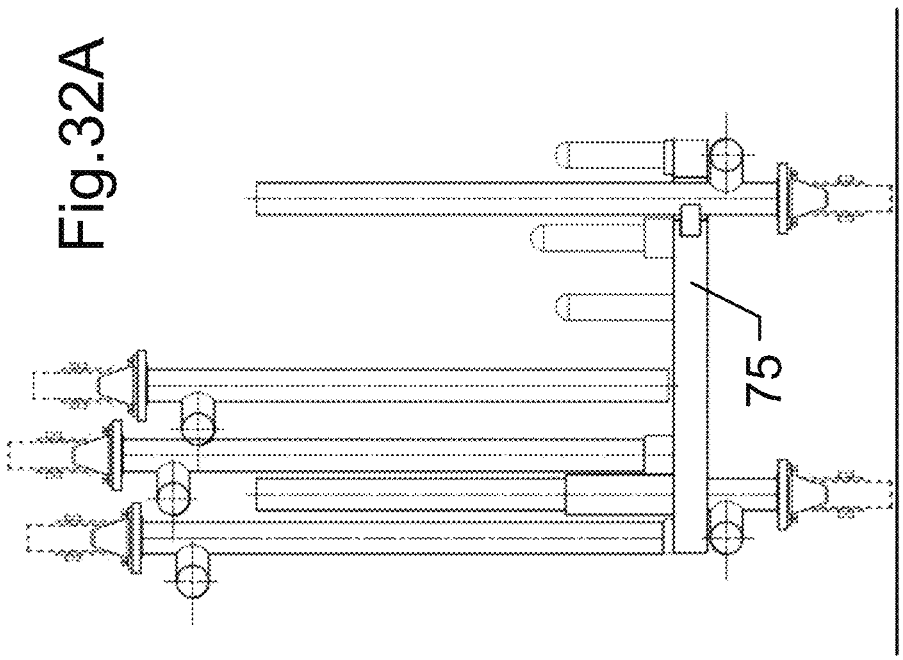
FIG. 32A is an end elevation of the improved leg carriage stiffener and storage rack of the prior Figures in use.

The prior related application illustrates captive stiffeners and leg racks. FIGS. 31A-32A illustrate an assembly serving both functions. Assembly 75 has a collar 75S on one end and a fitting 75N comparable to a "snap-brace" at the other. FIG. 31B illustrates it engaged for shipping. FIG. 31A folded for storage (including with spring retraction). Referring to elevation FIG. 31B, pins 75P accept inverted leg carriages. As seen in FIG. 32A, by providing "risers" below some of the pins 75P for varying the height of the leg carriage, the leg carriage caster plates can be staggered vertically to better accommodate a large number of legs. Projections 750 support additional storage outboard of the legs 53 to which the assembly attaches.

Figure 27A:
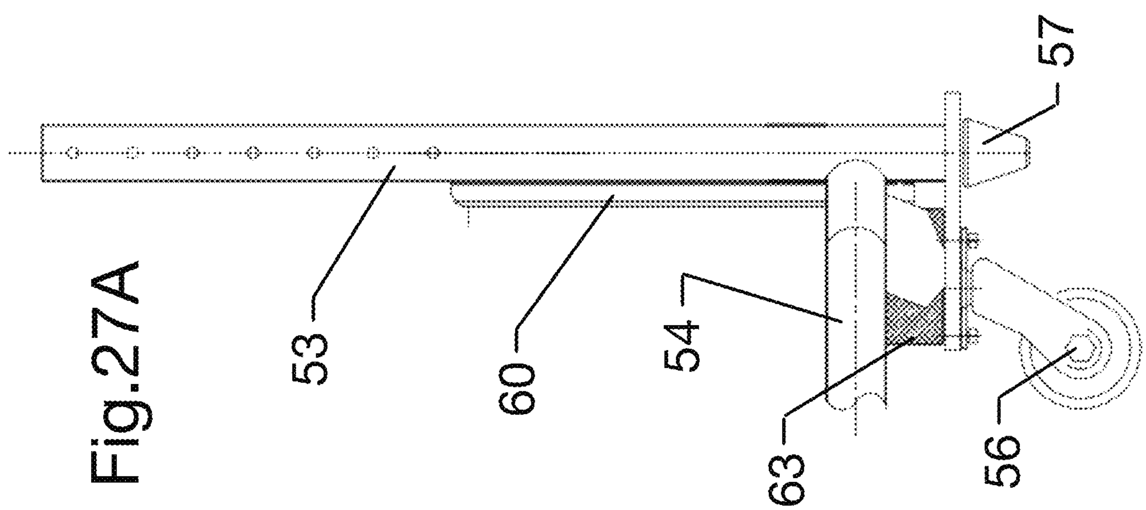
FIG. 27A is a side elevation of a pre-rig truss showing a captive stiffener.
Figure 27B:
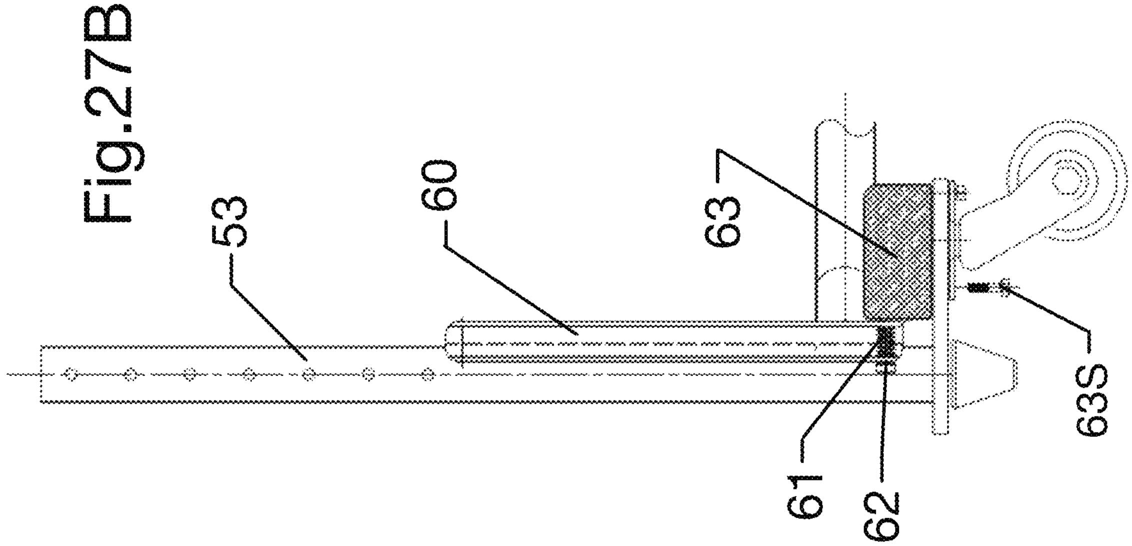
FIG. 27B is a reverse side elevation of a pre-rig truss showing a captive stiffener.
Figure 27C:
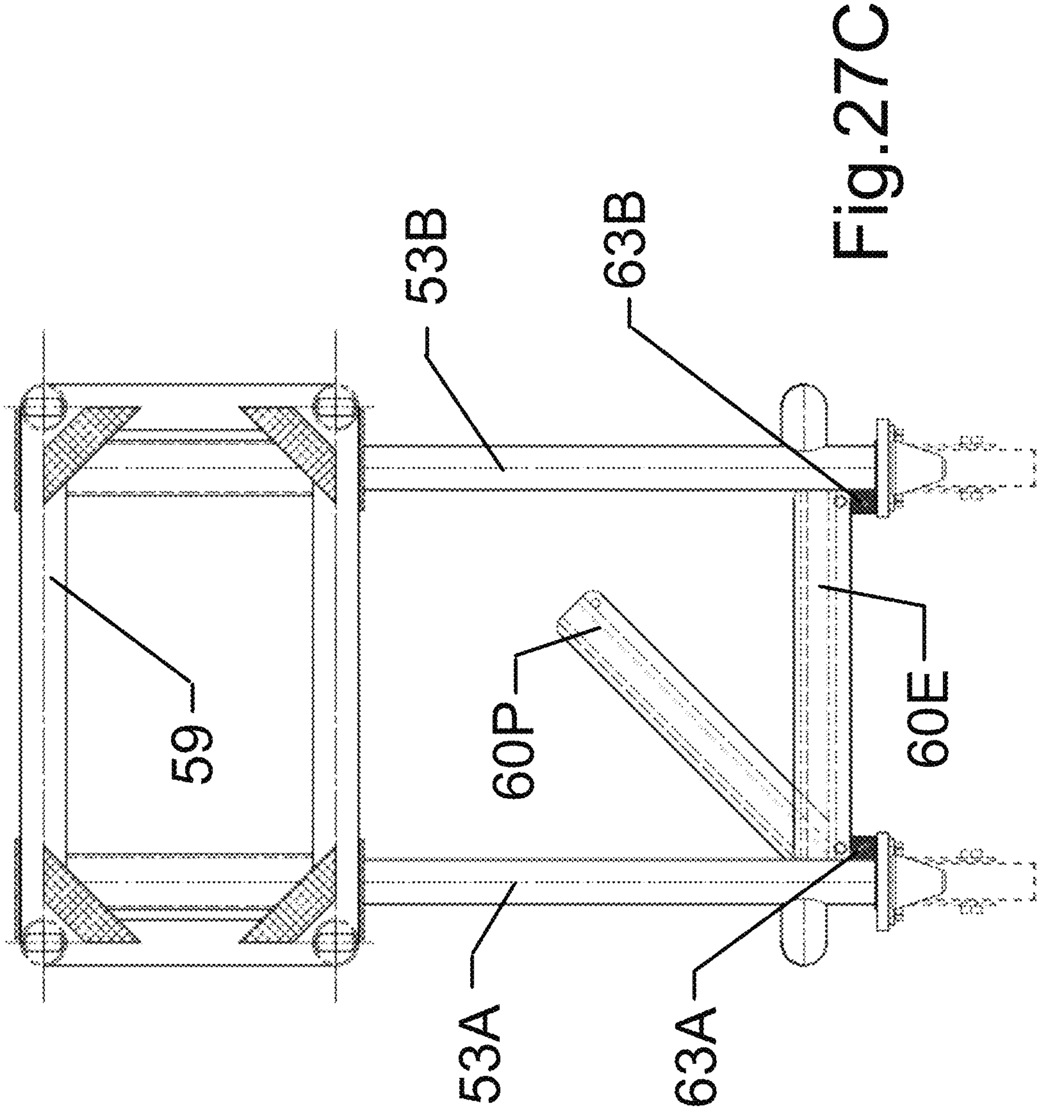
FIG. 27C is an end elevation of a pre-rig truss showing a captive stiffener.
Figure 28:
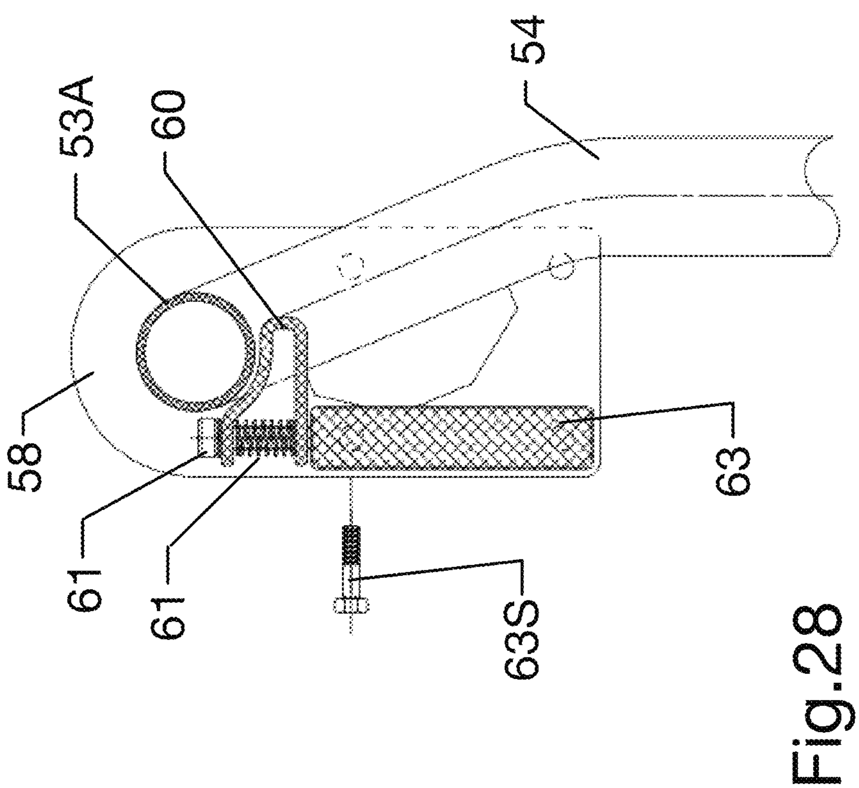
FIG. 28 is a plan view of the captive stiffener of the prior Figures.

The function of a stiffener can be performed with a captive solution that is far smaller in scale. FIGS. 27A-28A illustrate one embodiment of such a solution. Shape 60 can be extruded or otherwise formed and employs a cross-section, that while nesting close to leg 53 when retracted, is stiff. Mounting detail 63 accepts a bolt 62 that serves as an axle for shape 60. Detail 63 is illustrated as mounted using bolts 63S through the existing holes in caster 56 provided for plate 58. A spring 61 will urge shape 60 into the storage position seen in FIGS. 27A and 27B. As seen in FIG. 27C, the shape 60 can be pushed downwards (as in 60P) to a position (60E) in which it engages a detail at the caster plate of the leg carriage opposite.

Stability could also be increased by widening the "wheelbase" of the truss, whose casters 56 are inset to allow them to nest between the top chords of a truss below in stacking, in order for stacking cone 57 to nest in sleeve 40 of the lower truss. A caster mounting method can be used in which caster 56 mounts to a plate, which, in turn is mounted to caster plate 58 by the bolt used to fix stacking cone 57 to the plate and leg 53 above. This bolt can then serve as an axle around which that plate can rotate between positions for truss stacking, and a wider setting, which can be used for those trusses on the bottom.

Figure 29A:
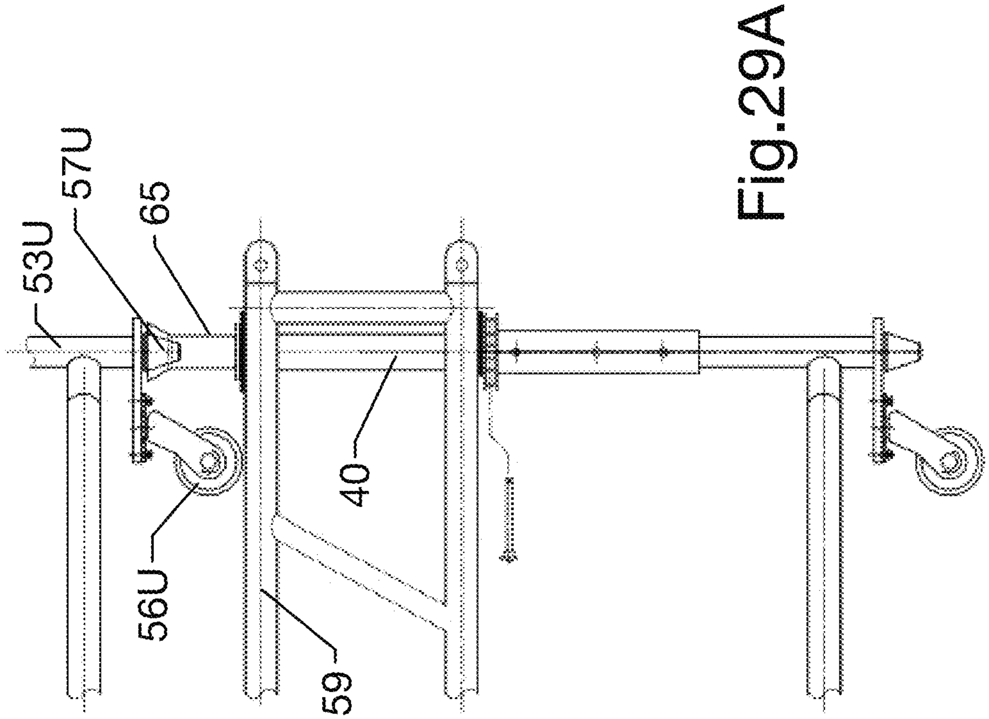
FIG. 29A is a side elevation of a pre-rig truss showing a stacking extender.
Figure 29B:
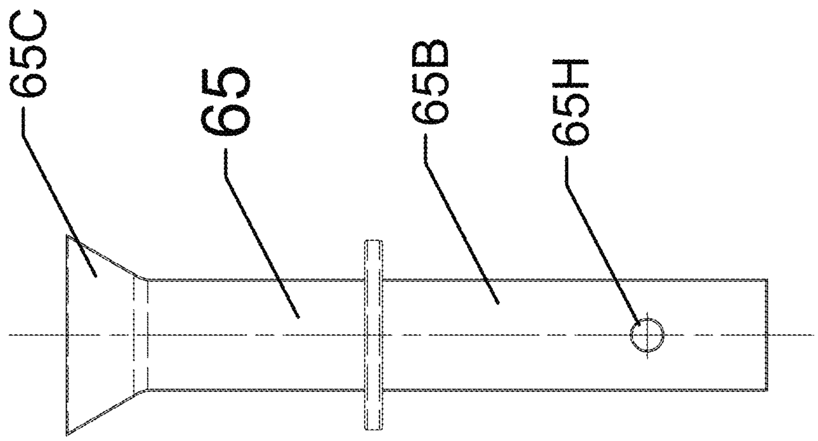
FIG. 29B is a side elevation of a stacking extender.

Stacking the Tyler/GT truss is labor intensive because the casters of the upper truss must be manually rotated by a worker on each end as the truss is lowered onto the one below, to fit between its top chords. Clearance between the low rail of the leg carriage on the upper truss and the top surface of the lower truss is minimal, which can present problems for cable and rigging that, desirably, rides atop the truss during shipping. FIGS. 29A and 29B illustrate a "cone spacer" 65, which inserts in each sleeve 40 of the lower truss (portion 65B) and presents a receiver (here a cone 65C) for the stacking cone 57U of the upper truss. With the use of cone spacer 65, the casters 56U of the upper truss require no manual alignment in stacking; the wider wheelbase can be used; and there is additional clearance for cable and rigging atop the lower truss.

If leg carriages are to be separated from the truss sections during use, it is far more efficient to reduce or eliminate the need for the awkward step of leg carriage inversion.

Figure 30A:
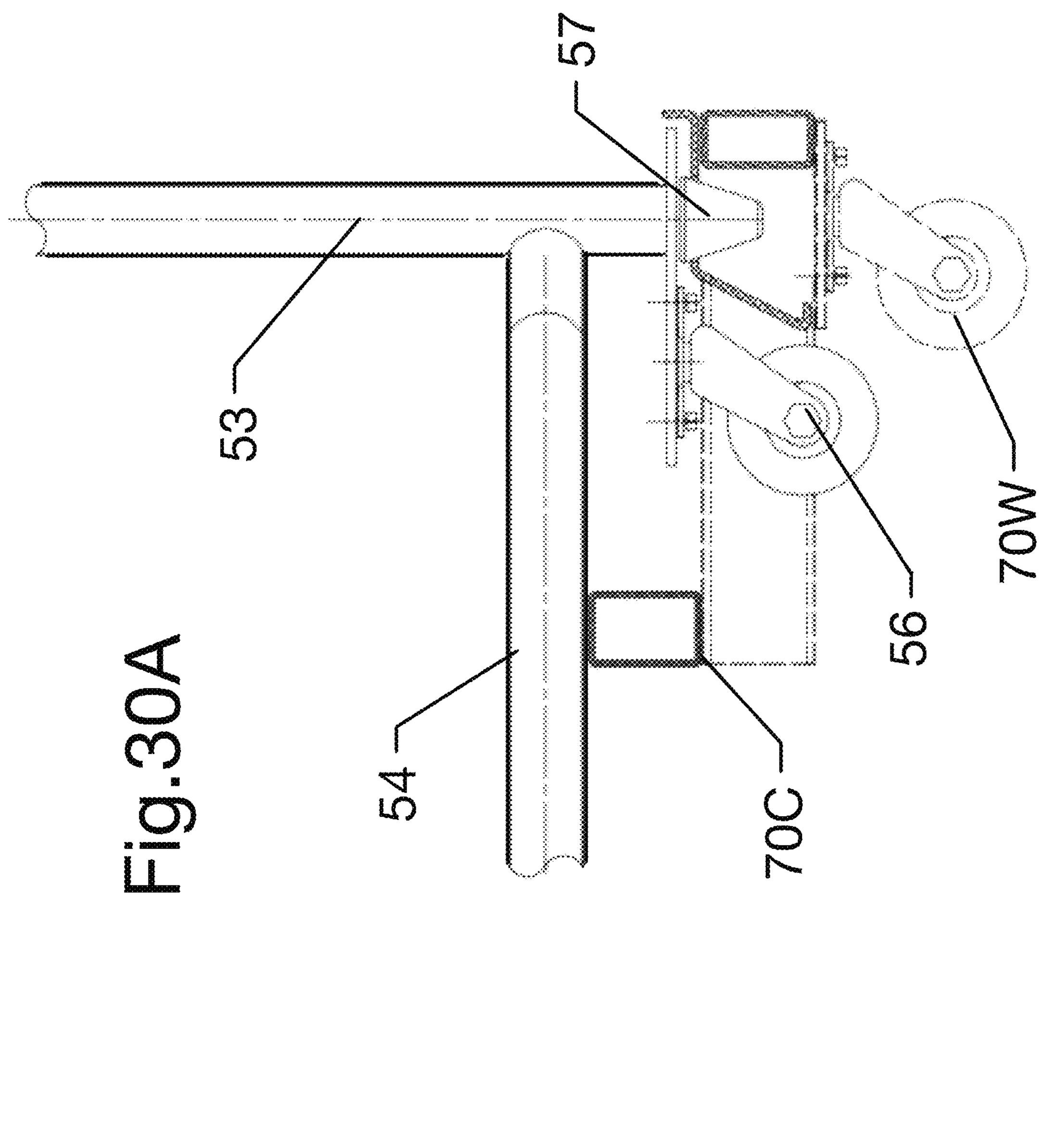
FIG. 30A is a section of an improved leg carriage storage rack dolly.
Figure 30B:
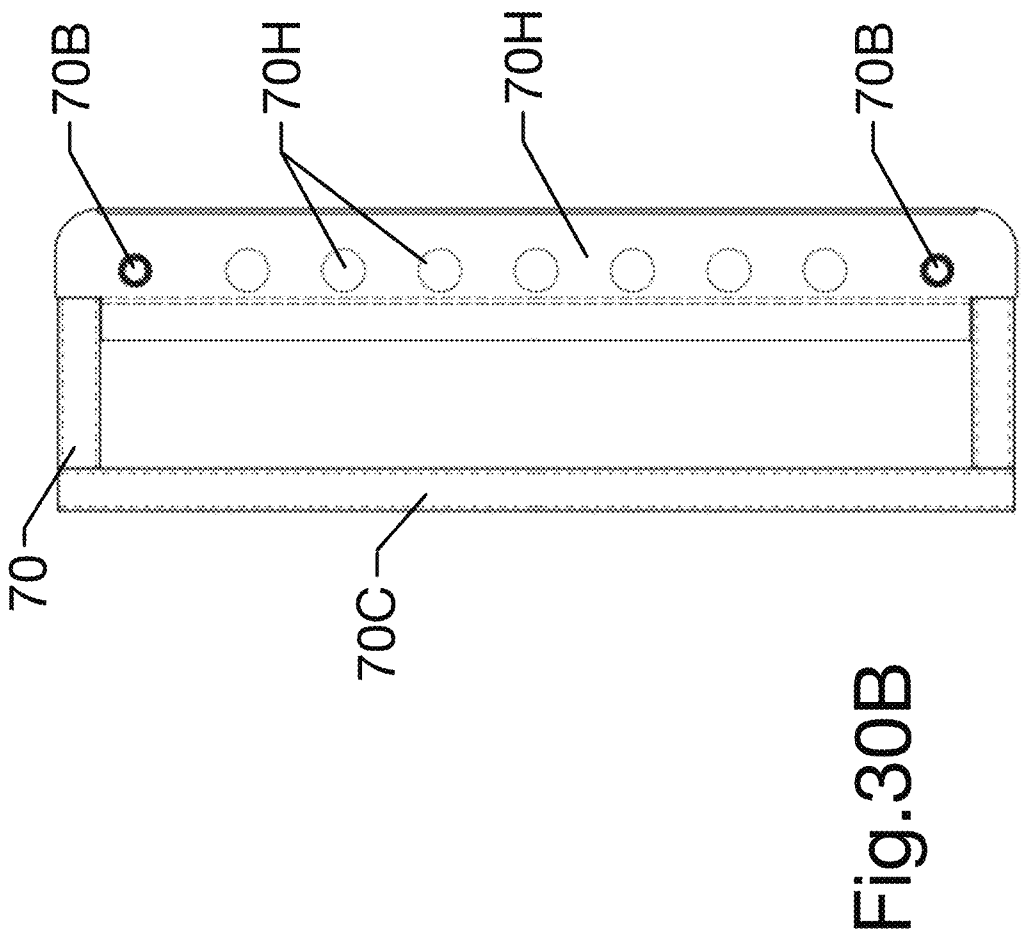
FIG. 30B is a plan of an improved leg carriage storage rack dolly of the prior Figure.
Figure 32B:
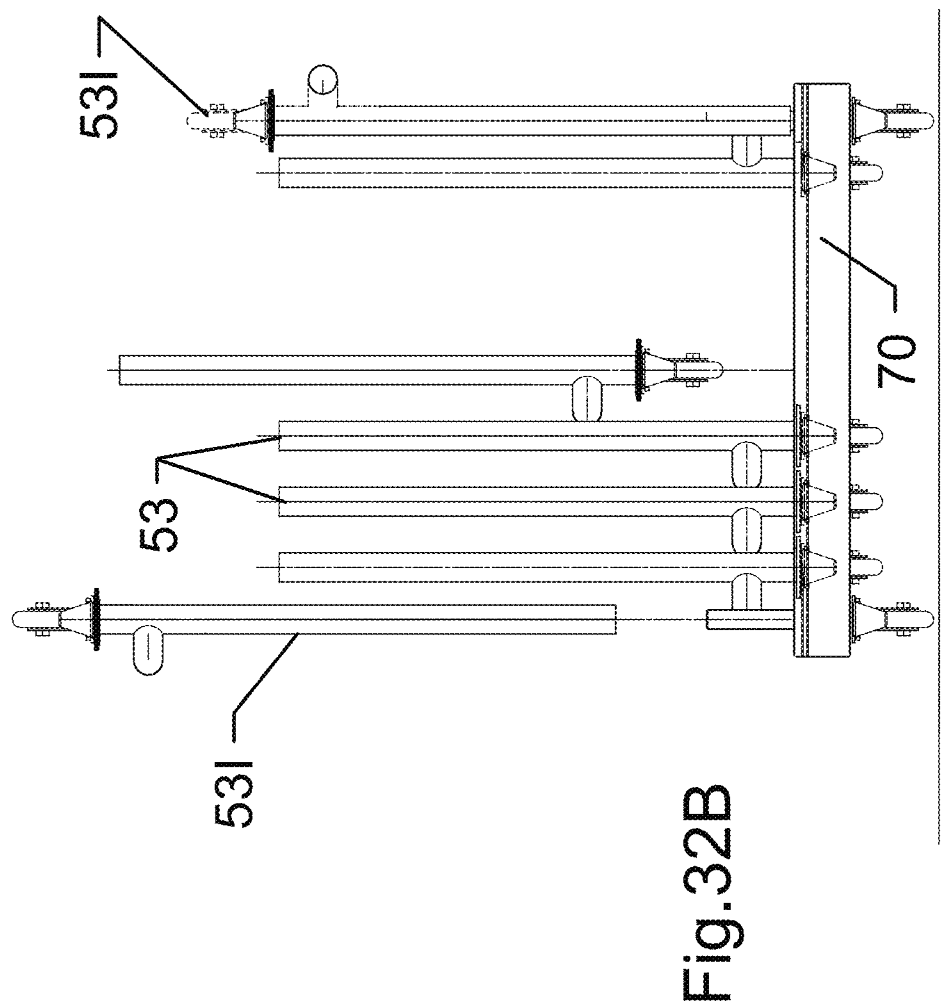
FIG. 32B is an end elevation of the improved leg carriage storage dolly of FIGS. 30A and 30B in use.

FIGS. 30A, 30B, and 32B illustrate one embodiment of an improved leg carriage dolly 70. As in the present design, two of dolly 70 are employed, one at each end of the leg carriages. In the embodiment illustrated, the outboard leg carriages 531 are stored in inverted position, by means of studs 70B accepting the open end of the carriage leg, in the prior manner. This offers them as a convenient handrail for moving and steering the rack. And it protects the leg carriages between them from being knocked. Those leg carriages between the inverts (e.g., 53) can be inserted caster-down, eliminating the need to invert those leg carriages for storage and again for shipping. Openings 70H are provided in the dolly to receive the stacking cone 57 on the caster plate and to align the caster 56. A rail 70C stabilizes the leg carriages by supporting their low horizontal 54. Additional provisions can hold the leg carriages in place, for example, a hinged bracket or magnets. The dolly can be reduced to a nominal truss width and be provided with its own stacking cones or similar detail, such that they can be shipped nested atop truss sections, instead of requiring independent shipping and handling. One or more member can connect the dollies at either end to maintain the correct spacing in use and the dollies hinged against it for shipping.

A "NewClock"

Those who need ready access to accurate time information have long been able to wear or carry watches. Personal cellphones and smartphones can now provide it with split-second accuracy. However, there still exists a demand for clocks, disposed at fixed locations chosen for visibility, in an office, home, or hotel room. Clocks offer time information at a glance, whether or not a person wears a timepiece, and without having to locate or retrieve a phone.

Most notably in bedrooms and hotel rooms, "alarm clocks" serve the added function of providing an audible alert at a preset time, generally to awaken. Setting the correct time and alarm time requires multiple controls, typically switches. "Snooze" is another, related function. Awakening to music requires controls for radio functions, as well as for mode selection.

One consequence of these user interface requirements is that such clocks are often both difficult to understand and to set correctly, especially in rooms where a succession of occupants might have no prior experience with operation of a particular brand and model installed there. And no guest wishes to review an instruction booklet to set an alarm before bed.

Figure 33A:
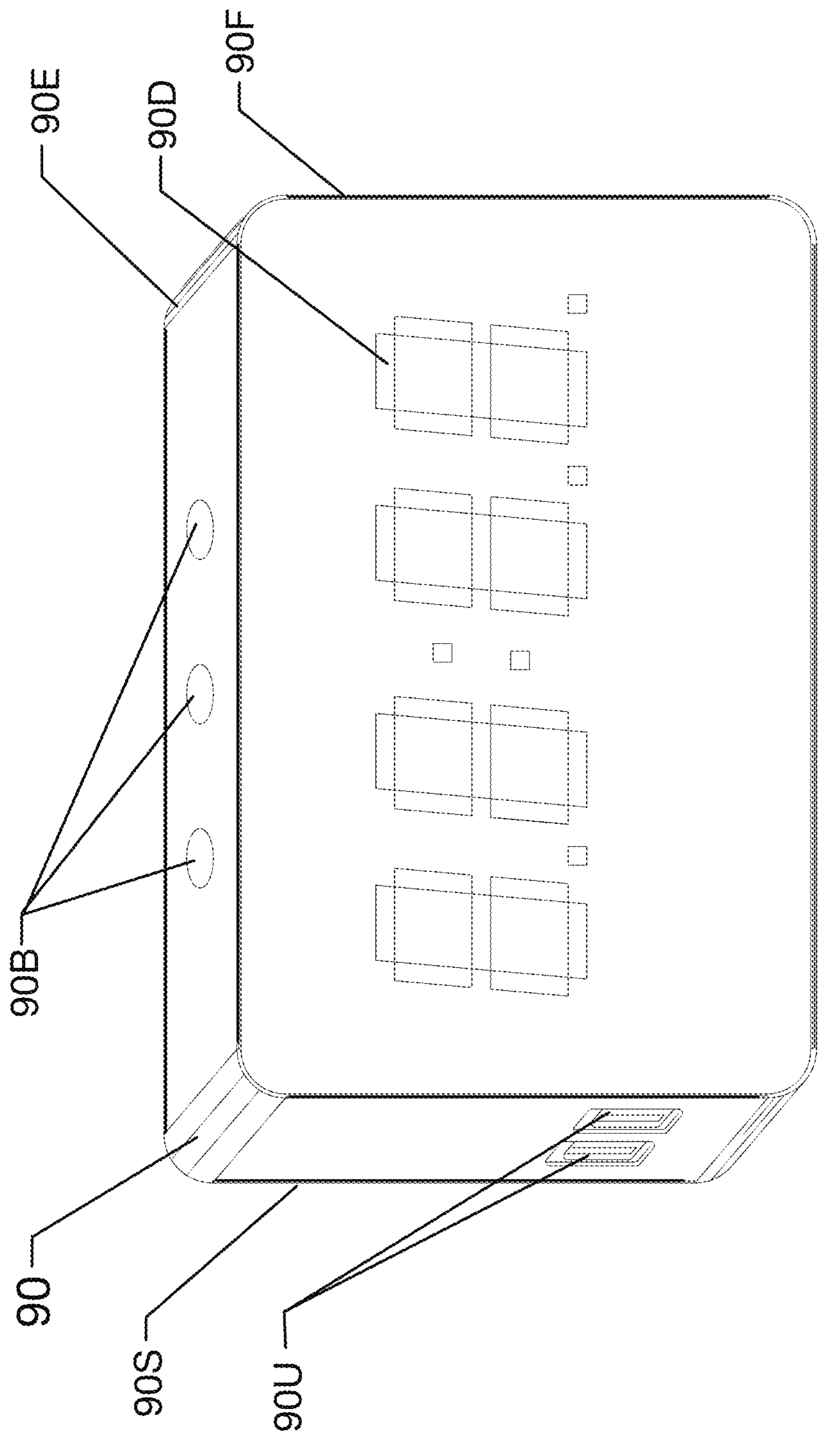
FIG. 33A is an elevation of an improved clock.

Refer now to the FIG. 33A in which one embodiment of an improved apparatus meeting the various needs described more efficiently (a "NewClock") is illustrated.

In one possible embodiment, the unit 90 need have no external physical switches. It can employ a capacitive or other touch sensitive area(s) sensing user hand/finger contact. It can (or can also) employ retro-reflective or other sensors not requiring physical contact. In the embodiment illustrated, three such sensors 90B are arranged along the top edge, used to detect proximity individually, as well as the a hand "swipe" and its direction across the top edge. A switch or sensor(s) can also detect downward pressure on the unit as a whole, for example, for snooze or to silence the alarm.

Many of the problems of traditional clocks, clock radios, and enhanced units are a consequence of attempting to provide the user interface for all functions using controls and indication on the clock itself.

Figure 33B:
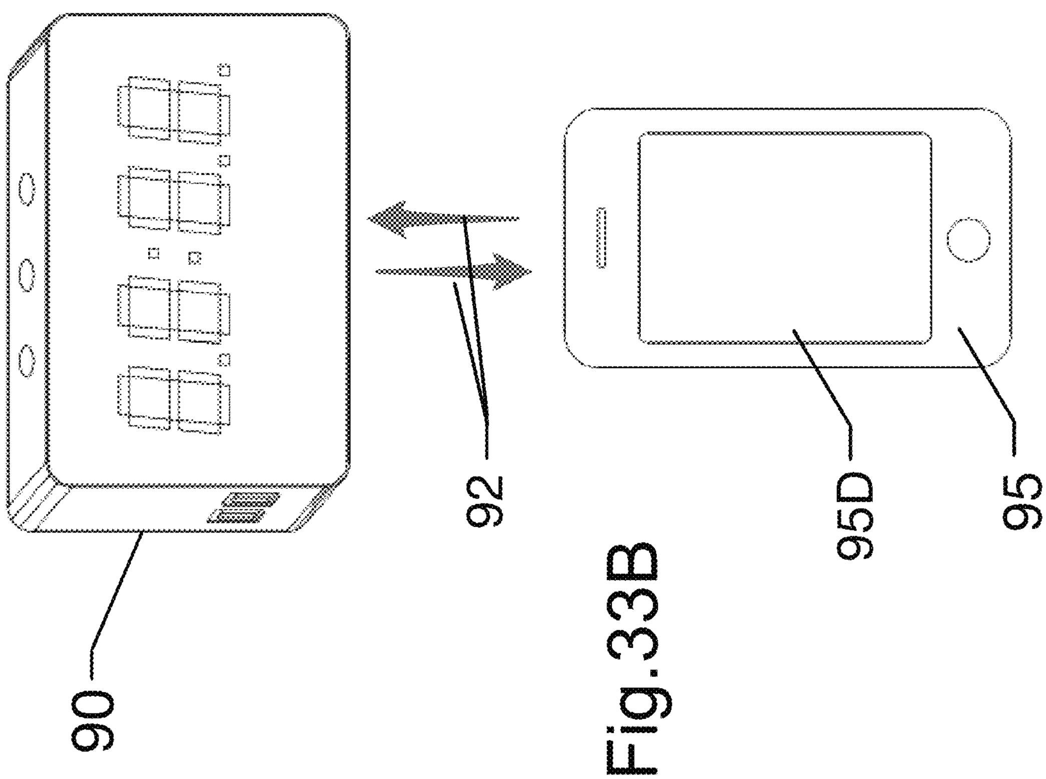
FIG. 33B illustrates the improved clock of the prior Figure interacting with a smartphone.

Referring to FIG. 33B, it will be seen that these needs can be better met by enlisting a personal electronic device (PED), such as a smartphone 95 or tablet, in the user interface function. The interface to the NewClock's functions can be provided by a program or "app" running on the PED. As illustrated in the figure, a PED 95 can be linked to the NewClock, by wireless means 92 (typically Bluetooth) and/or by cable; typically a standard PED accessory cable terminated in a USB plug on one end, and by the PED device-specific charging/interface connector on the other (e.g., Apple 30-pin or Lightning, micro-USB), which both couples communications between the two and can serve to charge the PED.

Upon establishing a connection (by, for example, plugging up a wired connection or by establishing a Bluetooth pairing) current/displayed time on the NewClock can be accurately and automatically set or corrected by using the current time as per the PED, which is typically derived from current or previously synchronized time information from the internet; for the current time zone at the location (or for such other time zone as the PED's owner is using in preference).

The PED can be used to manually set or reset NewClock displayed time(s) by various methods, including numeric entry and "thumbwheels".

Alarm times can be set using the same method. Alarm information can also be derived from "clock", calendar, and personal time management programs on or accessed via the PED (or transmitted from another source to the NewClock). Alarms can be "learned" or inferred from daily behaviors, previous settings, and/or event/calendar entries. For example, an event entry for a meeting or flight might trigger a prompt asking the PED owner whether a wake-up call is desired.

Alarms and times can also more readily be associated with days and dates, for example, an early wake-up time defaulting on on weekdays and off on weekends.

Alarm times can be made conditional on other factors, such as weather forecasts or traffic alerts that might suggest an earlier departure.

Alarm and other settings can be retained in the NewClock, making them independent of a continued connection with or the operation of the PED or of relevant applications on it. A NewClock can be provided with a feature that, after a power loss, automatically seeks and restores current time from a connected PED or via a data link from another source.

In the case of wall-mounted clocks, resetting times is inconvenient and can be hazardous when out of normal reach and the user must climb above floor level to reach it. Such clocks are typically battery operated and the first notice the user has of battery discharge is loss of time.

In the prior art, manual changes to and from daylight savings time can be overlooked or made incorrectly. In lodgings, staff must manually reset the clock(s) in every room. A NewClock can be reset correctly, whether by assuming the corrected hour value from an external source; by reference to accurate date information; and/or by remote command.

The interactions between a PED and a NewClock can be afforded by a dedicated program or app for the purpose, and/or by modification of another program or extension of such a program with a software "plug in".

A wired or wireless connection or other method of sensing the proximity of the PED (or, as will be seen, the identification of an individual by the NewClock by other means) can be used to trigger and/or shape interactions between the two.

For example, detection of a user's proximity can brighten the display or otherwise acknowledge the "recognition" of the user, as well as to show communication as established between their PED and the NewClock. The recall of, for example, the next alarm time and status can be triggered on the NewClock's display and/or the PED for the user.

Importantly, alarm clocks and clock radios are often shared by two persons sleeping in the same room. Providing separate alarms for each person is a desirable feature, but is generally one confusing to set correctly on prior art clocks.

Two persons sharing an alarm clock can each also accidentally cancel or change the other's settings. The use of a PED for alarm entries allows the clear identification of each user and the separation their preferences, including their alarms times, "snooze" permissions, and audio choices.

Where each user has their own PED, the identification of user can be made automatic, including by identifying the user's PED by a distinct indicia associated with the device itself or an app on it. The user can then readily access and modify their own preferences and settings, but can be restricted in accessing and/or modifying those of another user.

In cases where the NewClock is placed in a lodging, a user's PED and the NewClock can establish a link on the user's arrival, with which the user's time zone, alarms, and other preferences are loaded.

The NewClock can be provided with a loudspeaker or other audio transducer at modest incremental cost. This allows the NewClock to serve various useful functions, including as a "clock radio", as a remote speaker for the PED, and to enhance its alarm function.

Prior art alarm clocks often use buzzers or piezo beepers intended to be annoyingly effective, with only two choices for loudness. The NewClock allows a variety of alarms that can be resident in the unit or accessed from or via the PED, as well as the specification of their employment, including volume and volume profile/progression. A "Wake to Music" function can be afforded by accessing specified audio content on or via the PED.

Another issue with prior art clocks, alarm clocks, and clock radios is that the unit must reside in one location or another, often on one side of a bed with two occupants. The view of the time and mode displays of the single unit can be obstructed for the farther user. The unit's controls are not accessible, including to silence the alarm when their setting triggers first. If the unit provides for charging a PED (such as by a docking station), then the farther user is either prevented from using this feature by the nearer occupant's use of it, or is widely physically separated from their PED.

Another aspect of the NewClock is its use with a second or satellite unit for various functions and benefits.

Figure 34:
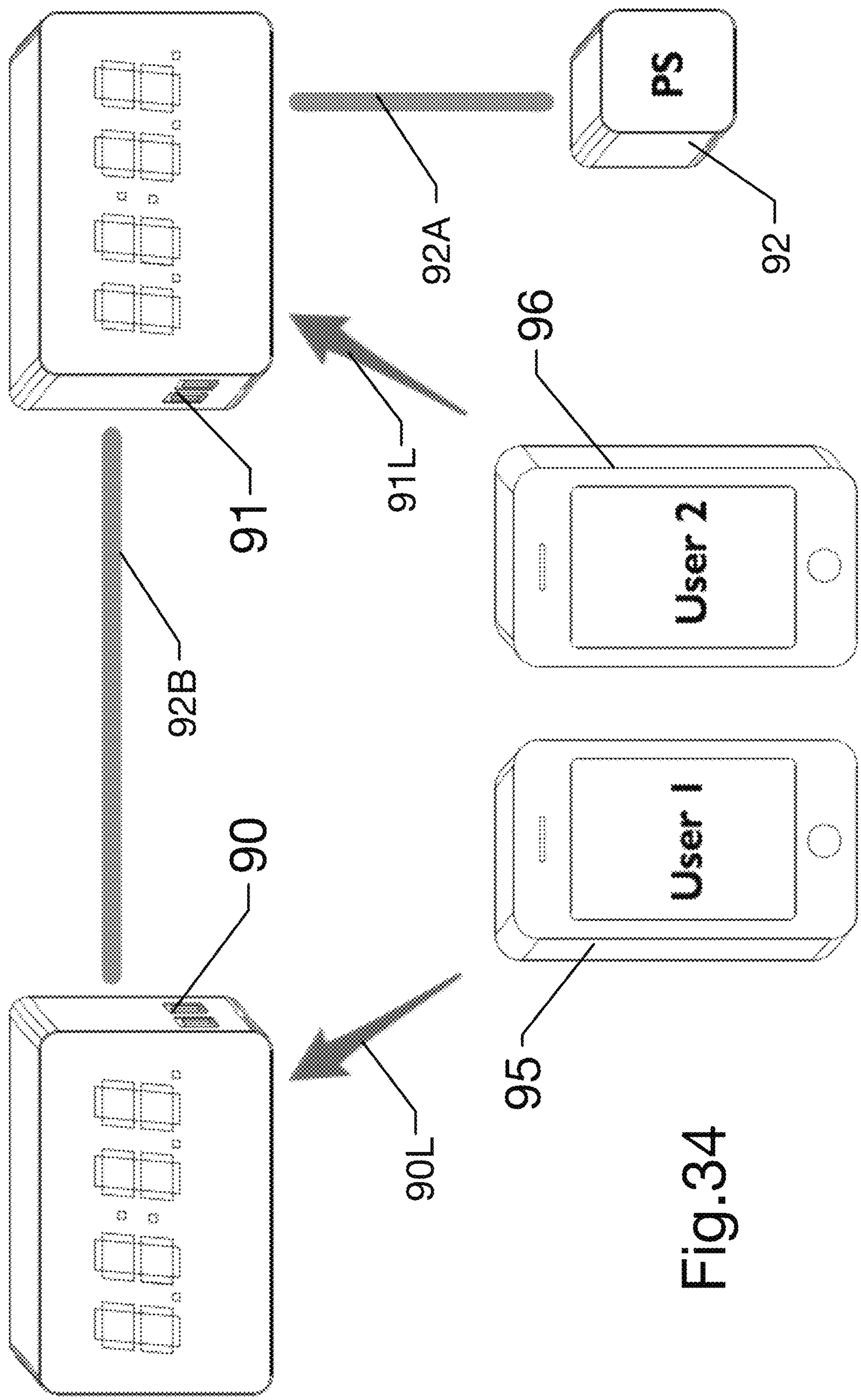
FIG. 34 illustrates the improved clocks of the prior Figure interacting with multiple users smartphone.
Figure 35:
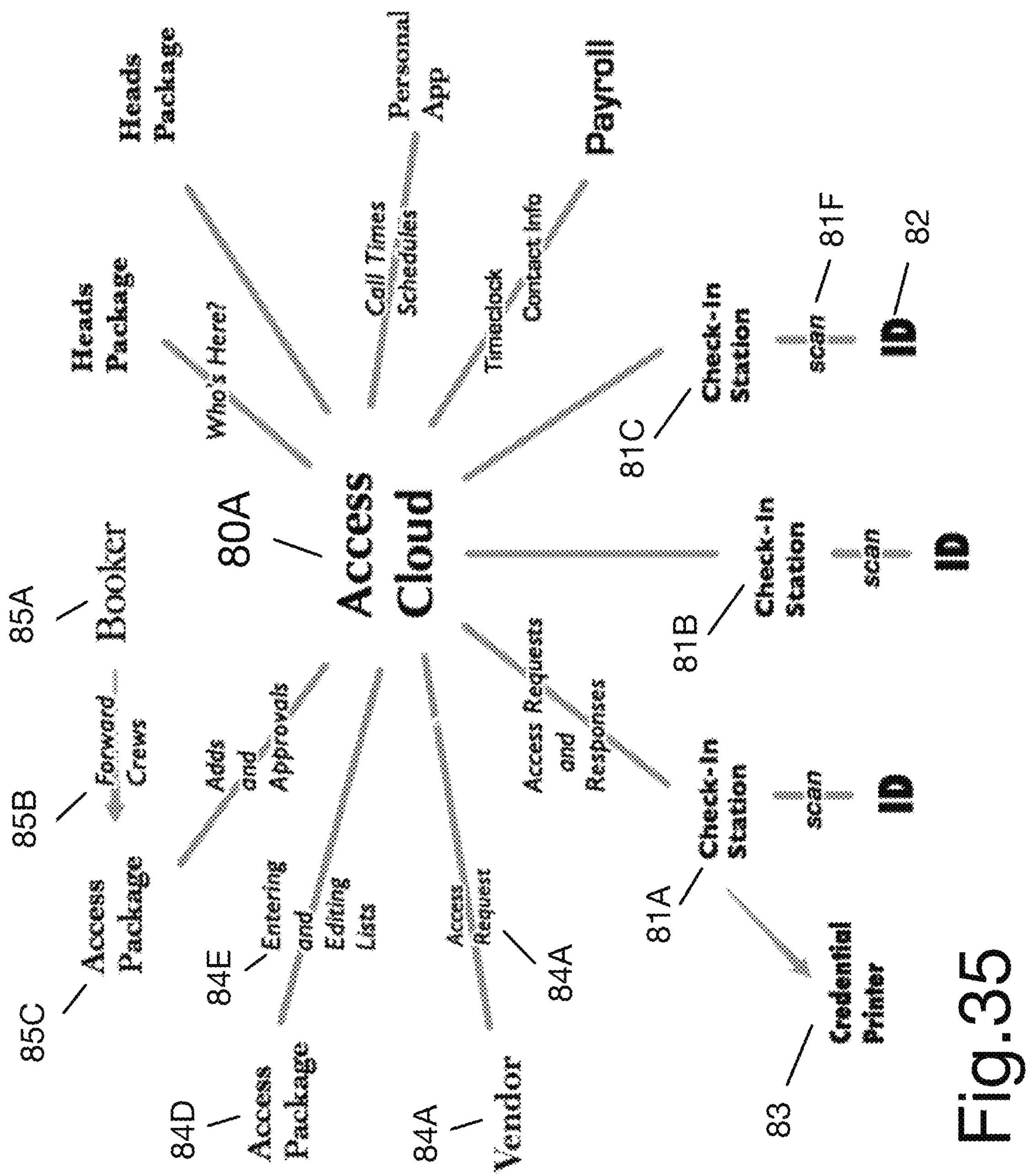
FIG. 35 is a functional overview of an improved access control and credentialing system.

Referring to FIG. 34, two units 90 and 91 are shown.

The second unit can be comparable to the first or of different size and/or features. It can be largely independent or, in the interests of economy, derive resources from the first or from a shared resource, such as a power supply adaptor PS 92.

The second unit offers several advantages:

As a time display, it can be readily visible when the first unit's display is obstructed.

As a charging station, it provides an additional, alternative charging location that can be more convenient for a user.

As a remote speaker, it allows stereo operation with good separation.

As an alarm, it allows for originating audio from only the unit within unobstructed arm's reach of the relevant party, reducing the impact on the other party, and allowing a prompt silencing of the alarm without either disturbing the other party or tempting them to silence the alarm themselves before the appropriate party has been awaken.

With its complement of onboard electronics, power supply, and the capability of connecting to other devices by wire or wirelessly, the NewClock is a natural actor in and portal to the "internet of things", as well as to other hardware, systems, and users; both in the same room and beyond.

The NewClock can serve as a wifi node, by repeating a wifi signal and/or by a wired network connection via an RJ-45 or other connector to a wired network. A NewClock can also communicate via a corded or cordless phone system.

A NewClock can provide microphone(s) to serve for various purposes, including voice-activated commands, ambient noise compensation, and intercom.

A NewClock can include sensors for its own use and/or for uses extending beyond the same room, and/or to accept, display, and/or process data and commands from other sources.

The NewClock can also display data derived from external sources, such as, for example, outside temperature and other conditions, whether from the PED or other sources (including online sources and/or outdoor sensors).

The NewClock can include occupancy sensors and/or cameras used for various purposes, including user and user gesture recognition, security, nannycam, remote monitoring, and energy control.

A NewClock can have a temperature and/or other sensors to determine environmental conditions, which it can display itself; link to the PED for display, processing, or response; or link to other locations. In one example, a user with a child or pet can determine remotely whether room temperature is appropriate.

The NewClock's prominent position allows equipping it with infrared emitter(s) and transceivers that permit it to interact with devices that can be remotely controlled, whether as a result of its own processing or as a portal relaying data and commands to and from remote sources.

In one example, a NewClock in a home or lodging can detect the presence or absence of an occupant in the room, turning "smart" lights and appliances like a television on or off, using standard remote control commands. Where a heating or air-conditioning unit or system accepts remote commands, the NewClock can reduce energy use when a space is vacant, and trigger operation in response to the arrival (or detected approach) of a user, as well as commands relayed from them.

Improved Access Control

Many enterprises require limiting, to only authorized persons, access to a physical premises.

For a typical business and its premises, employee access can be controlled by issuing and requiring the display of permanent identification cards, and visitor access controlled by the issue of temporary passes.

In some enterprises, including sporting, entertainment, and special events ["Projects"], which are often of only a few days duration, hundreds—or thousands—of credentials must be issued; in a complex matrix of selective access control; and across the separate personnel pools of a dozen or more different organizations and employers involved in a given such Project.

Beyond a general authorization to enter the premises at or on which the Project takes place [the "Venue"]:

Specific areas within the larger premises/Venue often require higher levels or classes of authorization. For example, within an arena hosting a concert will be smaller, further restricted areas, such as the stage, dressing rooms, VIP areas, etc. . . . .

For any given area, access might be limited to only certain periods; such as for specific days, for a time period within a specific day, or for only a defined portion/phase of a Project.

For a given Project, the specific complex of organizations, of subsets of their employee pools, as well as of unaffiliated persons who each have a valid reason to access a Venue is unique, and requires clearance and credentialing specifically for that Project.

Project-specific physical credentials must be produced and then be issued to each person authorized, typically where they enter a Venue, on first arriving there (if their authorization and credential is for the Project's duration), or upon such arrival on each day or shift (if only so authorized and credentialed).

Such credentials can take the form of laminated badges worn on lanyards, of self-adhesive badges ("stickies") applied to apparel, and/or of wristbands. Color, text, the shape of, and/or graphics on each of multiple credential types identify the access that it permits. Credentials can be provided with additional features to prevent counterfeiting and misuse, such as serial numbers, the individual's name, their photo, and/or a holographic pattern.

Issuing appropriate credentials to the many persons involved in such a Project is a complex undertaking; one inefficient using current methods.

It is an object to improve the efficiency of controlling access and of issuing credentials in these and other situations.

A credentialing process requires the generation of one or more catalogs/databases of all persons to be granted access and, for each person, on what terms. That database, i.e. "Credentials List" ["List"] will be subject to frequent changes over time, for a variety of reasons. Both the List's initial contents and subsequent changes to it will come from a variety of different persons and entities as multiple inputs and sources. At the Venue, the credentialing and access process requires personnel at points of entry. Security personnel staff entry lanes; confirm that each would-be entrant ["Entrant"] has been issued and displays a valid credential. If so, their entry is permitted, typically with a bag check and metal detector screening. Associated with some entry points will be stations, staffed by workers issuing credentials ["CWs"]. Simultaneous access will be necessary for such workers to the current "List"/database to permit establishing who is authorized and on what terms.

Lines of would-be Entrants form seeking a credential, awaiting an available CW. On reaching one, the Entrant typically recites their name. The CW consults a printed copy or a computer accessing one (or more) Credential List. If the Entrant's name is found, the CW typically requests a photo ID to confirm identity (one sometimes scanned or an identifying number on it noted). The CW consults their copy of the List for the type of credential to be issued, and retrieves/prepares it or forwards a request to a separate station at which the physical credential is issued.

Unless and until a multi-day credential can be issued to an Entrant, this process repeats daily for each Entrant.

Work on a Project in the Venue is often organized in timed shifts, resulting in surges of Entrants appearing shortly before their shift begins.

Because the number of persons working on a Project at a Venue generally increases as an event approaches, the number of persons to be issued credentials grows, as do lines at points of entry. Delays in admission result in the late arrival of persons at their tasks in the Venue, translating into delays in work.

Delays in credentialing also result when the verbal offer of the Entrant's name is not correctly understood by the CW, and when an Entrant's name is not initially found and a supervisor or manager must be consulted to resolve the discrepancy.

Some Projects, by virtue of their scale and/or security concerns will supply their own staff and/or specialist contractors to issue credentials.

In the early stages of a Project, such dedicated credentialing staff (if employed) is often not yet in place, so substantial numbers of Entrants must be credentialed by ordinary Venue security staff, from printed lists, without benefit of additional help or specialized support. In the process of List generation, each of many parties involved in a Project must generate and submit their own list of names of those persons that they anticipate will require venue access.

Merger/collation of such submittals and of changes is required to reduce delays in finding specific names resulting if they are not alphabetized and/or they are spread across more than one report.

Many of the organizations involved, such as outside vendors engaged by the Project, will draw staff from their own employee pool, with the persons scheduled for a Project depending not only upon this Project's needs and schedule (which evolve and change), but on the competing demands of other projects/clients also being served by the same vendor.

In other cases, such as stage labor, a large number of individuals will be booked for the Project from the larger pool of those who work at multiple venues in the general geographic area, based on the needs and schedule of the Project and on their own availability and interest. Such individuals might be not previously credentialed for general access to specific Venues, and certainly not for specific Projects.

Last minute changes and additions to the List can be required by changes in a Project's needs; changes to the availability of persons previously booked; and by urgent additions and replacements to equipment and supplies needing delivery to the Project from a vendor.

In a related topic, whether a person booked for a function/position has actually arrived as scheduled is of import to their employer and direct supervisor. Also, many workers are paid on a per diem or hourly basis, and accurate confirmation that they have worked on the Project is a basis for assuring that their services are subsequently properly paid.

A more efficient approach to credentialing would include online access to the "List"/database for a Project authorizing entry and defining the level of access/credential to be issued.

On a per-project basis, administrative rights to permit and define access can be assigned to persons ["Admins"] in one or more participating entities (including Project, Venue, vendor, and labor contractor staff) within limits.

Higher-level Project staff can be granted broad rights to enter authorizations for persons individually and also by bulk endorsement/approval of sub-lists submitted by other parties.

Admins can be permitted to delegate authority to other parties [Delegatees], who can then each enter multiple names up to a quota/limit and within a specified credential type and time period. The delegating Admin need not be involved in handling these authorizations so delegated, including when the list of names must be revised. For example, substituting one name for another for a credential not yet issued can be made permissible by the Delegatee.

In other circumstances, approval by the delegating Admin will be required, but can be expedited by handling it electronically.

As an electronic database, merger/collation can be made automatic and reports generated by a variety of sort indexes.

Wired or wireless stations 81A-81C can be placed at entry/checkpoints in the Venue, such that security, CW, and other personnel can access the most current list/database. When an Entrant's name is not found, queries can be handled within the system and with communication via email or by other means, seeking authorization from an appropriate party.

Regardless of the means of generating, updating, and accessing a credentials database, the long-standing problem remains of the physical granting of access, which can include or require the issuance of physical; credentials. Such issue requires an interaction between each Entrant and a Credential Worker, which, as has been described, is time-consuming and subject to error.

An important aspect of the invention includes the automation of the identification of an Entrant by means of a reliable credential already in their possession, which is tested against an electronically maintained database determining access permission. This automatic process can result in the issue of a physical credential specific to a Project or other purpose, as well as employ additional tests/assurances of identity.

The applicant's approach employs a credible machine-readable credential ("CMRC") already in an Entrant's possession. In one example, a driver's license. Such a CMRC presents the bearer's photo and name, birth date and other identifiers in text. And, in most states, drivers' licenses and some other IDs include a bar code encoding the same fields and additional data.

Rather than verbally offer their name to a CW, the Entrant simply presents their CMRC to an automatic reader. The reader pulls indicia from the CMRC by optical character recognition of text, symbols, and/or by scanning a bar code, offering the data retrieved for processing. Photographs on the ID can be scanned and used in identification, reproduced on a physical credential, and/or relayed to a display that allows comparison by a credential or security worker with the individual presenting it.

Linked electronically to the credential/access database, the Entrant's name and/or other indicia are tested against the names and/or other identifiers of those persons authorized to enter. If a match is found, access is permitted. If specified, a physical credential is issued.

Depending upon the type of physical credential, the necessary credential can be produced by prompting a CW for the appropriate one, and/or by printing or otherwise producing it directly for the Entrant to collect.

In one embodiment, a standalone portable unit includes at least a card reader 81F and a dispenser 83 for at least one type of physical credential, and has access to an electronically-maintained database 80A of access permissions and associated details. A number of such units can be located at or near points of entry to a venue. Would-be Entrants simply approach an available unit and insert or otherwise present a CMRC for reading. If authorization is confirmed, the credential is issued and the Entrant proceeds to the security check. If the Entrant is not matched to an authorization, an exception report can be generated for follow-up. The portable unit can include a camera for capturing an image of the Entrant for comparisons or file purposes, and/or with provisions for biometric testing. Images and data collected in the process can build the database of identifiers for an individual that can be subsequently employed.

Where the Entrant does not have a CMRC that can be machine read, the Entrant can approach a CW and seek entry by supplying their name and suitable other identification as required in the current manner.

Authorized entities could issue an acceptable non-governmental CMRC. And venues, vendors, and other employers could incorporate suitable machine-readable indicia into their own ID cards. Such indicia can include identification of the non-governmental issuer. Those issuers not deemed acceptable to a given Project or for a given level of access to it need not be recognized.

Non-government credentials suitable for identification can include commercial ones deemed sufficiently credible, such as credit and debit cards.

Inherently, data is captured documenting the time of entry, entry point, and identification used.

As such, notice of entry can flow back to the relevant employer, department head, and/or booker to confirm that a worker has arrived, flagging those who have not yet timely appeared for follow-up as to their location and status.

In managing large worker pools spread over large venues, it can be difficult to determine whether all workers are present. Lists of workers can be linked with their respective supervisors and a current list of the workers assigned to each for a shift transmitted to their supervisor along with the time at which each worker passed the entry point. Conversely, the assigned supervisor and meeting point for workers can be entered in the database and presented to the worker on arrival. Arrival data can also be supplied as an input to a payroll system to assure that an employee's subsequent hours are billed and paid. Credential data can be linked to records of and permissions for other functions. Hundreds of rented walkie-talkies can be issued on large projects, and serial numbers or other identifiers linked to each person receiving a radio must be recorded to assist in its return. Meals can be served to workers at the venue and a means (typically a paper meal ticket) used to identify those persons budgeted to partake in a given scheduled meal. Assignment of walkie talkies as well as vehicles (golf carts, ATVs) and meals can be entered into a database and associated with persons authorized.

Another aspect of the invention is that an Entrant's identity can be verified by one or more of several means.

The Entrant's photo can be scanned from their CMRC and, as described, presented on a display to a CW or security guard at a scanner/point of entry to be compared with the presenter.

In one method of addressing fraud, DMV photos of 130 million American are accessible online, and Entrant indicia can be used to download the DMV picture for comparison.

Facial recognition software can be used to compare the Entrant's face with an image from their CMRC, online photo, or from a database. Biometric methods can be used.

Once issued with a physical Project credential, the Entrant can use the credential for access within a venue and on subsequent returns to the venue from outside it.

Importantly, the same CMRC used for initial identification and credential issue can also be used for additional/subsequent entries, in effect, via an "EZ-Pass" lane in which it is re-scanned, as well as being usable for other purposes.

An issued credential can be provided with a readable indicia (such as bar code or RFID) that automates subsequent recognition of the credential for reentry, time logging, issue of radios, tools, and vehicles, and meals.

Re-use of a CMRC or issued physical credential with each subsequent reentry or other transaction allows nulling issued credentials/permissions at less than their issued term, for example when one employee replaces another in the same position.

Networked machine reading of a credential or CMRC can also detect attempts to "hand-off" the same credential or CMRC for entries by more than one person.

Information can also be supplied to individuals at the check-in or entry point such as reporting location in the venue and supervisor.

In such large events, payroll functions are complicated by changes in hires, scheduling, and actual hours worked. Errors and omissions in time cards give rise to discrepancies. A credentialing system can be used to reduce administrative workload and errors by comparing the workers scheduled with the actual arrivals (and potentially, scanning out for departure).

The same technique can be used to automate issue of other forms of access such as "will call" tickets.

Onsite Materials Processing

Another disclosure relates to improvements in fields including construction and renovation.

New construction and renovation both require the use of various materials, supplied in different forms and grades, and cut to specific, necessary sizes and shapes. For example, drywall, plywood, and other paneling, which is supplied, for example, in 4'×8' sheets. Dimensional lumber and sheet metal; drywall framing. Such materials are stocked in bulk at distributors and, typically, are delivered to a jobsite, where skilled workers use various power tools to cut them into the specific sizes and shapes necessary for assembly/installation. Considerable time, labor, and expertise are required in handling the materials, measuring, cutting, and marking them for correct assembly.

In some cases, such "processing" of the bulk materials into their component forms is done offsite to reduce onsite labor, time, and skill requirements.

In pre-fabrication, the materials are not only "processed" into component form off-site, but components are assembled at least partially towards the finished product. The handling, processing and such part-assembly can be performed more efficiently in a facility for the purpose, where access is easy, ample work space is available, environmental conditions are stable, more sophisticated machinery can be employed, and skilled labor efficiently applied. Less time and labor are then required onsite, although flexibility is reduced and efficiency requires careful planning and preparation. The subassemblies resulting are bulkier than their components and can be more expensive to ship and harder to handle.

Alternatively, processing of materials into component form can be completed offsite and shipped to the work site for assembly as, in effect, a kit of parts.

In any case, "processing" requirements can be added to or revised by site conditions, change orders, and by the needs of other contractors and systems (such as for plumbing, electrical, and HVAC). Locating (or relocating) an electrical outlet, for example, requires making an appropriate opening in a wall panel and, perhaps, in a different finish material atop it. Feeding such edits back in either pre-fabrication system described is a complication and runs into the time lag between pre-fabrication and arrival on site.

The disclosure is of a system that markedly reduces the time, labor, and skill required for such "processing", and does so from conventional bulk materials onsite, with high accuracy and efficiency.

The system includes a "materials processor" which is, in effect, a mobile CADAM station.

The unit can be contained in a wheeled enclosure, whose dimensions might be limited to allow it to pass, in one orientation, through a window opening or standard doorframe at a jobsite. The unit can contain a two or more axis motorized gantry supporting one or more workheads for cutting and other operations on the materials employed: saw blades, router heads, water-jet cutters, etc. Secondary operations, such as sanding or de-burring and inkjet or other labeling to identify and correctly orient components produced in assembly can be performed.

In an embodiment, the material can be inserted in an opening in either end of the unit, where it can be grasped by rollers or other means and fed into/through the unit. Panels might be accepted vertically or near-vertically, or the unit be oriented so that panels are fed on a horizontal plane. The same or other openings can accept dimensional lumber, drywall framing, and tubing, whether for processing by the same work-heads or by others. Operations can be performed by moving the material relative to the appropriate work-head and/or the work-head relative to the material. Performing the operations within a unit's enclosure is safer and allows collecting dust and debris that would normally spread.

The operations performed can be specified directly from a CAD or other file, requiring no measuring or marking of the material for manual use of power tools. Known software can determine the best processing sequence and layout of components from the materials supplied, both for yield and availability of the necessary components in the assembly sequence and schedule.

Because the processing of materials is done at the jobsite, the delays, handling, and transport costs of pre-fabrication are eliminated. Bulk materials can be sourced from near the jobsite and processed as needed. The time interval between accurate and efficient processing and arrival of the component onsite is collapsed. Onsite labor is reduced, comprising unskilled labor feeding material into the processor and distributing components near the point of assembly, and workers who assemble the components but need not have "processing" skills themselves.

Depending upon the needs of a job, multiple processing units can be used to increase component output when needed, and then reallocated to other jobs when requirements fall. Units can be offered in a rental basis to contractors, including as a powerful marketing advantage for suppliers of materials for the cost reductions over traditional techniques.

As a CAD/CADAM system, "edits", including changes and additions, can be quickly and readily incorporated onsite or remotely and changes to the processing of components quickly executed, minimizing delays.

What is claimed is:

1. A cable assembly comprising:

a housing, a male power connector, said male power connector having a plurality of contacts, a first female power connector, said first female power connector having a plurality of contacts, a cable, said cable having first and second ends and attached to said housing at said first end and to said first female power connector at said second end, a second female power connector, said second female power connector having a plurality of contacts and at said housing, corresponding contacts of said male power connector and of said first and said second female power outlet connectors being electrically common, a male data connector, said male data connector having a plurality of electrical contacts, a first female data connector, said first female data connector separate from said housing and having a plurality of electrical contacts, a second female data connector, said second female data connector having a plurality of electrical contacts and at said housing, data conductors connecting contacts of said male data connector to corresponding contacts of said second female data connector via corresponding contacts of said first female data connector.

2. The cable assembly according to claim 1, said second female power connector being mounted to said housing.

3. The cable assembly according to claim 1, said second female data connector mounted to said housing.

4. A cable assembly comprising:

a housing, a male power connector, said male power connector separate from said housing and having a plurality of electrical contacts, a first cable, said first cable having first and second ends, said first cable attached to said male power connector at said first end, and to said housing at said second end, a first female power connector, said first female power connector separate from said housing and having a plurality of electrical contacts, a second cable, said second cable having first and second ends, said second cable attached to said first female power connector at said first end, and to said housing at said second end, a second female power connector, said second female power connector having a plurality of electrical contacts and disposed at said housing, corresponding contacts of said male power connector and of said first and said second female power connectors being electrically common, a male data connector, said male data connector having a plurality of electrical contacts, a first female data connector, said first female data connector separate from said housing and having a plurality of electrical contacts, a second female data connector, said second female data connector disposed at said housing and having a plurality of electrical contacts, data conductors connecting contacts of said male data connector to corresponding contacts of said second female data connector via corresponding contacts of said first female data connector.

5. The cable assembly according to claim 4, said second female power connector mounted on said housing.

6. A cable assembly comprising:

a housing, a male power connector, said male power connector separate from said housing and having a plurality of electrical contacts, a first cable, said first cable having first and second ends, said first cable attached to said male power connector at said first end, and to said housing at said second end, a first female power connector, said first female power connector separate from said housing and having a plurality of electrical contacts, a second cable, said second cable having first and second ends, said second cable attached to said first female power connector at said first end, and to said housing at said second end, a second female power connector, said second female power connector having a plurality of electrical contacts and mounted to said housing, corresponding contacts of said plug and of said first and said second female power connectors being electrically common, a male data connector, said male data connector having a plurality of electrical contacts, a first female data connector, said first female data connector separate from said housing and having a plurality of electrical contacts, a second female data connector, said second female data connector disposed at said housing and having a plurality of electrical contacts, data conductors connecting contacts of said male data connector to corresponding contacts of said second female data connector via corresponding contacts of said first female data connector.

7. The cable assembly according to claim 6, said housing being modular in construction.

* * * * *